US009606329B2

(12) United States Patent
Asami

(10) Patent No.: US 9,606,329 B2
(45) Date of Patent: Mar. 28, 2017

(54) IMAGING LENS AND IMAGING APPARATUS

(71) Applicant: FUJIFILM Corporation, Tokyo (JP)

(72) Inventor: Taro Asami, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/855,867

(22) Filed: Sep. 16, 2015

(65) Prior Publication Data

US 2016/0085055 A1  Mar. 24, 2016

(30) Foreign Application Priority Data

Sep. 19, 2014 (JP) ................................. 2014-191420

(51) Int. Cl.
| | |
|---|---|
| G02B 9/64 | (2006.01) |
| G02B 13/00 | (2006.01) |
| G02B 27/00 | (2006.01) |
| G02B 13/04 | (2006.01) |

(52) U.S. Cl.
CPC ........... *G02B 13/0045* (2013.01); *G02B 9/64* (2013.01); *G02B 13/04* (2013.01); *G02B 27/0025* (2013.01)

(58) Field of Classification Search
CPC ...... G02B 13/0045; G02B 13/04; G02B 9/64; G02B 27/0025
See application file for complete search history.

(56) References Cited

U.S. PATENT DOCUMENTS

| 8,797,659 B2 | 8/2014 | Souma | |
|---|---|---|---|
| 2012/0050884 A1* | 3/2012 | Kurashige | ............ G02B 15/177 359/684 |

FOREIGN PATENT DOCUMENTS

JP     2010-091697     4/2010

OTHER PUBLICATIONS

German Search Report dated Aug. 19, 2016; Application No. 10 2015 114 518.9.

* cited by examiner

*Primary Examiner* — Joseph P Martinez
(74) *Attorney, Agent, or Firm* — Young & Thompson

(57) ABSTRACT

An imaging lens consists of, in order from the object side, a negative first lens, a positive second lens, a positive third lens, a negative fourth lens, a positive fifth lens, a positive sixth lens, and a negative seventh lens. When f12 is the combined focal length of the first lens and the second lens, f is the focal length of the entire system, vd7 and vd3 are respectively the Abbe's numbers of the materials of the seventh lens and the third lens with respect to the d line, the following conditional formulae are satisfied:

$$f12/f<-3.2 \quad (1)$$
$$vd7<55 \quad (2)$$
$$40<vd3 \quad (3).$$

19 Claims, 23 Drawing Sheets

EXAMPLE 1

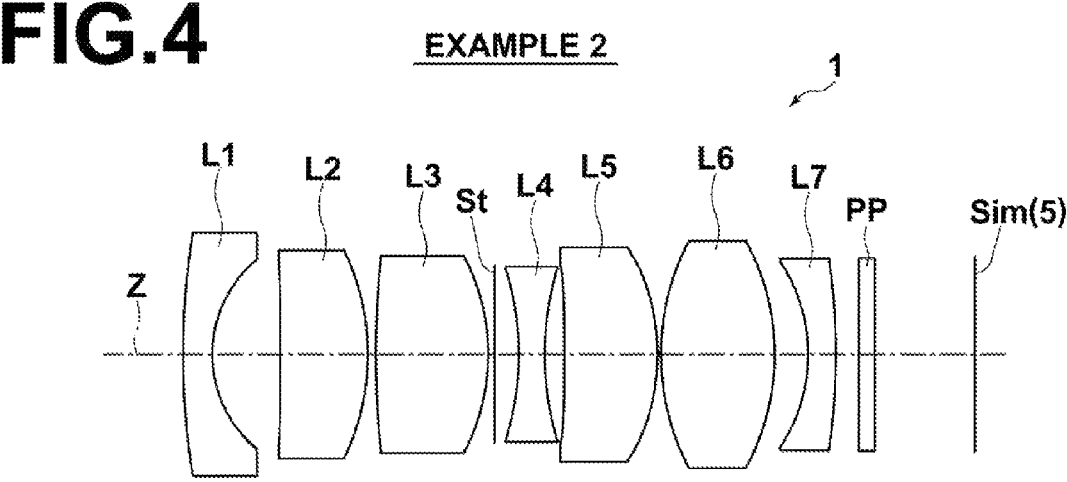
FIG.4 EXAMPLE 2
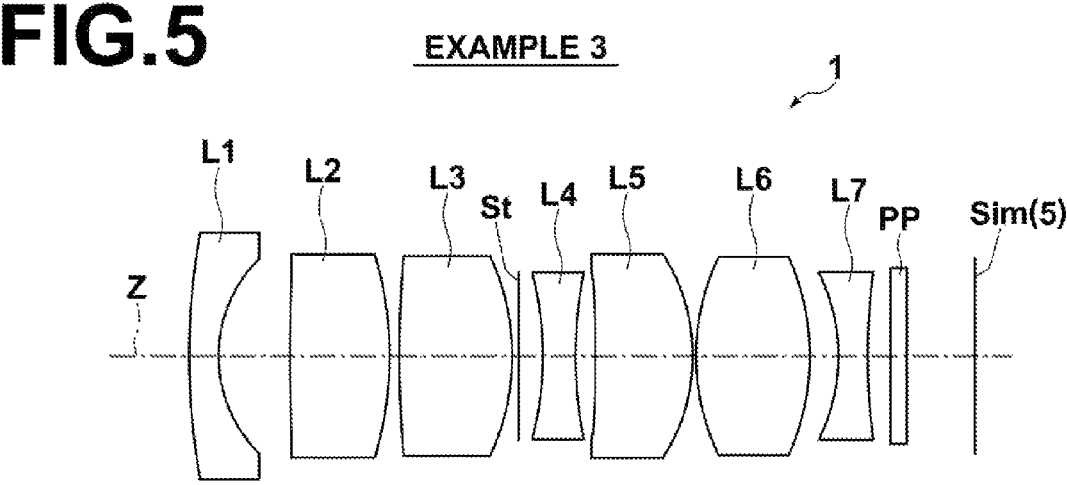
FIG.5 EXAMPLE 3
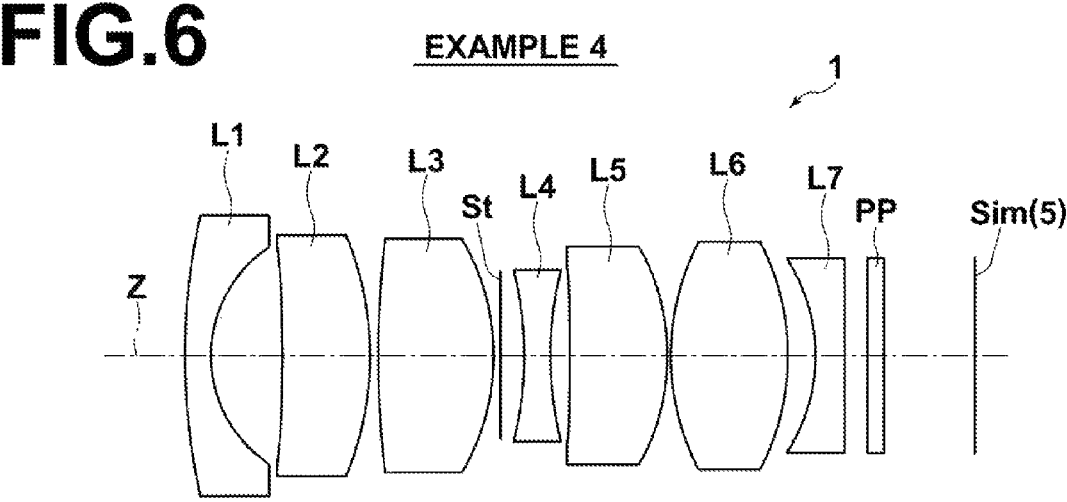
FIG.6 EXAMPLE 4

FIG.7 EXAMPLE 5
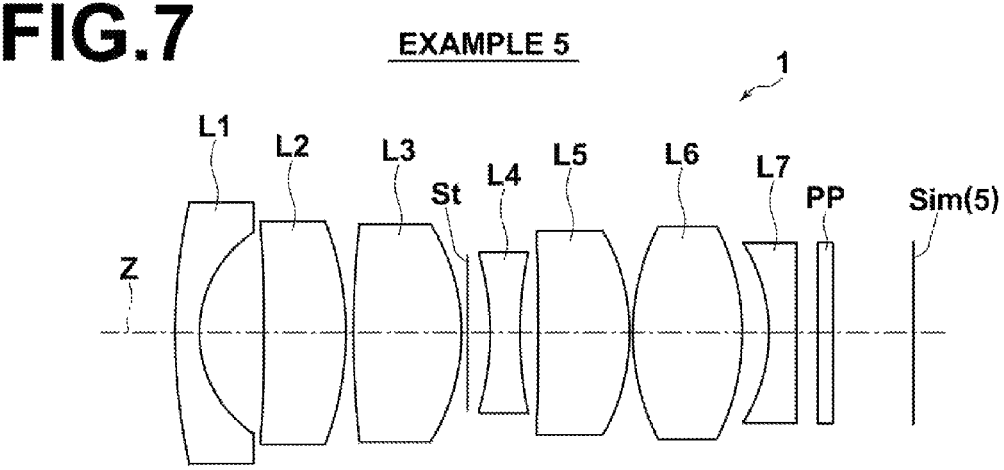
FIG.8 EXAMPLE 6
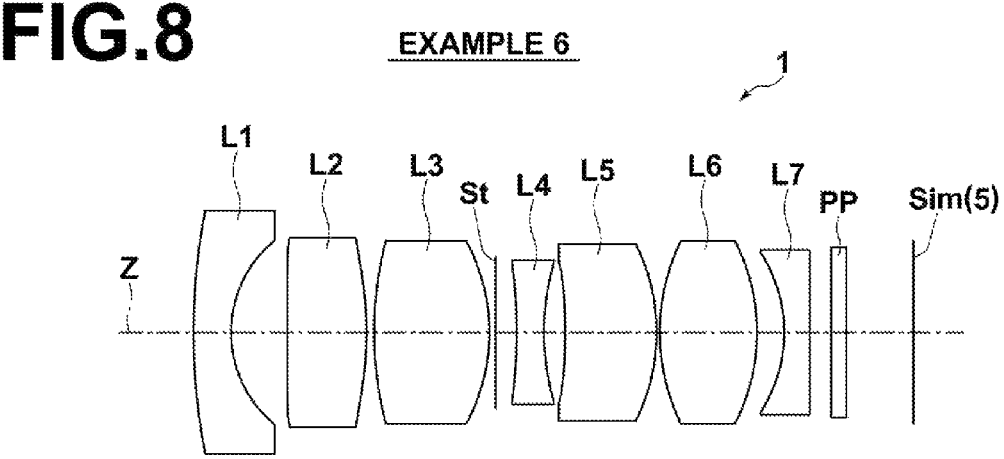
FIG.9 EXAMPLE 7
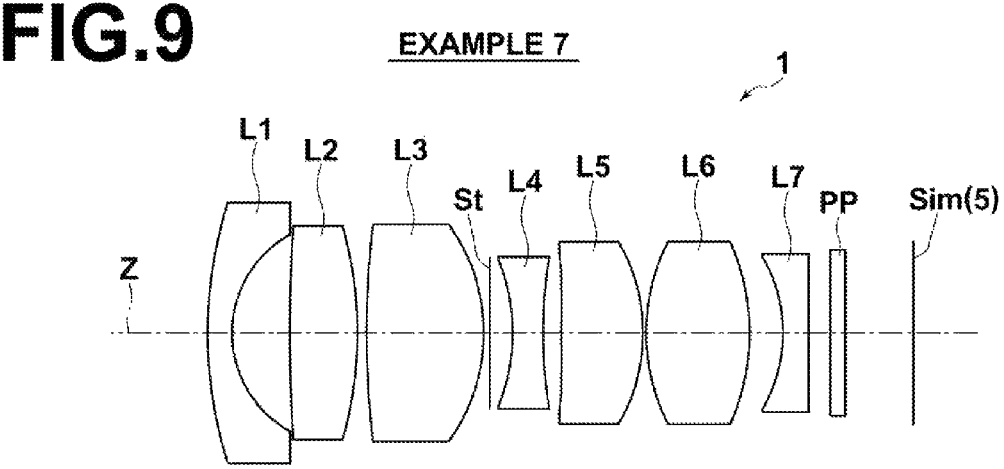

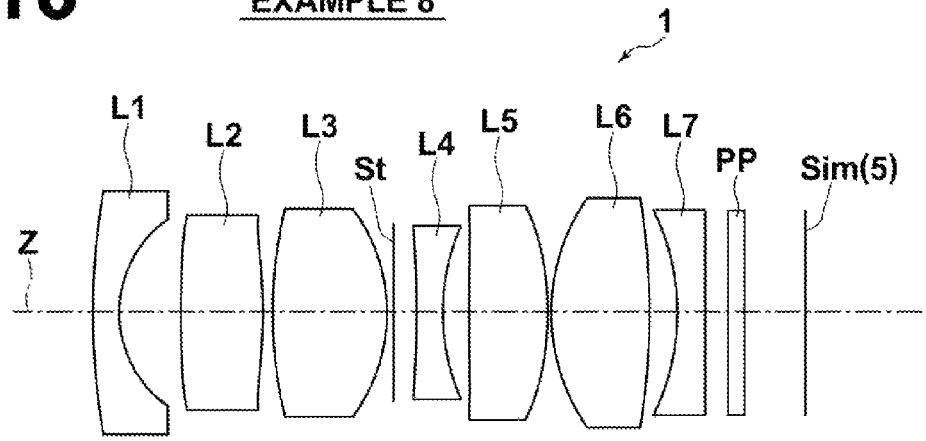
FIG.10 EXAMPLE 8
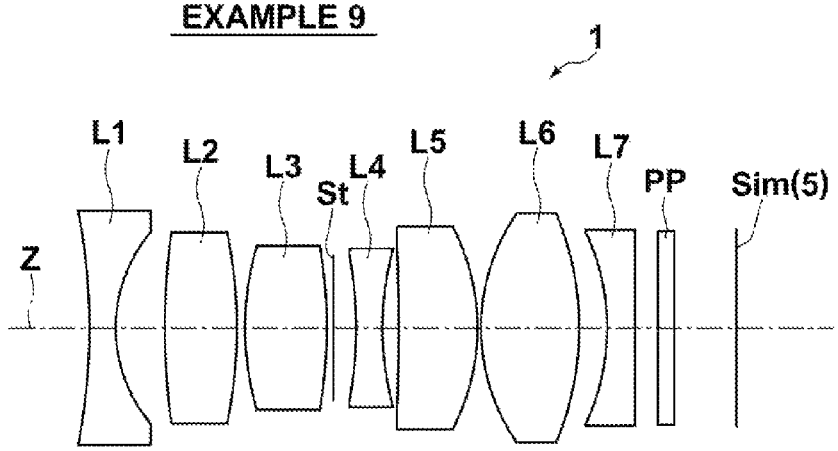
FIG.11 EXAMPLE 9
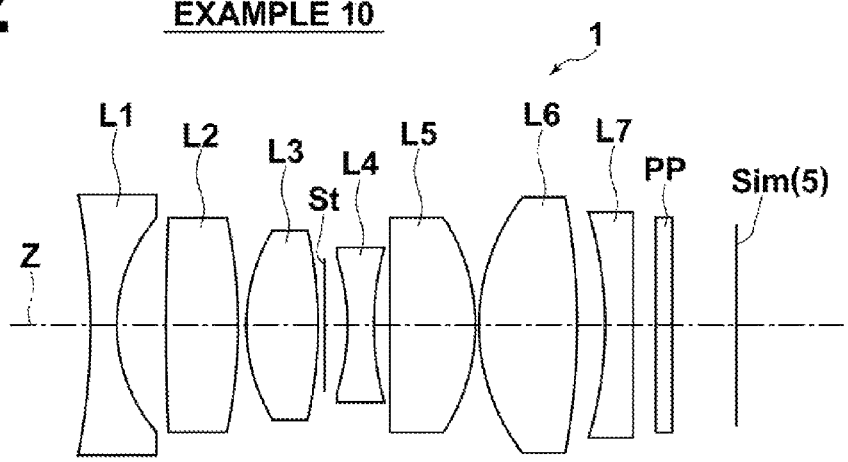
FIG.12 EXAMPLE 10

FIG.13  EXAMPLE 11
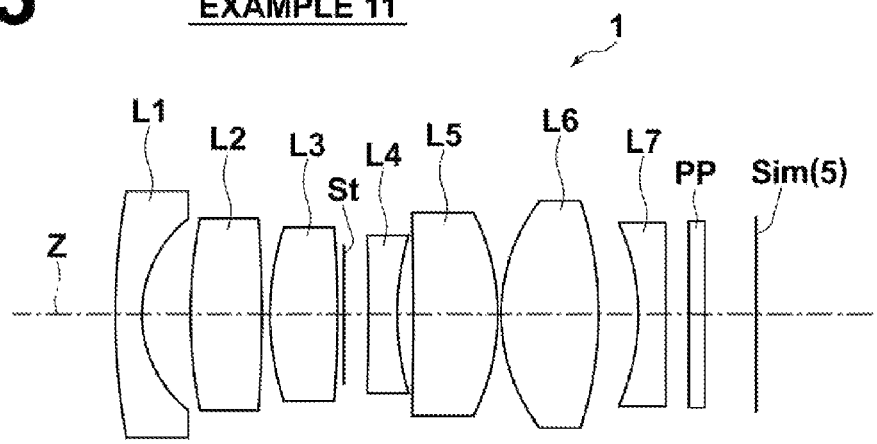
FIG.14  EXAMPLE 12
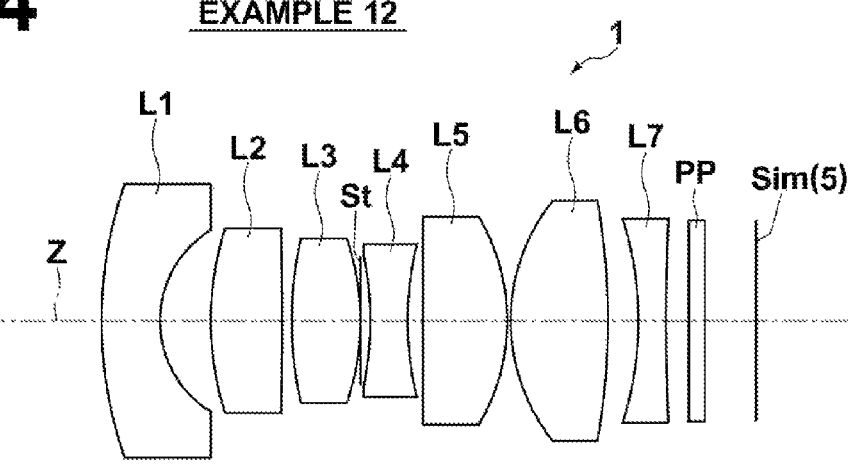
FIG.15  EXAMPLE 13
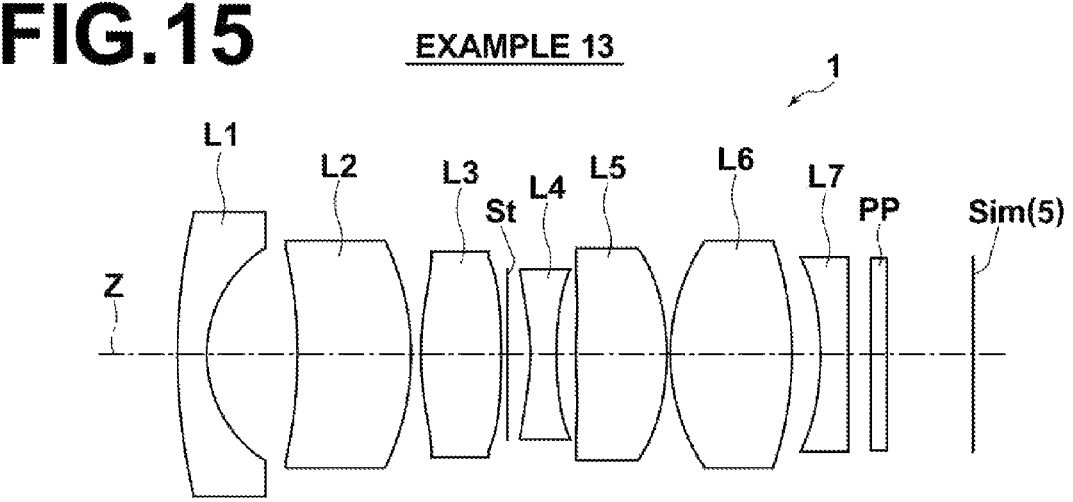

FIG.16   EXAMPLE 14
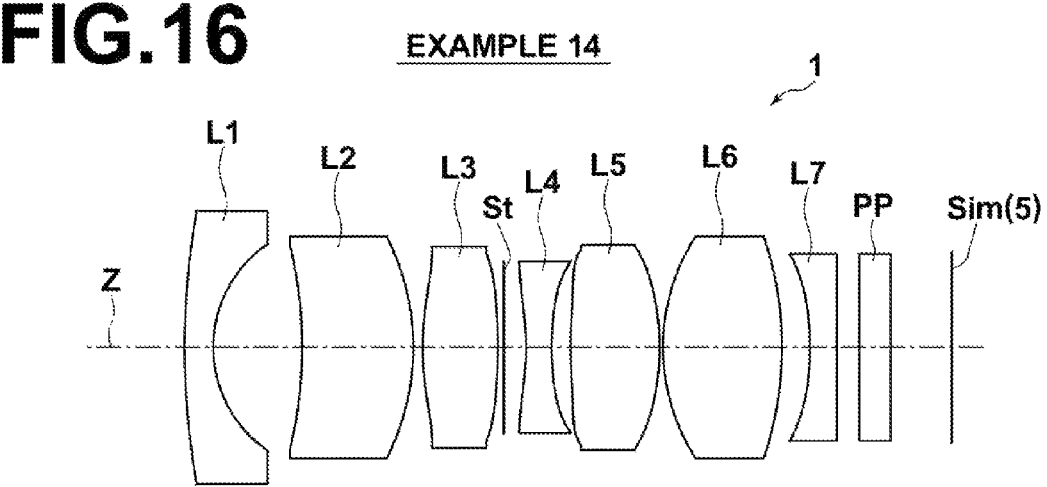
FIG.17   EXAMPLE 15
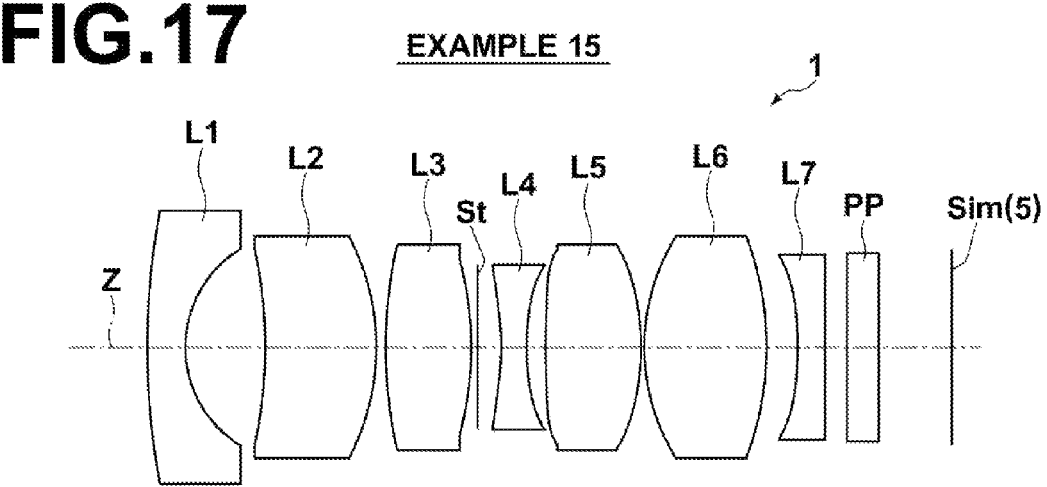
FIG.18   EXAMPLE 16
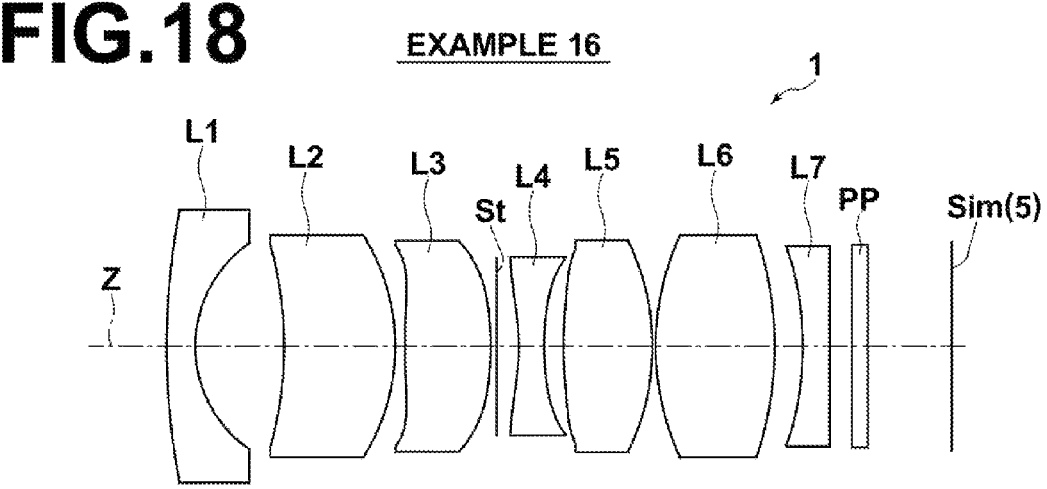

FIG.19 EXAMPLE 17
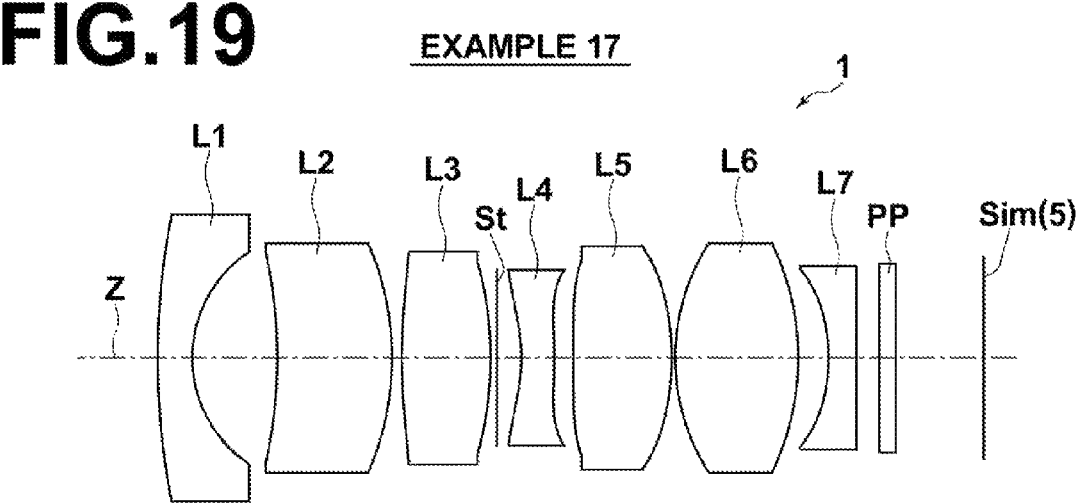
FIG.20 EXAMPLE 18
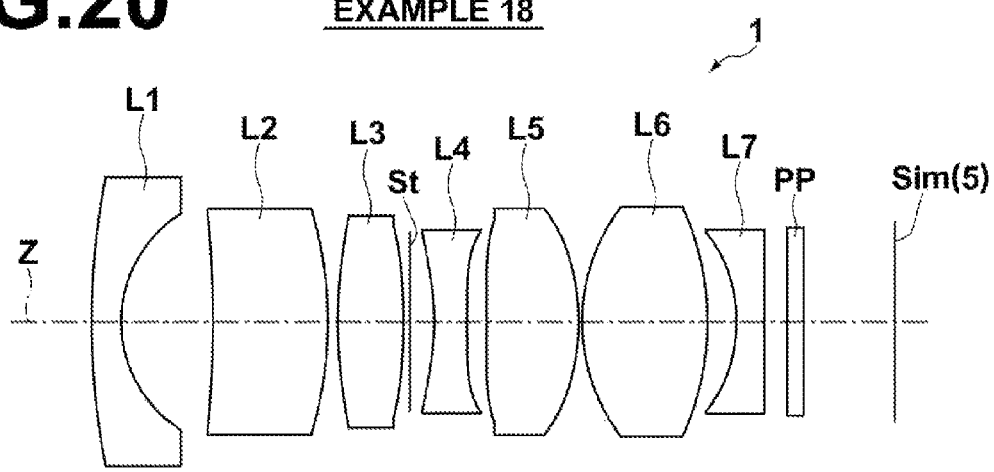
FIG.21 EXAMPLE 19
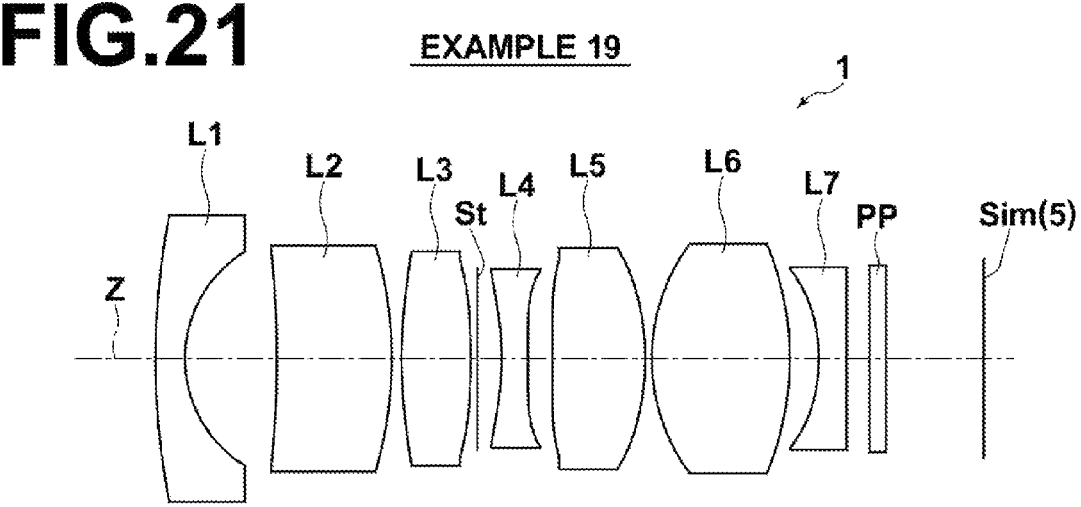

FIG.22  EXAMPLE 20
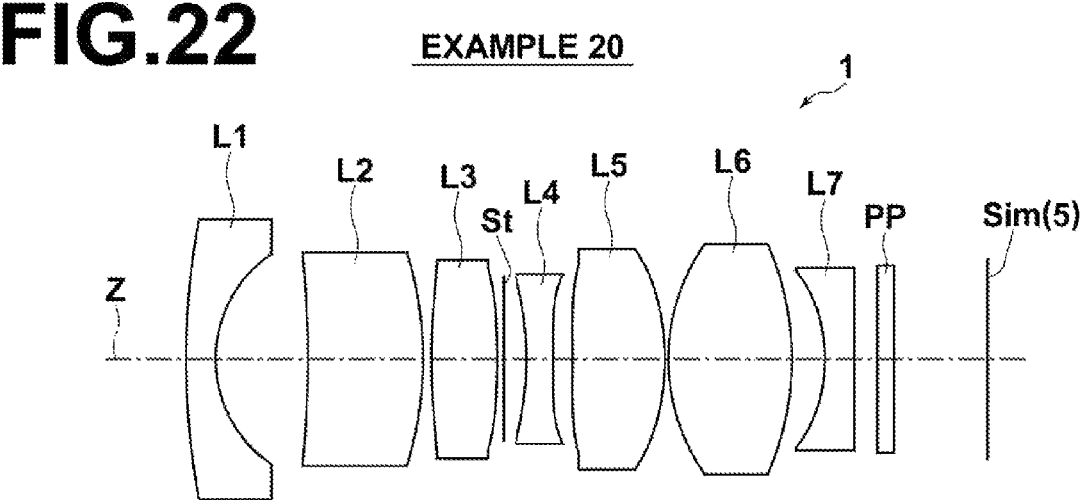
FIG.23  EXAMPLE 21
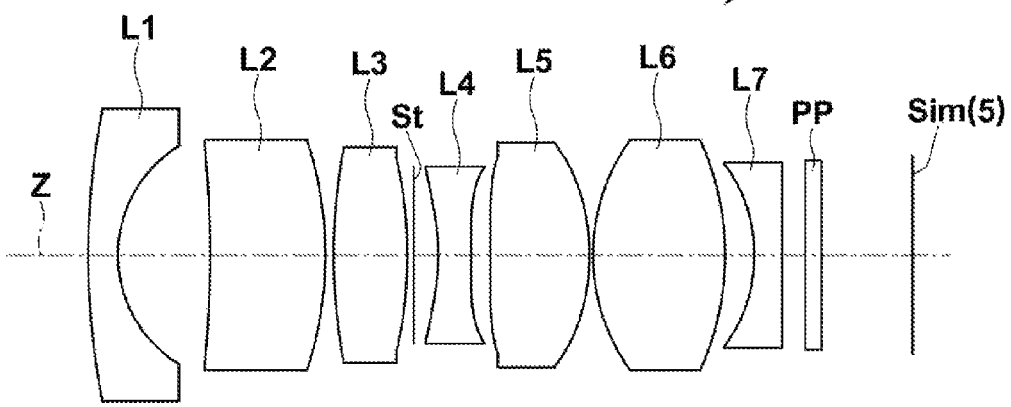
FIG.24  EXAMPLE 22
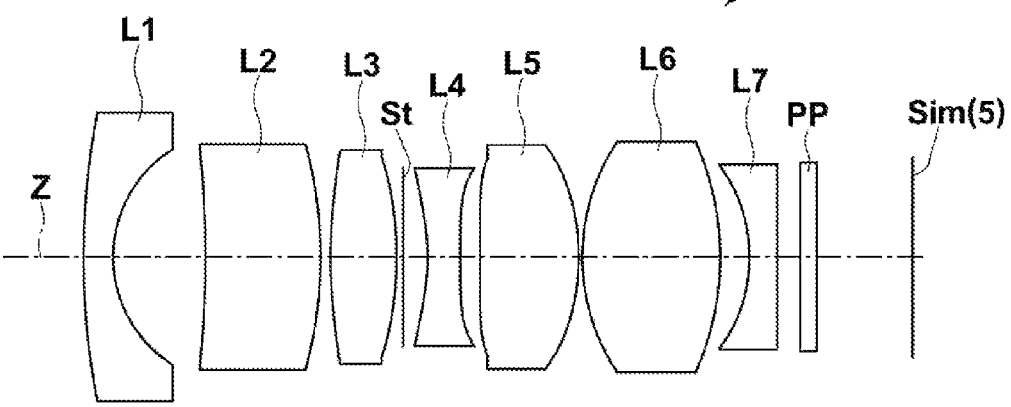

FIG.25 EXAMPLE 23
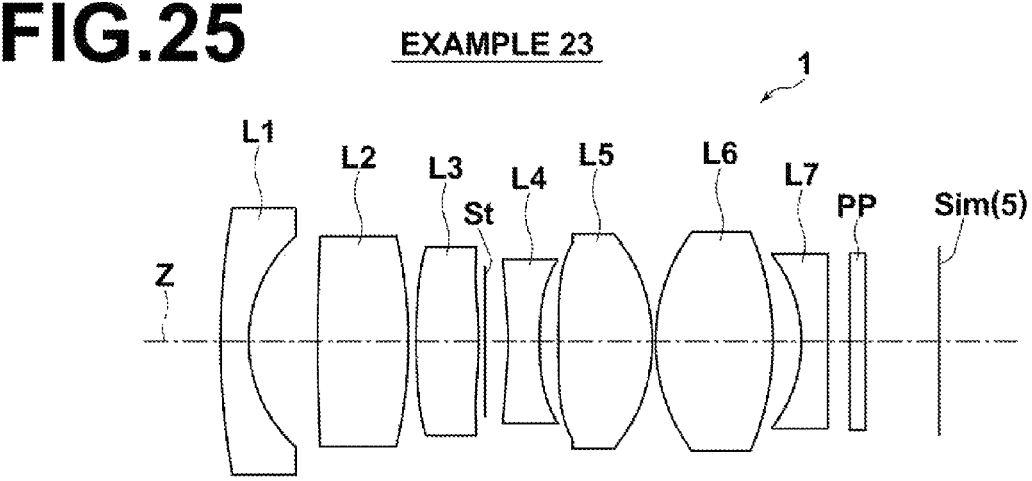
FIG.26 EXAMPLE 24
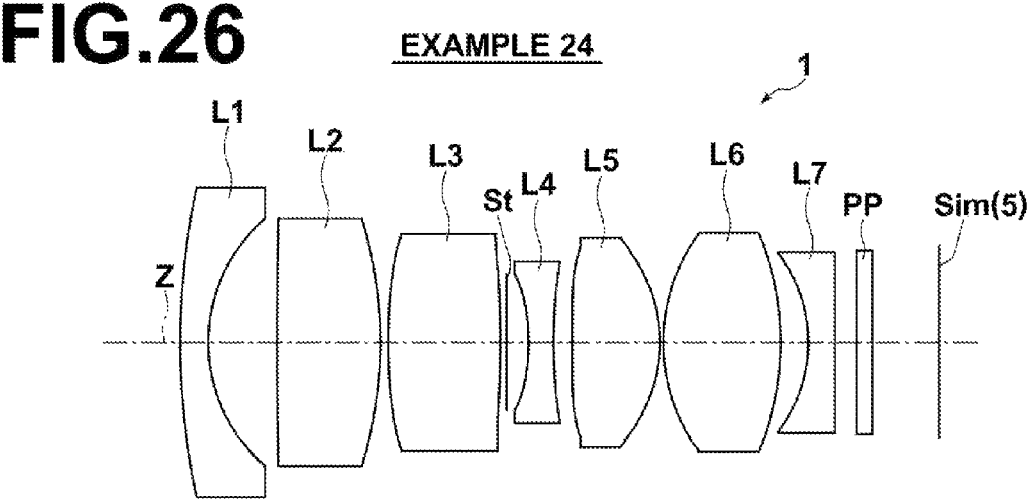
FIG.27 EXAMPLE 25
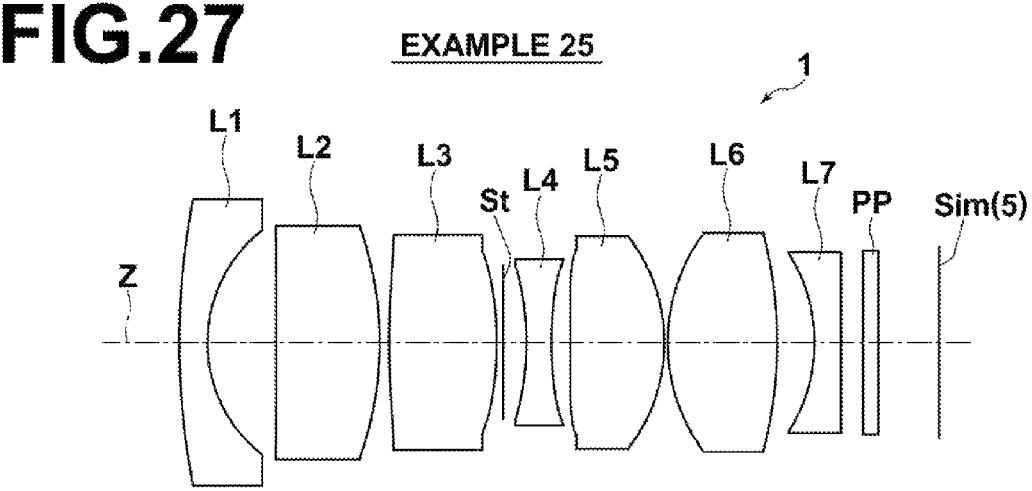

FIG.28   EXAMPLE 26
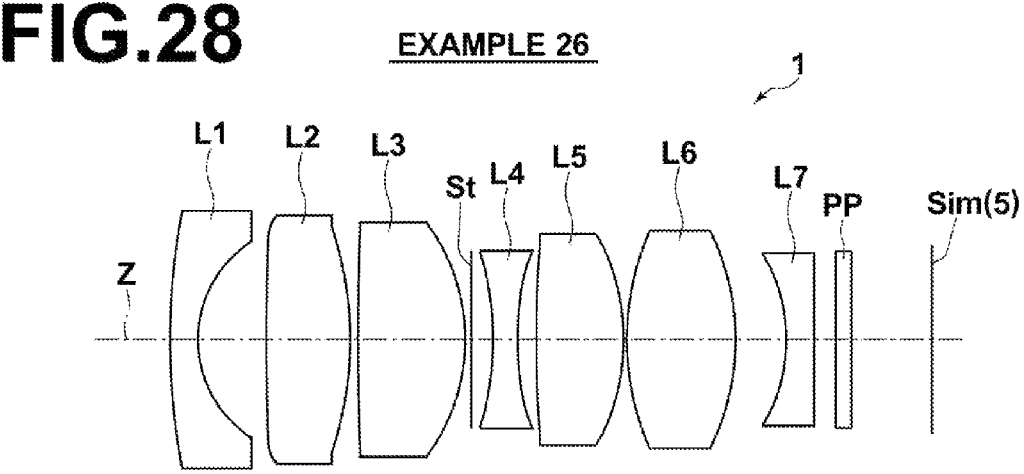
FIG.29   EXAMPLE 1
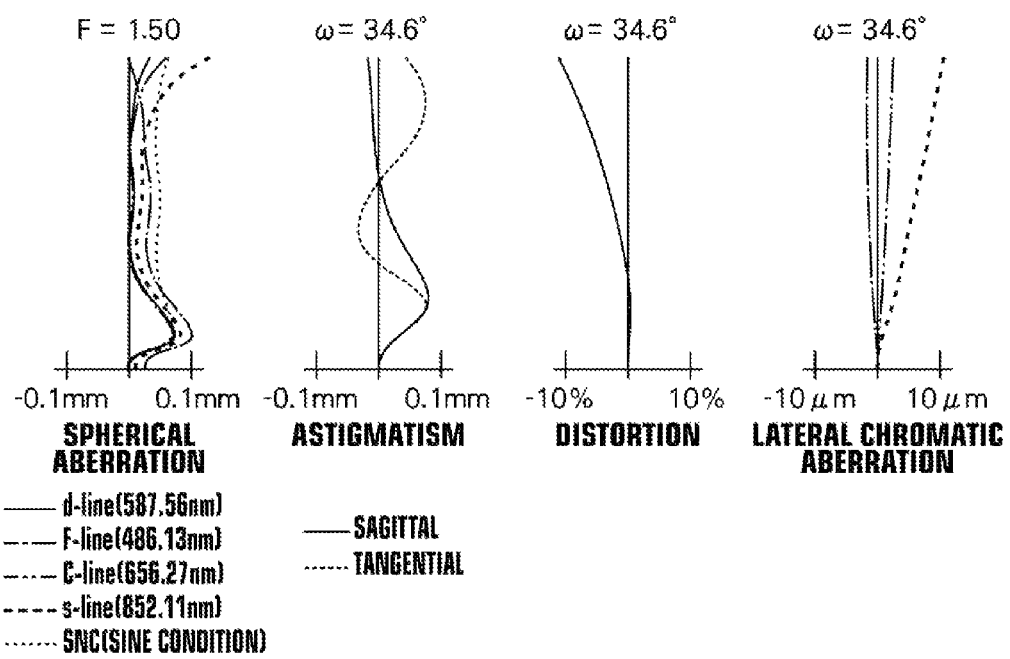

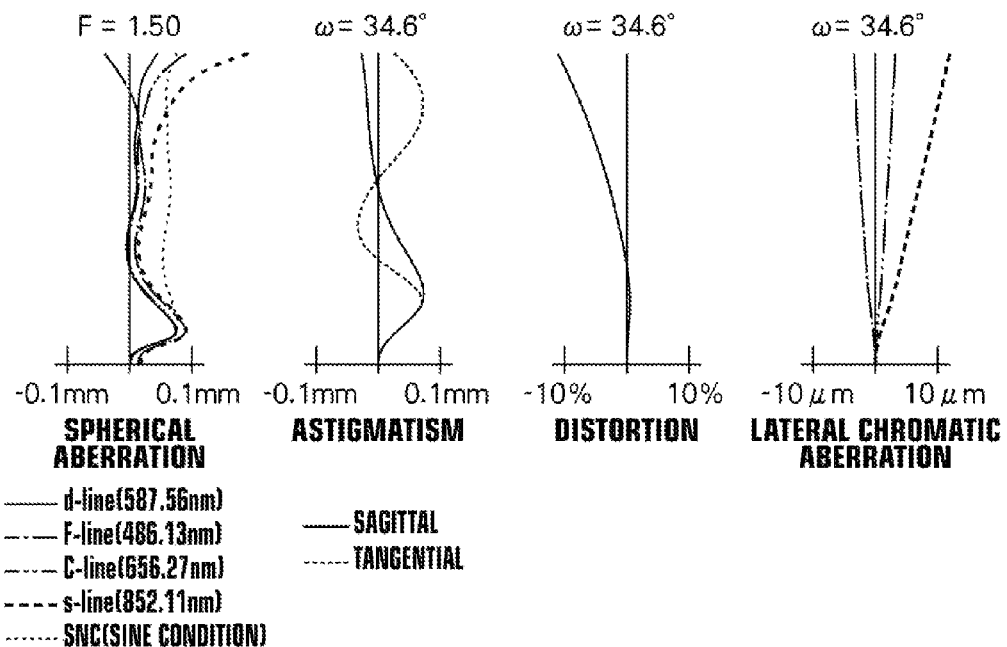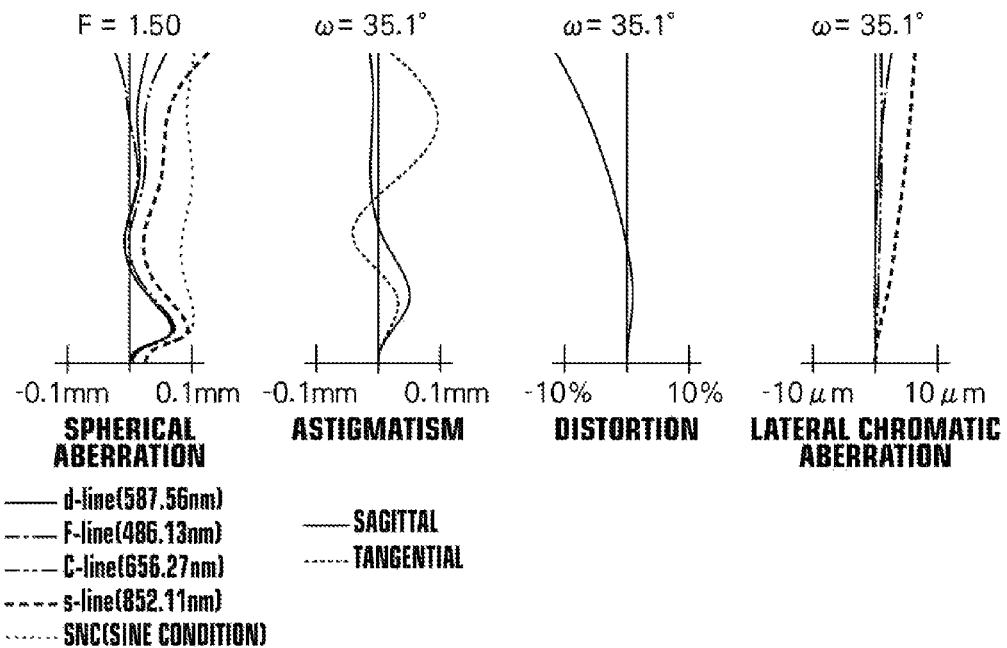

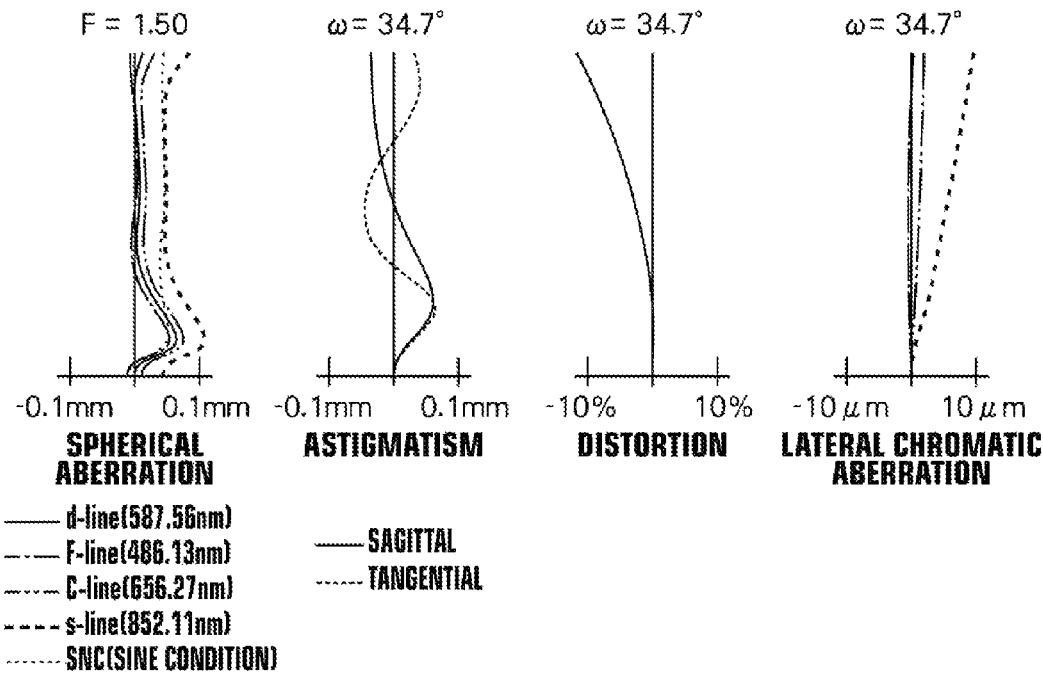
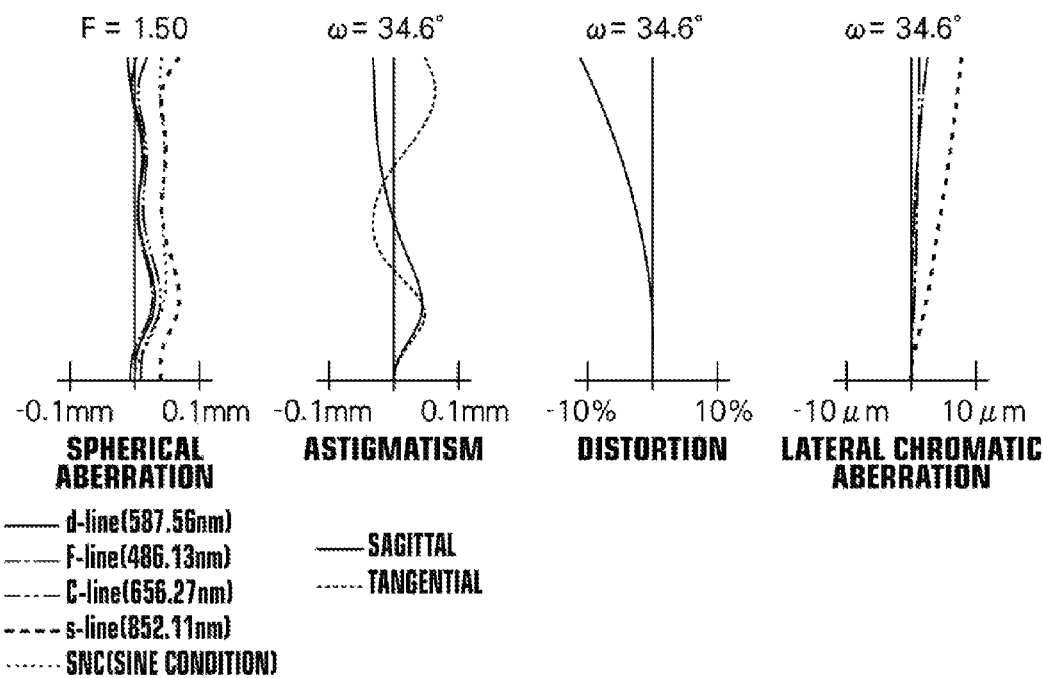

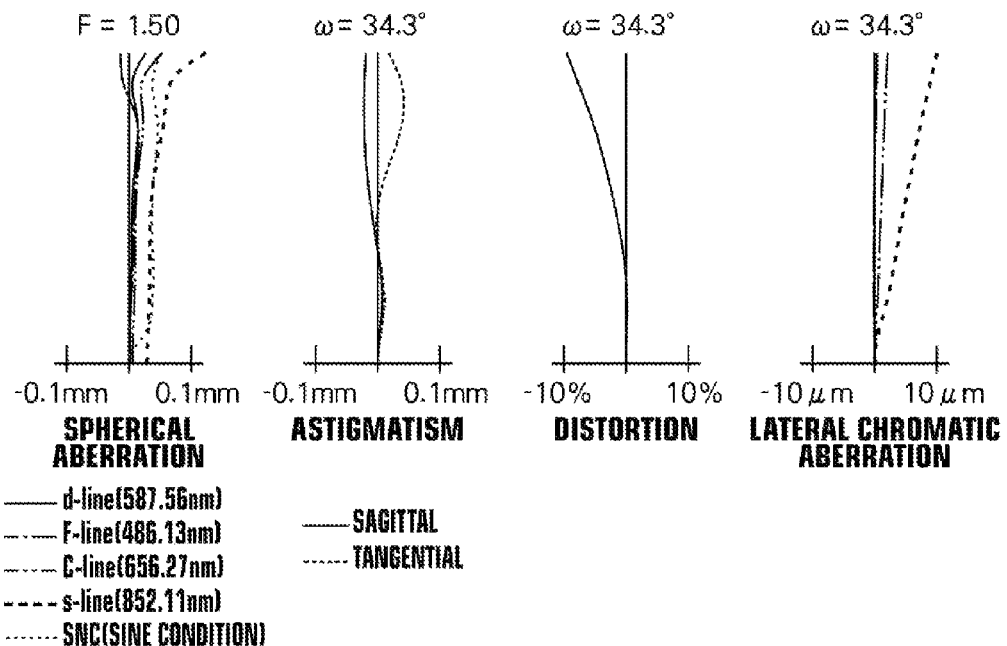
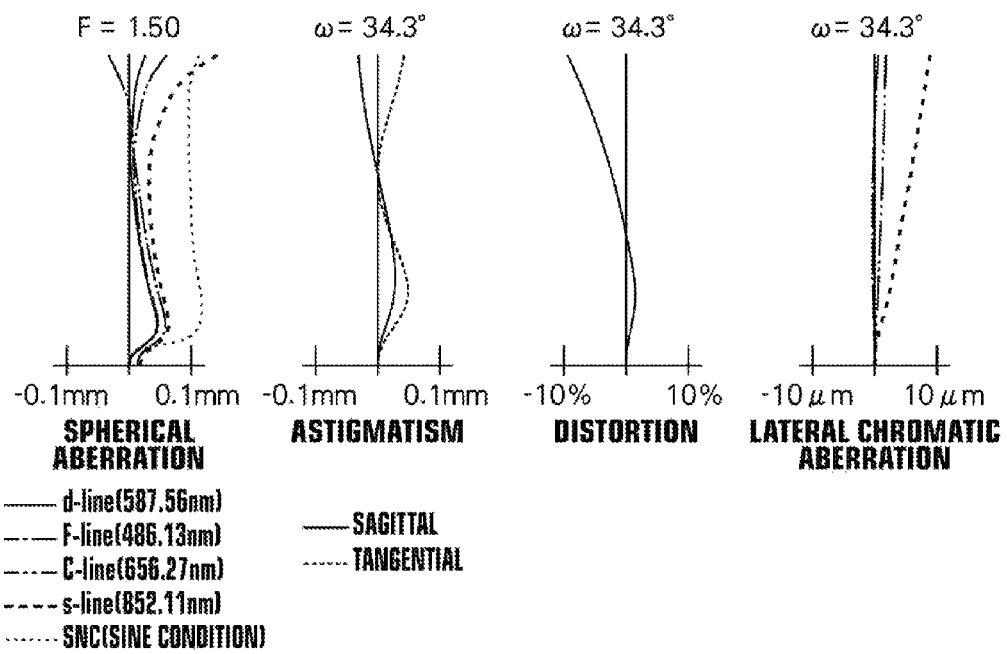

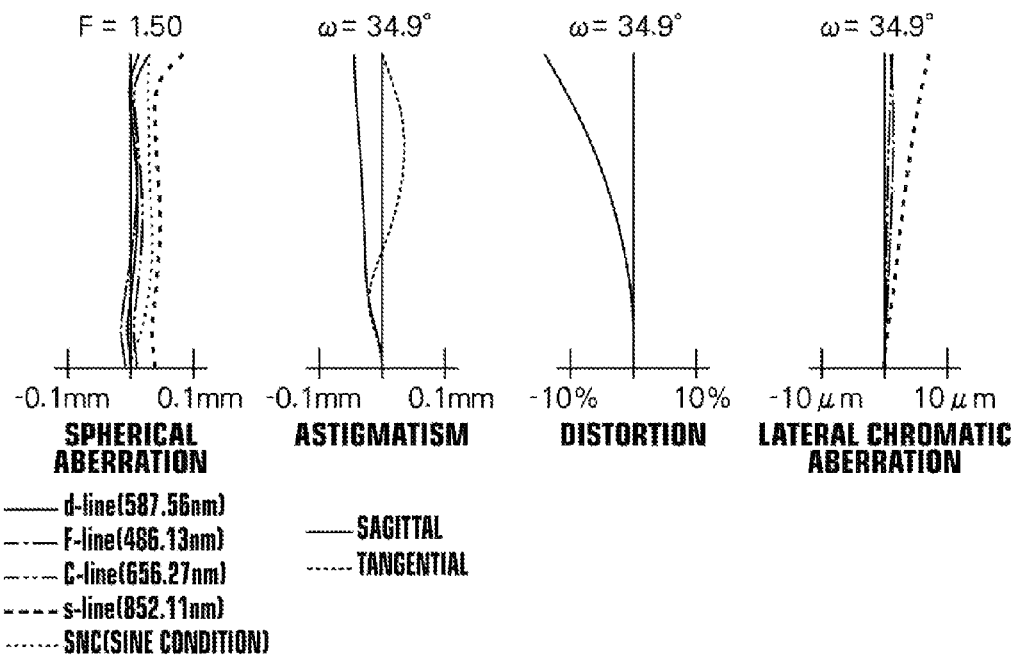
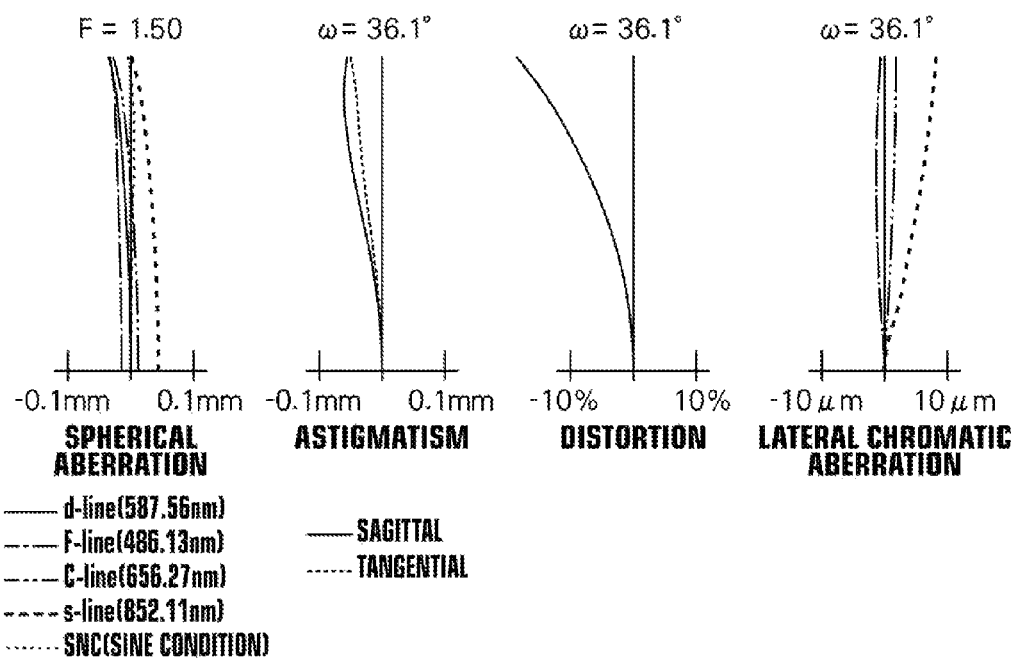

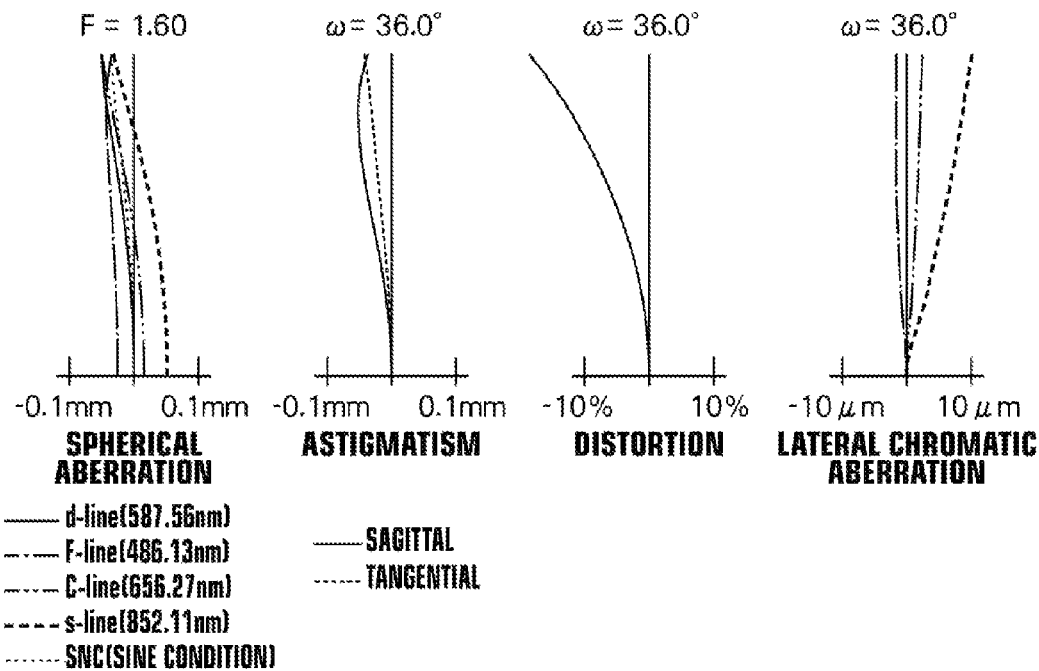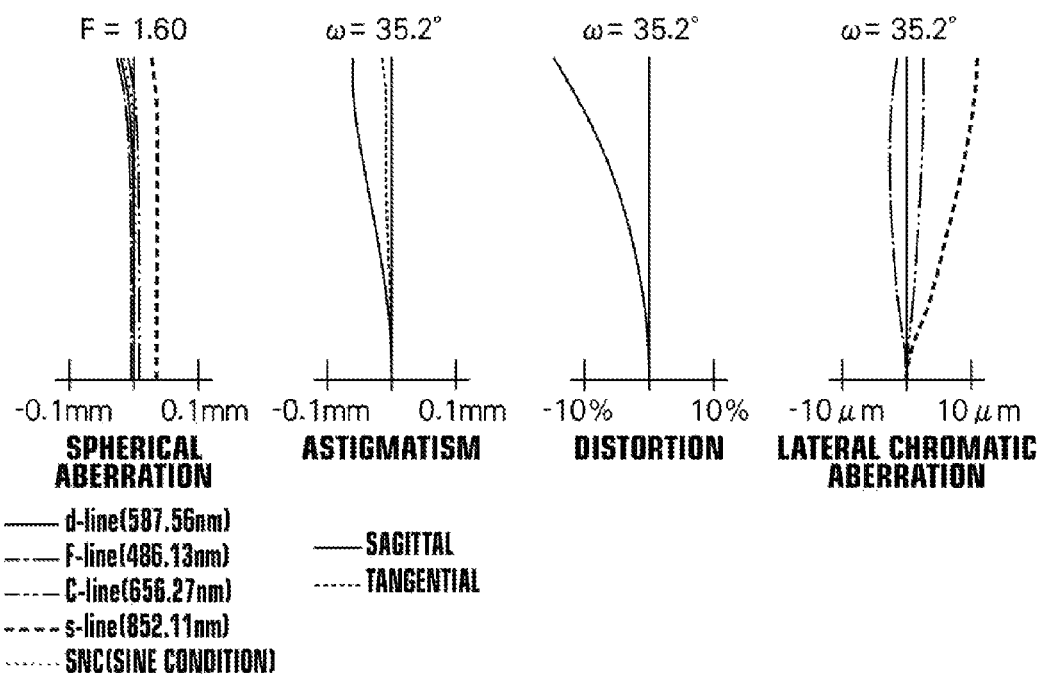

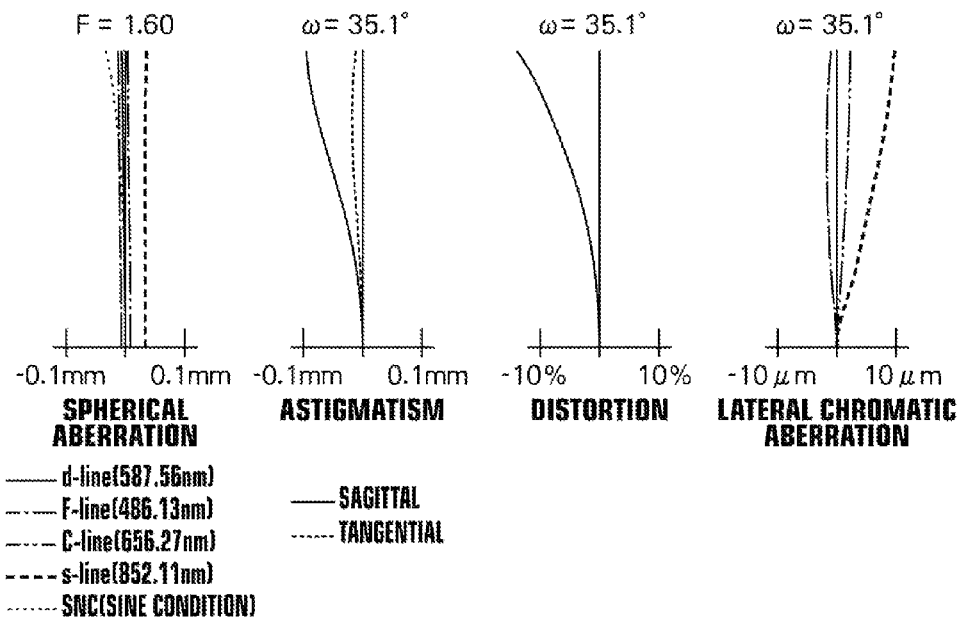
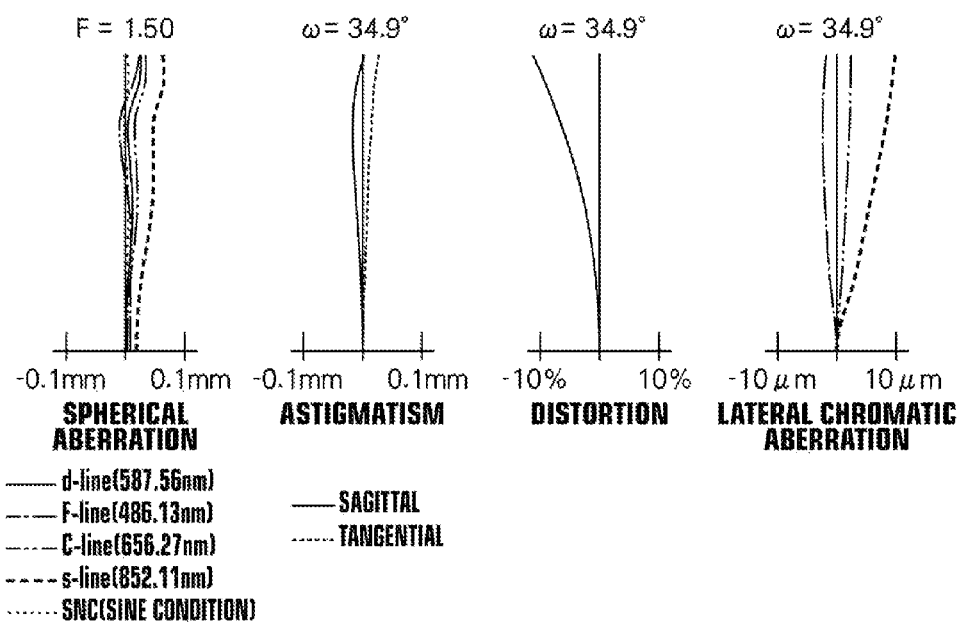

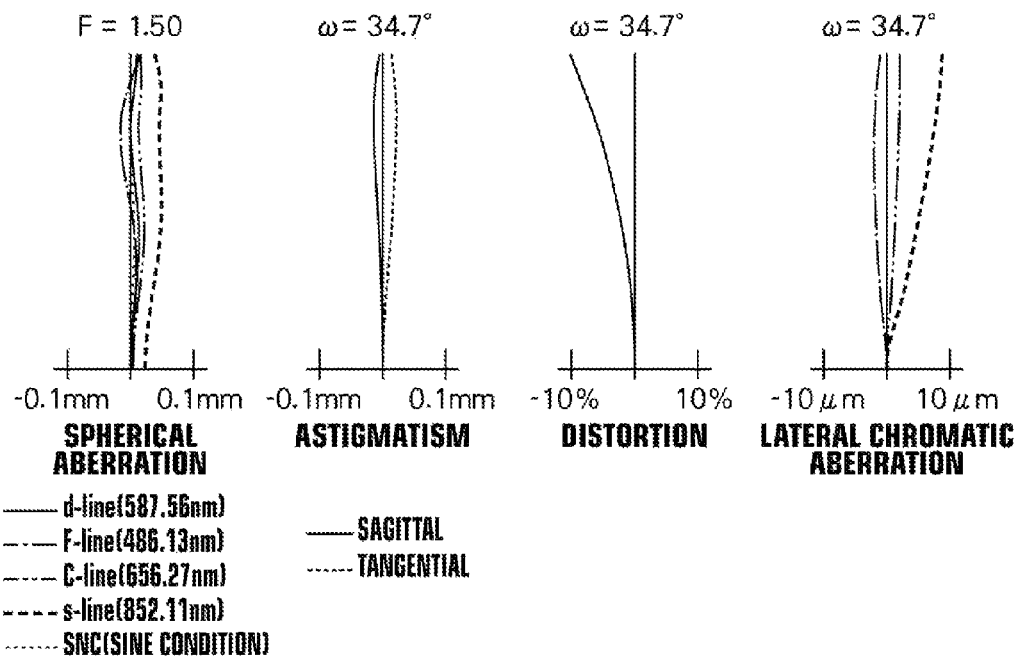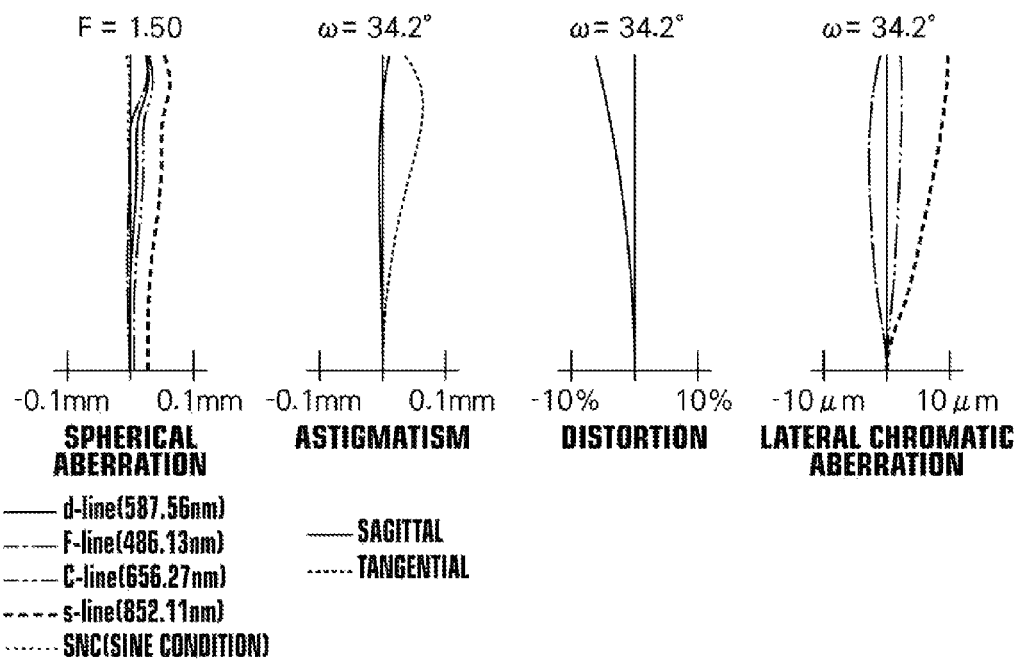

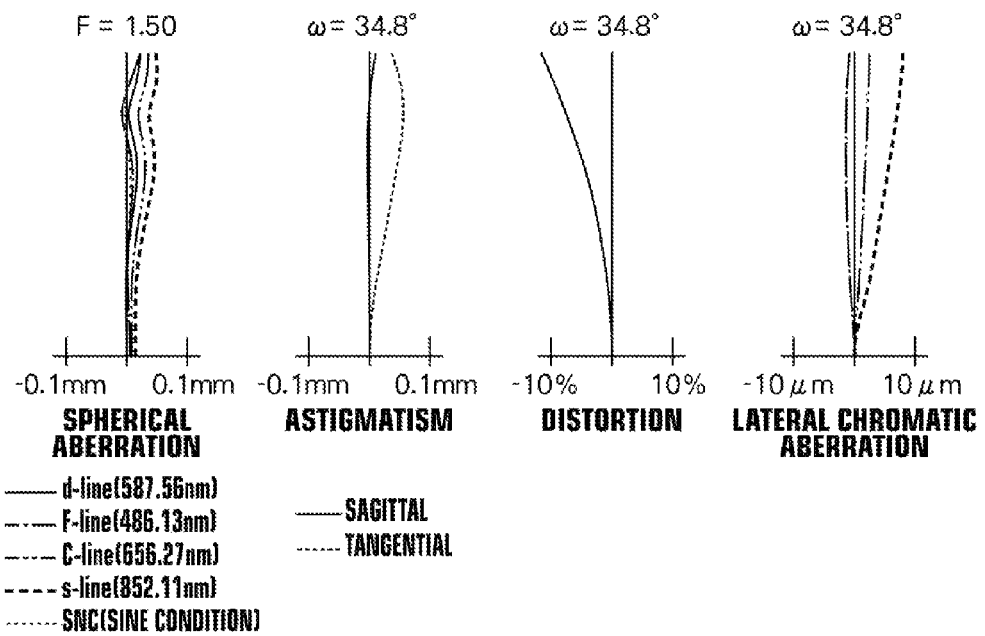
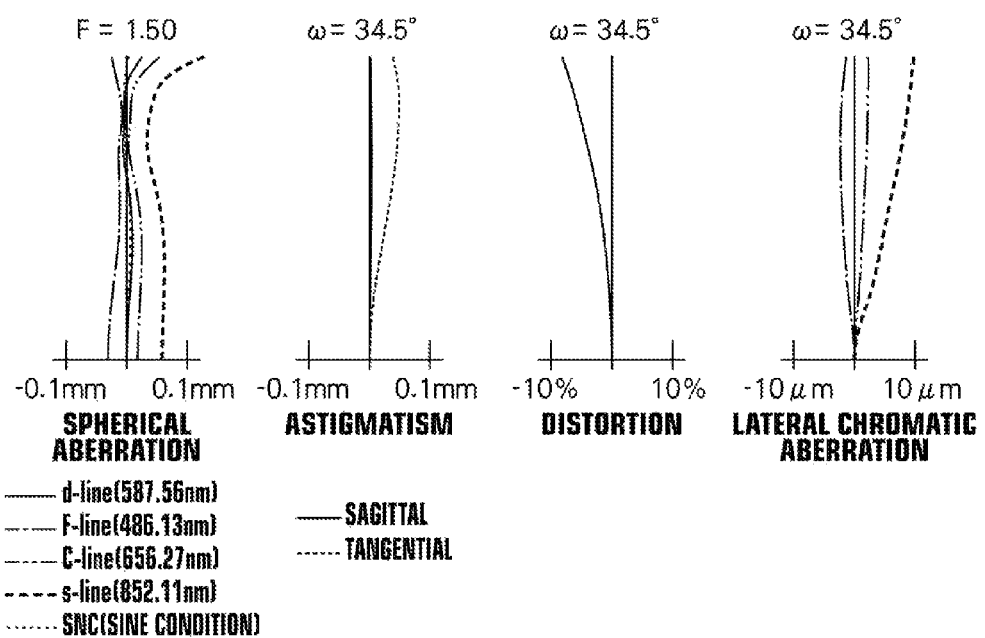

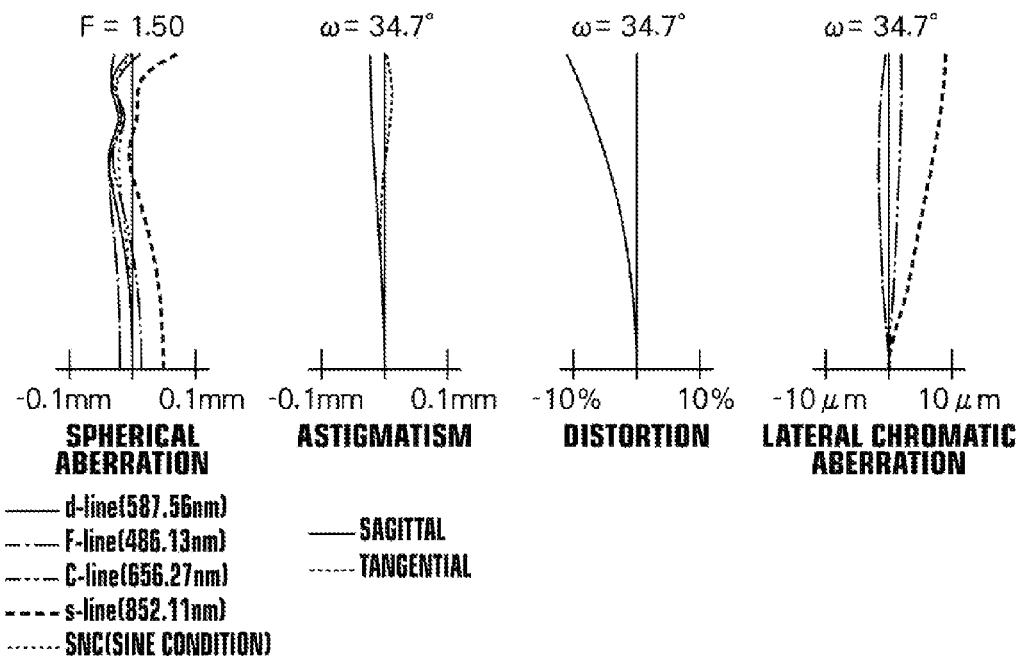
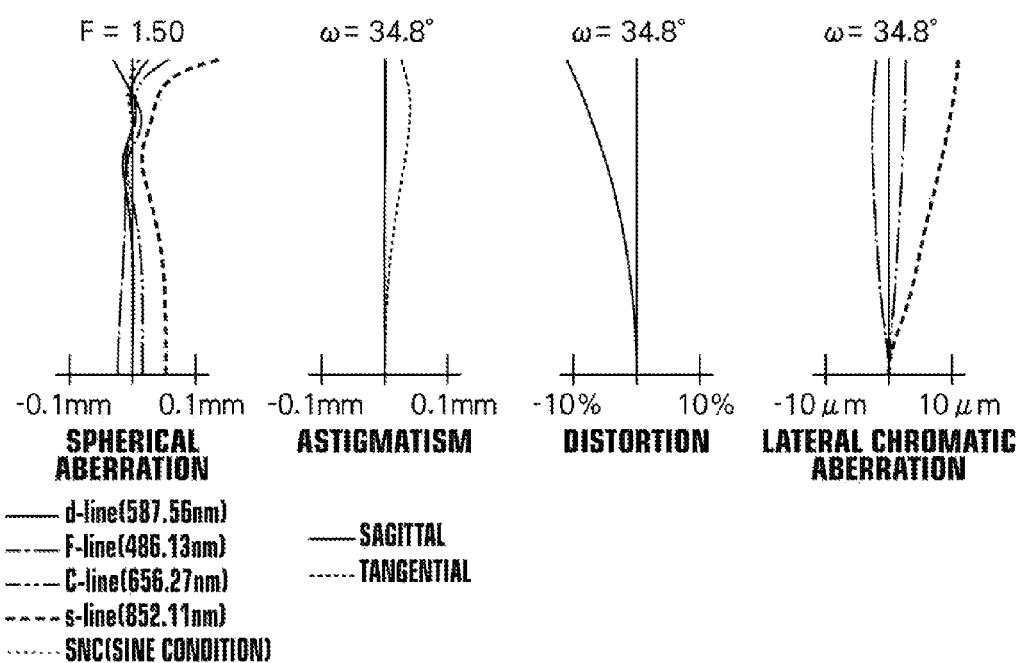

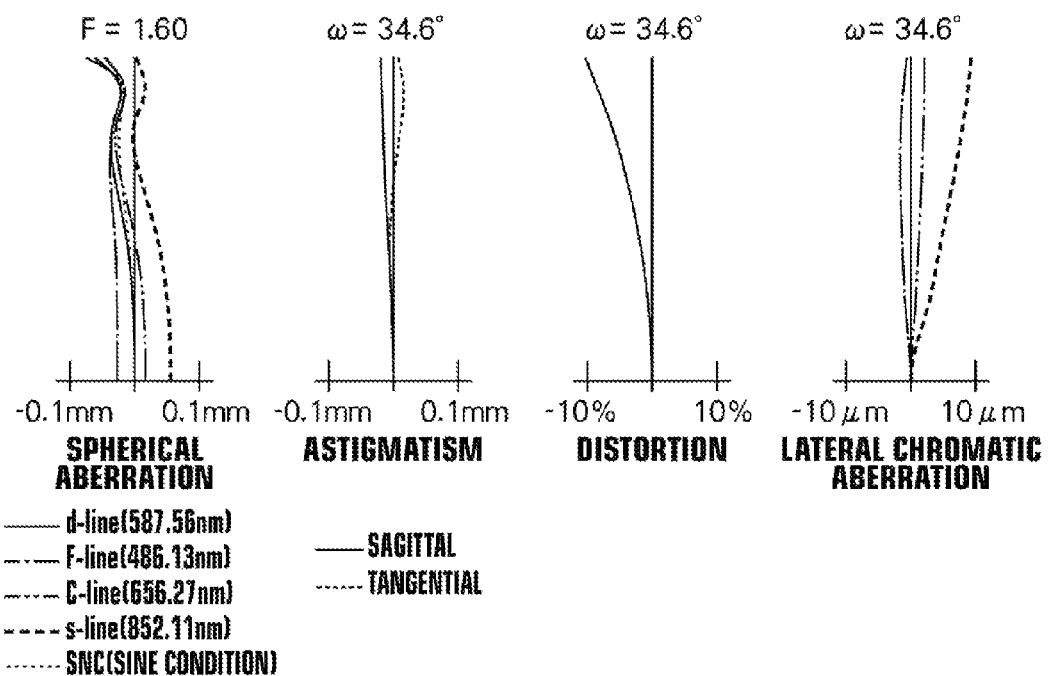
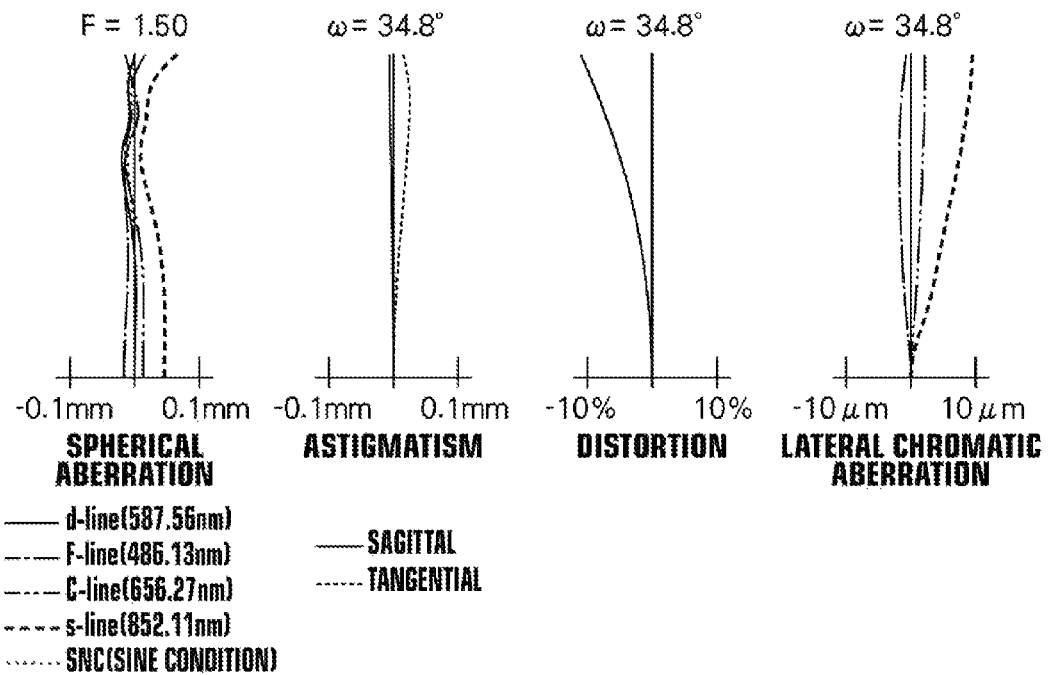

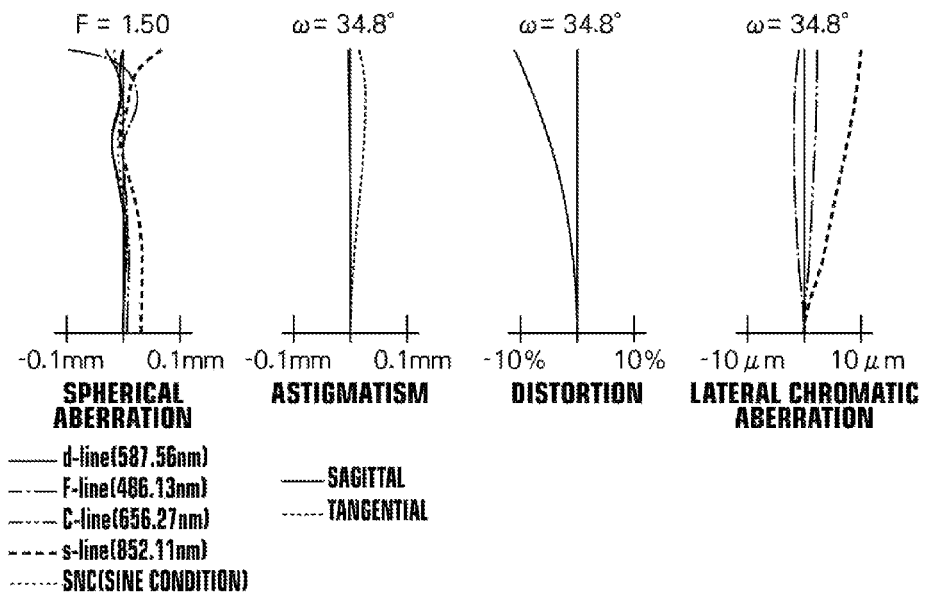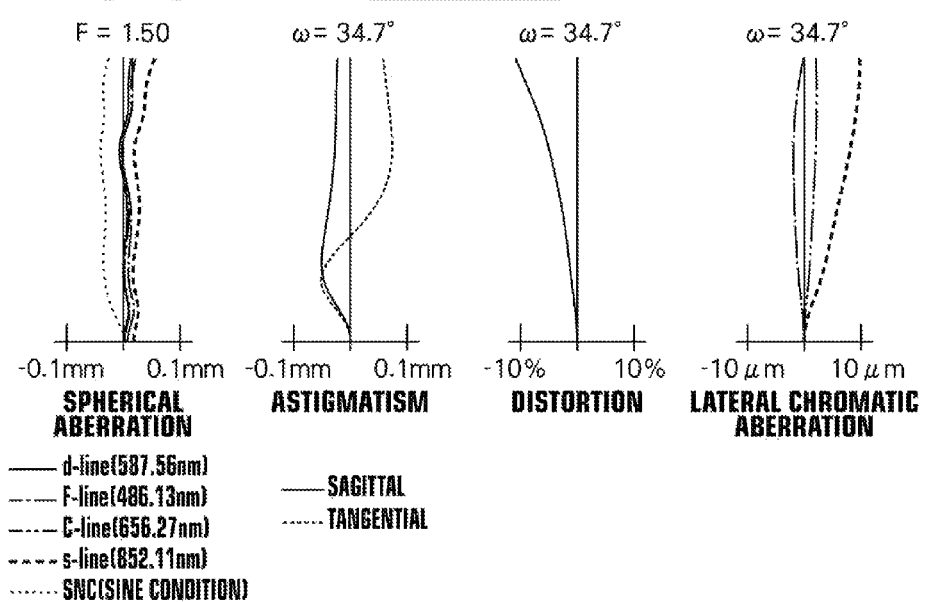

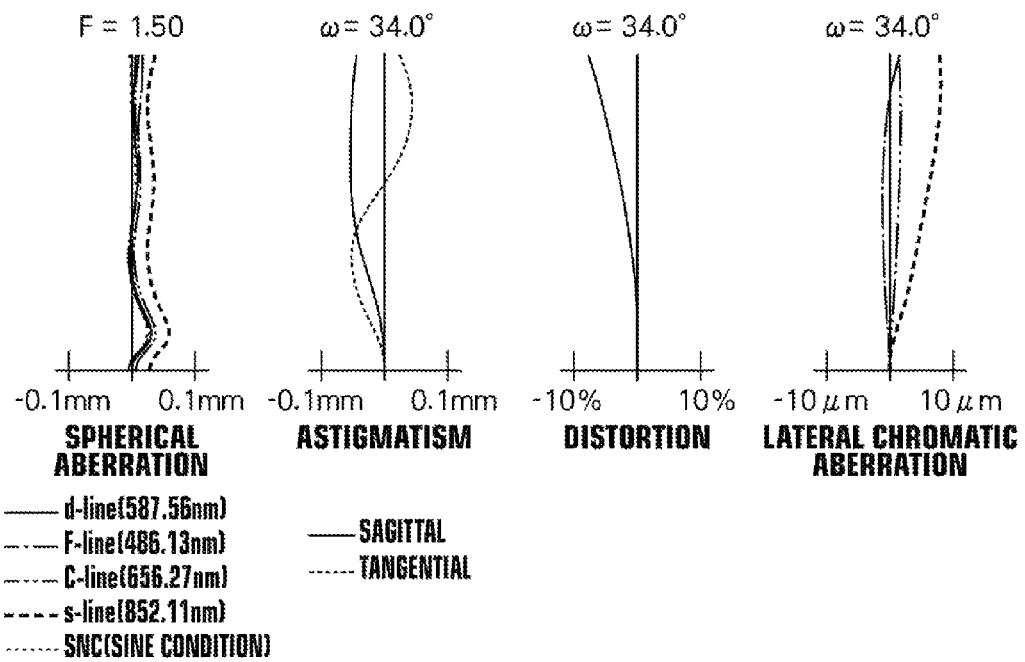
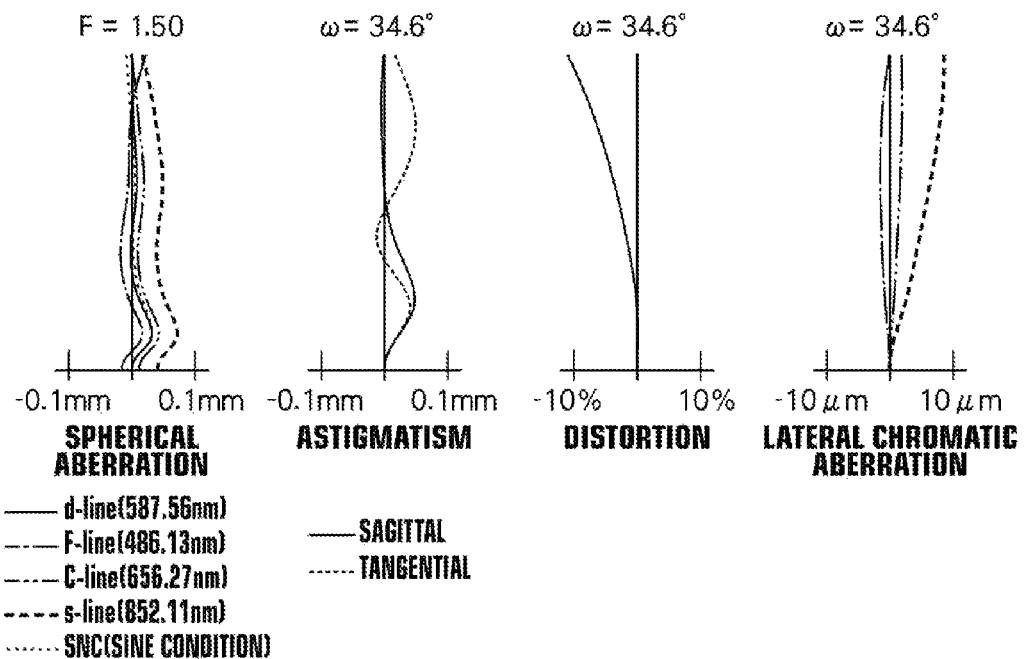

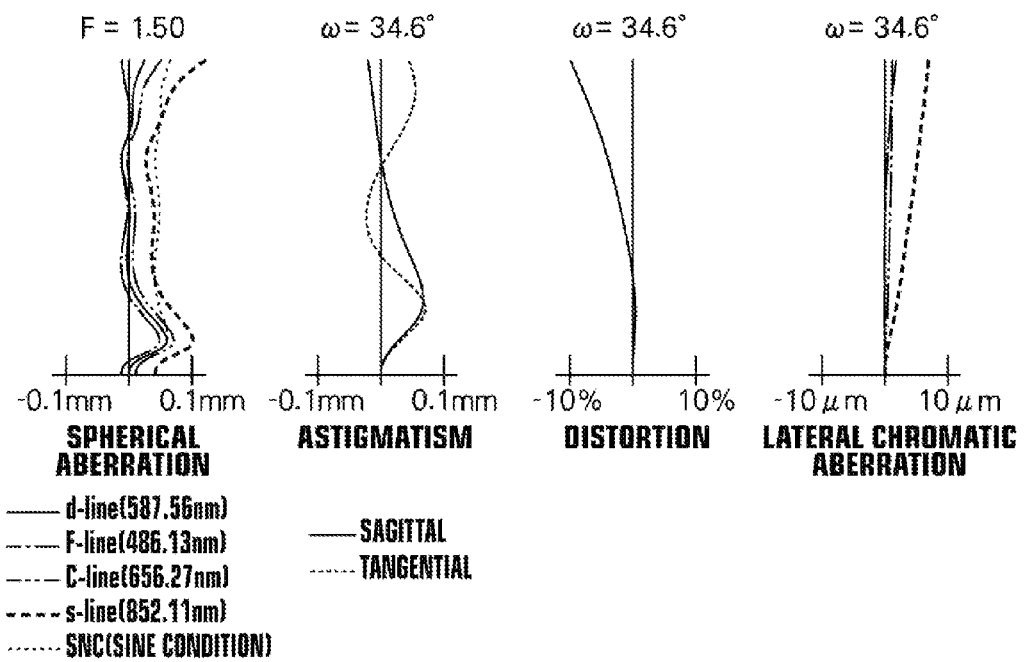
FIG.54 EXAMPLE 26
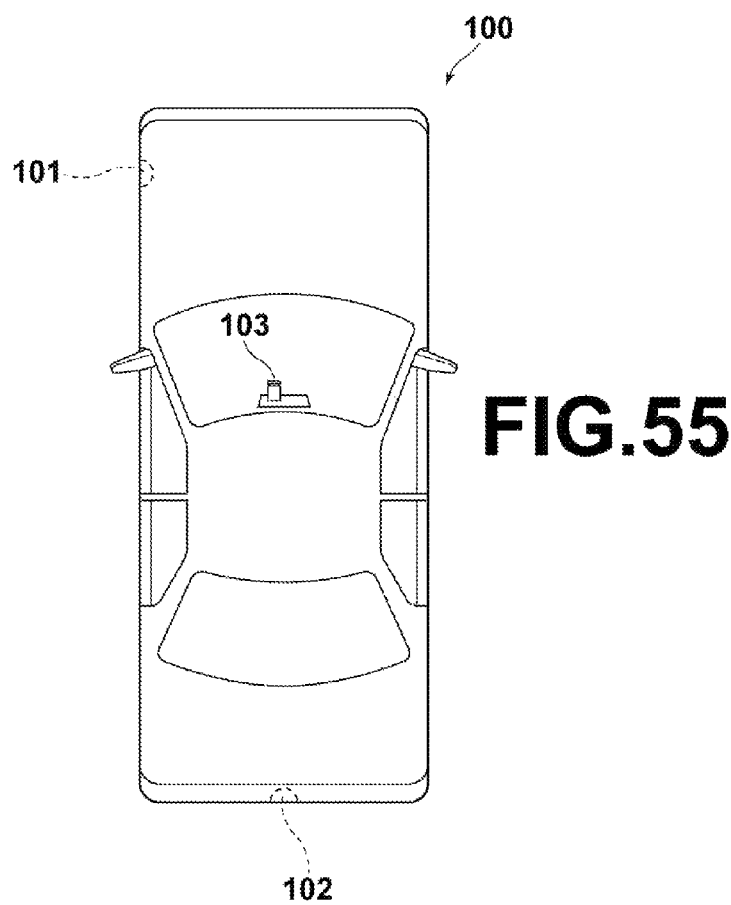
FIG.55

US 9,606,329 B2

IMAGING LENS AND IMAGING APPARATUS

CROSS-REFERENCE TO RELATED APPLICATIONS

The present application claims priority under 35 U.S.C. §119 to Japanese Patent Application No. 2014-191420, filed on Sep. 19, 2014. The above application is hereby expressly incorporated by reference, in its entirety, into the present application.

BACKGROUND

The present disclosure relates to an imaging lens and an imaging apparatus, and more particularly to an imaging lens suitable for use in a vehicle mounted camera for photographing images in the front, side, back, and the like of vehicles in particular, a portable terminal camera, and a surveillance camera that utilize image sensors such as CCD's (Charge Coupled Device), CMOS's (Complementary Metal Oxide Semiconductor), and the like as well as to an imaging apparatus equipped with this imaging lens.

In recent years, the miniaturization and the increased numbers of pixels of image sensors such as CCD's, CMOS's, and the like have been achieved. Accompanying these developments, as the bodies of imaging devices equipped with these image sensors also have achieved miniaturization, there is demand for imaging lenses to be mounted therein to be miniaturized and reduced in weight in addition to having favorable optical performance.

Meanwhile, there is demand for lenses used in a vehicle mounted camera, a portable terminal camera, a surveillance camera, and the like to have high weather resistance, to be usable in a wide temperature range from ambient temperatures in cold climates to temperatures in the interior of vehicles in summer in the tropics, to be compact, and to have high performance. In particular, there is demand for cameras, which are disposed in the interior of vehicles to surveil the front thereof, to have small F numbers and be usable in a wide wavelength range from a visible range to an infrared range so as to be used even in the night. Further, there is also demand for lens portions which are exposed to the exterior of vehicles to be small when lenses are used in vehicles mounted cameras, from the standpoint of the appearance of vehicles.

Patent Document 1 (Japanese Unexamined Patent Publication No. 2010-091697) below proposes an imaging lens of a six lens configuration, in which a negative lens, a positive lens, a positive lens, a negative lens, a positive lens, and a positive lens are disposed in order from the object side, as imaging lenses to be mounted on vehicle mounted cameras.

SUMMARY

Requirements for imaging lenses to be mounted on vehicle mounted camera, surveillance cameras, and the like are becoming rigorous year to year, and the imaging lens disclosed in Patent Document 1 is, therefore, desired to have a smaller F number and achieve higher performance.

The present disclosure has been developed in view of the foregoing circumstances. The present disclosure provides an imaging lens having a small F number and capable of achieving high performance as well as an imaging apparatus equipped with this imaging lens.

A first imaging lens of the present disclosure essentially consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein The following conditional formulae are satisfied:

$$f12/f<-3.2 \quad (1)$$

$$vd7<55 \quad (2)$$

$$40<vd3 \quad (3)$$

where,
f12 is the combined focal length of the first lens and the second lens,
f is the focal length of the entire system,
vd7 is the Abbe's number of the material for the seventh lens with respect to the d line, and
vd3 is the Abbe's number of the material for the third lens with respect to the d line.

A second imaging lens of the present disclosure essentially consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein the following conditional formulae are satisfied:

$$f12/f<-3.2 \quad (1)$$

$$D4/f<0.39 \quad (4)$$

where,
f12 is the combined focal length of the first lens and the second lens,
f is the focal length of the entire system, and
D4 is the air space between the second lens and the third lens.

A third imaging lens of the present disclosure essentially consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein the following conditional formulae are satisfied:

$$vd7<55 \quad (2)$$

$$-0.93<(R3+R4)/(R3-R4) \quad (5)$$

where,
vd7 is the Abbe's number of the material for the seventh lens with respect to the d line,
R3 is the radius of curvature of the object-side surface of the second lens, and
R4 is the radius of curvature of the image-side surface of the second lens.

Note that the above expression "essentially consisting of" means that the imaging lens of the present disclosure may also include lenses that practically have no power, optical elements other than lenses such as a stop and a cover glass, and mechanical components such as lens flanges, a lens barrel, a camera shake correcting mechanism, etc., in addition to the lenses listed as constituent elements.

Further, in the present disclosure, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present disclosure, the sign of the radius of curvature is positive in the case that a surface shape is convex on the object side, and negative in the case that the surface shape is convex on the image side. The expression "the center of the lens surface has a positive power" intends to mean that a value of a paraxial radius of curvature is such that the lens surface forms a convex surface. Further, the expression "the center of the lens surface has a negative power" intends to mean that a value of a paraxial radius of curvature is such that the lens surface forms a concave surface.

In the first through third imaging lenses of the present disclosure described above, it is preferable for the following conditional formulae (8), and (13) through (23) to be satisfied. Note that preferably, the imaging lens may have a configuration in which any one of the following conditional formulae (8), and (13) through (23) is satisfied, or may have a configuration in which an arbitrary combination of two or more of the conditional formulae are satisfied.

$$-5.0<(R14+R15)/(R14-R15)<-0.01 \quad (8)$$

$$25<vd5 \quad (13)$$

$$0.5<f3/f<10 \quad (14)$$

$$0.5<f2/f<7 \quad (15)$$

$$f1/f<-0.25 \quad (16)$$

$$0.3<f123/f<15 \quad (17)$$

$$0.5<f234/f<18 \quad (18)$$

$$0.5<f12345/f<10 \quad (19)$$

$$0.4<f2345/f<10 \quad (20)$$

$$0.1<f3456/f<5.0 \quad (21)$$

$$-4.0<(R8+R9)/(R8-R9)<4.0 \quad (22)$$

$$-3<f/f45<3 \quad (23)$$

where,
f is the focal length of the entire system,
f1 is the focal length of the first lens,
f2 is the focal length of the second lens,
f3 is the focal length of the third lens,
f45 is the combined focal length of the fourth lens and the fifth lens,
f123 is the combined focal length of the first lens, the second lens, and the third lens,
f234 is the combined focal length of the second lens, the third lens, and the fourth lens,
f345 is the combined focal length of the third lens, the fourth lens, and the fifth lens,
f2345 is the combined focal length of the second lens, the third lens, the fourth lens, and the fifth lens,
f3456 is the combined focal length of the third lens, the fourth lens, the fifth lens, and the sixth lens,
f12345 is the combined focal length of the first lens, the second lens, the third lens, the fourth lens, and the fifth lens,
vd5 is the Abbe's number of the material for the fifth lens with respect to the d line,
R8 is the radius of curvature of the object-side surface of the fourth lens,
R9 is the radius of curvature of the image-side surface of the fourth lens,
R14 is the radius of curvature of the object-side surface of the seventh lens, and
R15 is the radius of curvature of the image-side surface of the seventh lens.

An imaging apparatus of the present disclosure is equipped with at least one of the first through third imaging lenses of the present disclosure described above.

According to the first imaging lens of the present disclosure, a power arrangement, and the like in the entire system are suitably set in the lens system constituted by seven lenses, and conditional formulae (1) through (3) are satisfied. This realizes a compact imaging lens having a small F value and capable of obtaining favorable optical performance.

Accordingly to the second imaging lens of the present disclosure, a power arrangement, and the like in the entire system are suitably set in the lens system constituted by seven lenses, and conditional formulae (1) and (4) are satisfied. This realizes a compact imaging lens having a small F value and capable of obtaining favorable optical performance.

Accordingly to the third imaging lens of the present disclosure, a power arrangement, and the like in the entire system are suitably set in the lens system constituted by seven lenses, and conditional formulae (2) and (5) are satisfied. This realizes a compact imaging lens having a small F value and capable of obtaining favorable optical performance.

According to the imaging apparatus of the present disclosure, the imaging apparatus is provided with the imaging lens of the present disclosure. This enables the imaging apparatus to be configured in a small size, to perform photography even under low illuminance conditions, and to obtain favorable images having high resolution with various aberrations corrected.

BRIEF DESCRIPTION OF THE DRAWINGS

FIG. 4 is a cross-sectional view illustrating the lens configuration of an imaging lens of Example 2 of the present disclosure.

FIG. 5 is a cross-sectional view illustrating the lens configuration of an imaging lens of Example 3 of the present disclosure.

FIG. 6 is a cross-sectional view illustrating the lens configuration of an imaging lens of Example 4 of the present disclosure.

FIG. 7 is a cross-sectional view illustrating the lens configuration of an imaging lens of Example 5 of the present disclosure.

FIG. 8 is a cross-sectional view illustrating the lens configuration of an imaging lens of Example 6 of the present disclosure.

FIG. 9 is a cross-sectional view illustrating the lens configuration of an imaging lens of Example 7 of the present disclosure.

FIG. 10 is a cross-sectional view illustrating the lens configuration of an imaging lens of Example 8 of the present disclosure.

FIG. 11 is a cross-sectional view illustrating the lens configuration of an imaging lens of Example 9 of the present disclosure.

FIG. 12 is a cross-sectional view illustrating the lens configuration of an imaging lens of Example 10 of the present disclosure.

FIG. 13 is a cross-sectional view illustrating the lens configuration of an imaging lens of Example 11 of the present disclosure.

FIG. 14 is a cross-sectional view illustrating the lens configuration of an imaging lens of Example 12 of the present disclosure.

FIG. 15 is a cross-sectional view illustrating the lens configuration of an imaging lens of Example 13 of the present disclosure.

FIG. 16 is a cross-sectional view illustrating the lens configuration of an imaging lens of Example 14 of the present disclosure.

FIG. 17 is a cross-sectional view illustrating the lens configuration of an imaging lens of Example 15 of the present disclosure.

FIG. 18 is a cross-sectional view illustrating the lens configuration of an imaging lens of Example 16 of the present disclosure.

FIG. 19 is a cross-sectional view illustrating the lens configuration of an imaging lens of Example 17 of the present disclosure.

FIG. 20 is a cross-sectional view illustrating the lens configuration of an imaging lens of Example 18 of the present disclosure.

FIG. 21 is a cross-sectional view illustrating the lens configuration of an imaging lens of Example 19 of the present disclosure.

FIG. 22 is a cross-sectional view illustrating the lens configuration of an imaging lens of Example 20 of the present disclosure.

FIG. 23 is a cross-sectional view illustrating the lens configuration of an imaging lens of Example 21 of the present disclosure.

FIG. 24 is a cross-sectional view illustrating the lens configuration of an imaging lens of Example 22 of the present disclosure.

FIG. 25 is a cross-sectional view illustrating the lens configuration of an imaging lens of Example 23 of the present disclosure.

FIG. 26 is a cross-sectional view illustrating the lens configuration of an imaging lens of Example 24 of the present disclosure.

FIG. 27 is a cross-sectional view illustrating the lens configuration of an imaging lens of Example 25 of the present disclosure.

FIG. 28 is a cross-sectional view illustrating the lens configuration of an imaging lens of Example 26 of the present disclosure.

FIG. 29 illustrates aberrations diagrams of spherical aberration, astigmatism, distortion, and longitudinal chromatic aberration of the imaging lens in Example 1 of the present disclosure.

FIG. 30 illustrates aberrations diagrams of spherical aberration, astigmatism, distortion, and longitudinal chromatic aberration of the imaging lens in Example 2 of the present disclosure.

FIG. 31 illustrates aberrations diagrams of spherical aberration, astigmatism, distortion, and longitudinal chromatic aberration of the imaging lens in Example 3 of the present disclosure.

FIG. 32 illustrates aberrations diagrams of spherical aberration, astigmatism, distortion, and longitudinal chromatic aberration of the imaging lens in Example 4 of the present disclosure.

FIG. 33 illustrates aberrations diagrams of spherical aberration, astigmatism, distortion, and longitudinal chromatic aberration of the imaging lens in Example 5 of the present disclosure.

FIG. 34 illustrates aberrations diagrams of spherical aberration, astigmatism, distortion, and longitudinal chromatic aberration of the imaging lens in Example 6 of the present disclosure.

FIG. 35 illustrates aberrations diagrams of spherical aberration, astigmatism, distortion, and longitudinal chromatic aberration of the imaging lens in Example 7 of the present disclosure.

FIG. 36 illustrates aberrations diagrams of spherical aberration, astigmatism, distortion, and longitudinal chromatic aberration of the imaging lens in Example 8 of the present disclosure.

FIG. 37 illustrates aberrations diagrams of spherical aberration, astigmatism, distortion, and longitudinal chromatic aberration of the imaging lens in Example 9 of the present disclosure.

FIG. 38 illustrates aberrations diagrams of spherical aberration, astigmatism, distortion, and longitudinal chromatic aberration of the imaging lens in Example 10 of the present disclosure.

FIG. 39 illustrates aberrations diagrams of spherical aberration, astigmatism, distortion, and longitudinal chromatic aberration of the imaging lens in Example 11 of the present disclosure.

FIG. 40 illustrates aberrations diagrams of spherical aberration, astigmatism, distortion, and longitudinal chromatic aberration of the imaging lens in Example 12 of the present disclosure.

FIG. 41 illustrates aberrations diagrams of spherical aberration, astigmatism, distortion, and longitudinal chromatic aberration of the imaging lens in Example 13 of the present disclosure.

FIG. 42 illustrates aberrations diagrams of spherical aberration, astigmatism, distortion, and longitudinal chromatic aberration of the imaging lens in Example 14 of the present disclosure.

FIG. 43 illustrates aberrations diagrams of spherical aberration, astigmatism, distortion, and longitudinal chromatic aberration of the imaging lens in Example 15 of the present disclosure.

FIG. 44 illustrates aberrations diagrams of spherical aberration, astigmatism, distortion, and longitudinal chromatic aberration of the imaging lens in Example 16 of the present disclosure.

FIG. 45 illustrates aberrations diagrams of spherical aberration, astigmatism, distortion, and longitudinal chromatic aberration of the imaging lens in Example 17 of the present disclosure.

FIG. 46 illustrates aberrations diagrams of spherical aberration, astigmatism, distortion, and longitudinal chromatic aberration of the imaging lens in Example 18 of the present disclosure.

FIG. 47 illustrates aberrations diagrams of spherical aberration, astigmatism, distortion, and longitudinal chromatic aberration of the imaging lens in Example 19 of the present disclosure.

FIG. 48 illustrates aberrations diagrams of spherical aberration, astigmatism, distortion, and longitudinal chromatic aberration of the imaging lens in Example 20 of the present disclosure.

FIG. 49 illustrates aberrations diagrams of spherical aberration, astigmatism, distortion, and longitudinal chromatic aberration of the imaging lens in Example 21 of the present disclosure.

FIG. 50 illustrates aberrations diagrams of spherical aberration, astigmatism, distortion, and longitudinal chromatic aberration of the imaging lens in Example 22 of the present disclosure.

FIG. 51 illustrates aberrations diagrams of spherical aberration, astigmatism, distortion, and longitudinal chromatic aberration of the imaging lens in Example 23 of the present disclosure.

FIG. 52 illustrates aberrations diagrams of spherical aberration, astigmatism, distortion, and longitudinal chromatic aberration of the imaging lens in Example 24 of the present disclosure.

FIG. 53 illustrates aberrations diagrams of spherical aberration, astigmatism, distortion, and longitudinal chromatic aberration of the imaging lens in Example 25 of the present disclosure.

FIG. 54 illustrates aberrations diagrams of spherical aberration, astigmatism, distortion, and longitudinal chromatic aberration of the imaging lens in Example 26 of the present disclosure.

FIG. 55 is a view for explaining an arrangement of a vehicle mounted imaging apparatus according to the embodiment of the present disclosure.

DETAILED DESCRIPTION OF THE PREFERRED EMBODIMENTS

Hereinafter, embodiments of the present disclosure will be described in detail with reference to the accompanying drawings.

[Embodiments of Imaging Lens]

Figure 1:
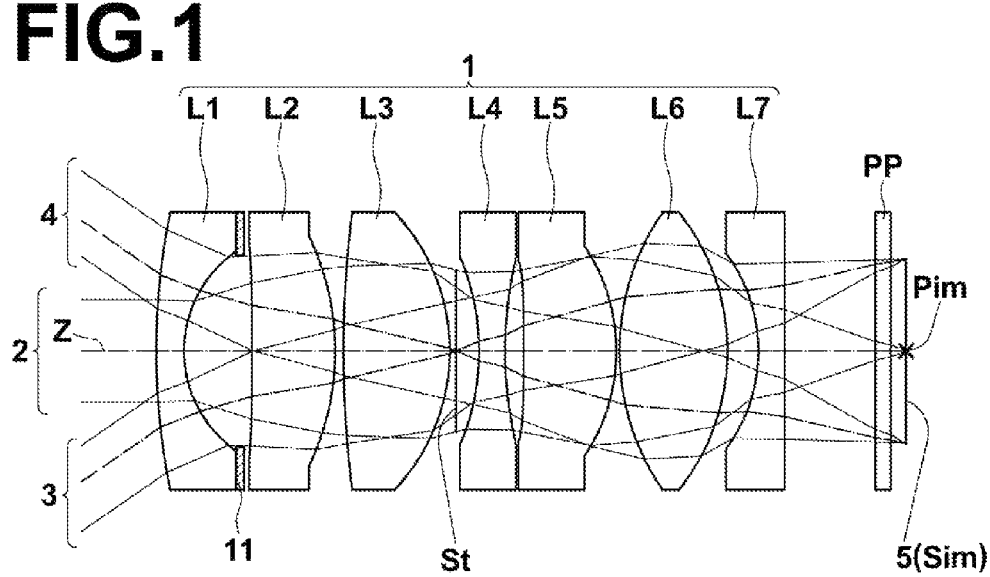
FIG. 1 is a view illustrating a lens configuration and optical paths of an imaging lens according to one embodiment of the present disclosure.

First, the imaging lens according to the embodiment of the present disclosure will be described referring to FIG. 1. FIG. 1 is a view illustrating a lens configuration and optical paths of the imaging lens according to the embodiment of the present disclosure. Note that the imaging lens 1 illustrated in FIG. 1 corresponds to an imaging lens according to Example 1 of the present disclosure to be described below.

In FIG. 1, the left side of the figure is the object side, and the right side thereof is the image side. In addition, FIG. 1 also illustrates axial rays 2 from an object point at an infinite distance and off-axis rays 3, 4 at a full angle of view 2ω. Further, FIG. 1 illustrates an image sensor 5 disposed on the image surface Sim which includes an image point Pim of the imaging lens 1, taking the case of applying the imaging lens 1 to an imaging apparatus into consideration. The image sensor 5 converts an optical image formed by the imaging lens 1 into an electric signal. A CCD image sensor, a CMOS image sensor, or the like may be employed as the image sensor, for example.

When the imaging lens 1 is applied to the imaging apparatus, it is preferable for a cover glass, a low-pass filter, an infrared cut filter, or the like to be provided according to the configurations of a camera on which the lens is mounted. FIG. 1 illustrates an example in which a plane parallel optical member PP that presumes such components is provided between the most-image-side lens and the image sensor 5 (the image surface Sim).

First, the configuration of the first embodiment of the present disclosure will be described. The imaging lens according to the first embodiment of the present disclosure includes, in order from the object side, a first lens L1 having a negative power, a second lens L2 having a positive power, a third lens L3 having a positive power, a fourth lens L4 having a negative power, a fifth lens L5 having a positive power, and a sixth lens having a positive power. In the example illustrated in FIG. 1, an aperture stop St is disposed between the third lens L3 and the fourth lens L4. Note that the aperture stop St illustrated in FIG. 1 does not necessarily represent the size or shape thereof, but represents the position thereof on the optical axis Z.

Further, the imaging lens of the first embodiment is configured to satisfy the following conditional formulae (1) through (3):

$$f12/f < -3.2 \tag{1}$$

$$vd7 < 55 \tag{2}$$

$$40 < vd3 \tag{3}$$

where,
f12 is the combined focal length of the first lens L1 and the second lens L2,
f is the focal length of the entire system,
vd7 is the Abbe's number of the material for the seventh lens L7 with respect to the d line, and
vd3 is the Abbe's number of the material for the third lens L3 with respect to the d line.

Next, the configuration of the second embodiment of the present disclosure will be described. The imaging lens according to the second embodiment of the present disclosure consists of, in order from the object side, a first lens L1 having a negative power, a second lens L2 having a positive power, a third lens L3 having a positive power, a fourth lens L4 having a negative power, a fifth lens L5 having a positive power, a sixth lens L6 having a positive power, and a seventh lens L7 having a negative power, the same as the imaging lens according to the first embodiment does. In the example illustrated in FIG. 1, an aperture stop St is disposed between the third lens L3 and the fourth lens L4.

Further, the imaging lens of the second embodiment is configured to satisfy the following formulae (1) and (4):

$$f12/f < -3.2 \tag{1}$$

$$D4/f < 0.39 \tag{4}$$

where,
f12 is the combined focal length of the first lens L1 and the second lens L2,
f is the focal length of the entire system, and
D4 is the air space between the second lens L2 and the third lens L3.

Next, the configuration of the third embodiment of the present disclosure will be described. The imaging lens according to the third embodiment of the present disclosure consists of, in order from the object side, a first lens L1 having a negative power, a second lens L2 having a positive power, a third lens L3 having a positive power, a fourth lens L4 having a negative power, a fifth lens L5 having a positive power, a sixth lens L6 having a positive power, and a seventh lens L7 having a negative power, the same as the imaging lens according to the first embodiment does. In the example illustrated in FIG. 1, an aperture stop St is disposed between the third lens L3 and the fourth lens L4.

Further, the imaging lens of the third embodiment is configured to satisfy the following conditional formulae (2) and (5):

$$vd7<55 \tag{2}$$

$$-0.93<(R3+R4)/(R3-R4) \tag{5}$$

where, vd7 is the Abbe's number of the material for the seventh lens L7 with respect to the d line, R3 is the radius of curvature of the object-side surface of the second lens L2, and R4 is the radius of curvature of the image-side surface of the second lens L2.

Each of the imaging lenses of the first embodiment through the third embodiment consists of, in order from the object side, a first lens L1 having a negative power, a second lens L2 having a positive power, a third lens L3 having a positive power, a fourth lens L4 having a negative power, a fifth lens L5 having a positive power, a sixth lens L6 having a positive power, and a seventh lens L7 having a negative power. Such a configuration facilitates manufacturing lenses having favorable resolution characteristics that correct various aberrations.

Further, by configuring the first lens L1, which is the most-object-side lens, to have a negative power, a lens system can achieve a wide angle of view, and securing back focus and reducing the size of the lens system in the radial direction will be facilitated.

Further, by configuring the second lens L2 and the third lens L3 to have positive powers and configuring the fifth lens L5 and the sixth lens L6 to have positive powers, each portion bearing a positive power can be constituted by two positive lenses within the lens system. Such a configuration will facilitate correction of spherical aberration and astigmatism.

In the imaging lens of the first embodiment, by satisfying the upper limit defined by conditional formula (1), a decrease in the absolute value of the combined focal length of the first lens L1 and the second lens L2 as a positive value can be suppressed. Thereby, suppressing the increase in the negative power of the first lens L1 or increasing the positive power of the second lens L2 will be facilitated. Accordingly, suppressing astigmatism will be facilitated.

By satisfying the upper limit defined by conditional formula (2), correcting lateral chromatic aberration will be facilitated, and obtaining favorable resolution characteristics will be facilitated as well.

By satisfying the lower limit defined by conditional formula (3), correcting longitudinal chromatic aberration will be facilitated, and obtaining favorable resolution characteristics will be facilitated as well.

In the imaging lens of the second embodiment, by satisfying the upper limit defined by conditional formula (1), the decrease in the combined focal length of the first lens L1 and the second lens L2 can be suppressed. Thereby, suppressing the increase in the negative power of the first lens L1 or increasing the positive power of the second lens L2 will be facilitated. Accordingly, suppressing astigmatism will be facilitated.

By satisfying the upper limit defined by conditional formula (4), the air space between the second lens L2 and the third lens L3 will be prevented from widening, and reducing the size of the lens system will be facilitated.

In the imaging lens of the third embodiment, by satisfying the upper limit defined by conditional formula (2), correcting lateral chromatic aberration will be facilitated, and obtaining favorable resolution characteristics will be facilitated as well.

By satisfying the lower limit defined by conditional formula (5), the image-side surface of the second lens L2 can be made convex, and the correction of spherical aberration and distortion will be facilitated.

Note that the imaging lens according to the first embodiment may have the configuration of the imaging lens according to the second embodiment or the third embodiment, or may have the configuration of the imaging lens according to the second embodiment and the third embodiment. Further, the imaging lens according to the second embodiment may have the configuration of the imaging lens according to the first embodiment or the third embodiment, or may have the configuration of the imaging lens according to the first embodiment and the third embodiment. Further, the imaging lens according to the third embodiment may have the configuration of the imaging lens according to the first embodiment or the second embodiment, or may have the configuration of the imaging lens of the first embodiment and the second embodiment.

Further, the imaging lens according to the first embodiment may have a portion of the configuration of the imaging lens according to the second embodiment, or may have a portion of the configuration of the imaging lens according to the third embodiment. The imaging lens according to the second embodiment may have a portion of the configuration of the imaging lens according to the first embodiment, or may have a portion of the configuration of the imaging lens according to the third embodiment. The imaging lens according to the third embodiment may have a portion of the configuration of the imaging lens according to the first embodiment, or may have a portion of the configuration of the imaging lens according to the second embodiment.

Next, preferable configurations of the imaging lenses according to the first through third embodiments above of the present disclosure and the advantageous effects thereof will be described. Note that preferably, the imaging lens may have any one of the configurations below, or may have an arbitrary combination of two or more of the configurations.

$$1.8<f345/f \tag{6}$$

$$f1/f2<-0.42 \tag{7}$$

$$-5.0<(R14+R15)/(R14-R15)<-0.01 \tag{8}$$

$$-0.8<(R5+R6)/(R5-R6) \tag{9}$$

$$1.25<f5/f \tag{10}$$

$$0.5<(R10+R11)/(R10-R11) \tag{11}$$

$$(R12+R13)/(R12-R13)<1.0 \tag{12}$$

$$25<vd5 \tag{13}$$

$$0.5<f3/f<10 \tag{14}$$

$$0.5<f2/f<7 \tag{15}$$

$$f1/f<-0.25 \tag{16}$$

$$0.3<f123/f<15 \tag{17}$$

$$0.5<f234/f<18 \tag{18}$$

$$0.5<f12345/f<10 \quad (19)$$

$$0.4<f2345/f<10 \quad (20)$$

$$0.1<f3456/f<5.0 \quad (21)$$

$$-4.0<(R8+R9)/(R8-R9)<4.0 \quad (22)$$

$$-3<f/f45<3 \quad (23)$$

where, f is the focal length of the entire system,
f1 is the focal length of the first lens L1,
f2 is the focal length of the second lens L2,
f3 is the focal length of the third lens L3,
f5 is the focal length of the fifth lens L5,
f45 is the combined focal length of the fourth lens L4 and the fifth lens L5,
f123 is the combined focal length of the first lens L1, the second lens L2, and the third lens L3,
f234 is the combined focal length of the second lens L2, the third lens L3, and the fourth lens L4,
f345 is the combined focal length of the third lens L3, the fourth lens L4, and the fifth lens L5,
f2345 is the combined focal length of the second lens L2, the third lens L3, the fourth lens L4, and the fifth lens L5,
f3456 is the combined focal length of the third lens L3, the fourth lens L4, the fifth lens L5, and the sixth lens L6,
f12345 is the combined focal length of the first lens L1, the second lens L2, the third lens L3, the fourth lens L4, and the fifth lens L5,
vd5 is the Abbe's number of the material for the fifth lens L5 with respect to the d line,
R5 is the radius of curvature of the object-side surface of the third lens L3,
R6 is the radius of curvature of the image-side surface of the third lens L3,
R8 is the radius of curvature of the object-side surface of the fourth lens L4,
R9 is the radius of curvature of the image-side surface of the fourth lens L4,
R10 is the radius of curvature of the object-side surface of the fifth lens L5,
R11 is the radius of curvature of the image-side surface of the fifth lens L5,
R12 is the radius of curvature of the object-side surface of the sixth lens L6,
R13 is the radius of curvature of the image-side surface of the sixth lens L6,
R14 is the radius of curvature of the object-side surface of the seventh lens L7, and
R15 is the radius of curvature of the image-side surface of the seventh lens L7.

By satisfying the lower limit defined by conditional formula (6), preventing the combined focal length of the third lens L3 through the fifth lens L5 from decreasing as a positive value will be facilitated. Thereby, securing back focus will be facilitated or correcting astigmatism will be facilitated.

By satisfying the upper limit defined by conditional formula (7), suppressing the negative power of the first lens L1, i.e., increasing the absolute value of the focal length of the first lens L1, will be facilitated. Further, correcting distortion will be facilitated. Alternatively, suppressing an excessive decrease in the positive power of the second lens L2, i.e., decreasing the absolute value of the focal length of the second lens L2 will be facilitated, and correcting spherical aberration and astigmatism will be facilitated as well.

By satisfying the upper limit defined by conditional formula (8), configuring the radius of curvature of the object-side surface to be smaller than the radius of curvature of the image-side surface will be facilitated while the object-side surface of the seventh lens L7 is concave. Thereby, correcting astigmatism will be facilitated or correcting lateral chromatic aberration will be facilitated.

By satisfying the lower limit defined by conditional formula (8), differentiating the radius of curvature of the object-side surface of the seventh lens L7 from the radius of curvature of the image-side surface of the seventh lens L7 and increasing the power of the seventh lens L7 will be facilitated while the seventh lens L7 is of a meniscus shape with a convex surface toward the image side. Further, correcting comatic aberration will be facilitated.

By satisfying the lower limit defined by conditional formula (9), suppressing the increase in the absolute value of the radius of curvature of the image-side surface will be facilitated, and correcting comatic aberration will be facilitated as well while the third lens L3 is a biconvex lens.

By satisfying the lower limit defined by conditional formula (10), suppressing an excessive increase in the positive power of the fifth lens L5 will be facilitated. Thereby, securing back focus will be facilitated or suppressing the error sensitivity of the fifth lens L5 with respect to eccentricity will be facilitated.

By satisfying the lower limit defined by conditional formula (11), suppressing the decrease in the absolute value of the radius of curvature of the object-side surface of the fifth lens L5 will be facilitated or configuring the object-side surface of the fifth lens L5 to be concave will be facilitated while the object-side surface of the fifth lens L5 is convex. Further, correcting spherical aberration and comatic aberration will be facilitated.

By satisfying the upper limit defined by conditional formula (12), configuring the sixth lens L6 to be a biconvex lens will be facilitated, and correcting spherical aberration will be facilitated as well.

By satisfying the lower limit defined by conditional formula (13), correcting longitudinal chromatic aberration will be facilitated.

By satisfying the upper limit defined by conditional formula (14), increasing the power of the third lens L3 will be facilitated, and correcting astigmatism and spherical aberration will be facilitated as well.

By satisfying the lower limit defined by conditional formula (14), suppressing the power of the third lens L3 will be facilitated, and suppressing the error sensitivity of the third lens L3 with respect to eccentricity will be facilitated.

By satisfying the upper limit defined by conditional formula (15), increasing the power of the second lens L2 will be facilitated, and correcting astigmatism, spherical aberration, and distortion will be facilitated.

By satisfying the lower limit defined by conditional formula (15), suppressing the power of the second lens L2 will be facilitated, and suppressing the error sensitivity of the second lens L2 with respect to eccentricity will be facilitated.

By satisfying the upper limit defined by conditional formula (16), suppressing the power of the first lens L1 will be facilitated, resulting in correction of astigmatism being facilitated.

By satisfying the upper limit defined by conditional formula (17), suppressing the increase in the combined focal length of the first lens L1 through the third lens L3 as a positive value will be facilitated, and suppressing astigmatism and spherical aberration will be facilitated as well.

By satisfying the lower limit defined by conditional formula (17), suppressing the decrease in the combined focal length of the first lens L1 through the third lens L3 as a positive value will be facilitated, and achieving a wide angle of view will be facilitated as well.

By satisfying the upper limit defined by conditional formula (18), suppressing the increase in the combined focal length of the second lens L2 through the fourth lens L4 as a positive value will be facilitated, resulting in correction of astigmatism being facilitated.

By satisfying the lower limit defined by conditional formula (18), suppressing the decrease in the combined focal length of the second lens L2 through the fourth lens L4 as a positive value will be facilitated, and securing back focus will be facilitated or correcting spherical aberration will be facilitated.

By satisfying the upper limit defined by conditional formula (19), suppressing an excessive increase in the combined focal length of the first lens L1 through the fifth lens L5 as a positive value will be facilitated. Thereby, reducing the size of the lens system will be facilitated or correcting spherical aberration will be facilitated.

By satisfying the lower limit defined by conditional formula (19), suppressing an excessive decrease in the combined focal length of the first lens L1 through the fifth lens L5 as a positive value will be facilitated, and securing back focus will be facilitated.

By satisfying the upper limit defined by conditional formula (20), suppressing an excessive increase in the combined focal length of the second lens L2 through the fifth lens L5 as a positive value will be facilitated. Thereby, shortening the total length of the lens system will be facilitated or suppressing lateral chromatic aberration will be facilitated.

By satisfying the lower limit defined by conditional formula (20), suppressing an excessive decrease in the combined focal length of the second lens L2 through the fifth lens L5 as a positive value will be facilitated. Thereby, correcting longitudinal chromatic aberration will be facilitated or securing long back focus will be facilitated.

By satisfying the upper limit defined by conditional formula (21), suppressing an excessive increase in the combined focal length of the third lens L3 through the sixth lens L6 as a positive value will be facilitated, and correcting spherical aberration, astigmatism, or lateral chromatic aberration will be facilitated.

By satisfying the lower limit defined by conditional formula (21), suppressing an excessive decrease in the combined focal length of the third lens L3 through the sixth lens L6 as a positive value will be facilitated. Thereby, achieving a wide angle of view will be facilitated, or correcting longitudinal chromatic aberration will be facilitated.

By satisfying the upper limit defined by conditional formula (22), differentiating the radius of curvature of the object-side surface of the fourth lens L4 from the radius of curvature of the image-side surface of the fourth lens L4 and increasing the power of the fourth lens L4 will be facilitated while the fourth lens L4 is of a meniscus shape with a concave surface toward the image side. Further, correcting longitudinal chromatic aberration will be facilitated, or correcting comatic aberration and astigmatism will be facilitated.

By satisfying the lower limit defined by conditional formula (22), differentiating the radius of curvature of the object-side surface of the fourth lens L4 from the radius of curvature of the image-side surface of the fourth lens L4 and increasing the power of the fourth lens L4 will be facilitated while the fourth lens L4 is of a meniscus shape with a concave surface toward the image side. Further, correcting longitudinal chromatic aberration or spherical aberration will be facilitated.

By satisfying the upper limit defined by conditional formula (23), suppressing an excessive decrease in the combined focal length of the fourth lens L4 and the fifth lens L5 as a positive value will be facilitated. Thereby, increasing the negative power of the fourth lens L4 will be facilitated and correcting longitudinal chromatic aberration being facilitated.

By satisfying the lower limit defined by conditional formula (23), suppressing an excessive decrease in the combined focal length of the fourth lens L4 and the fifth lens L5 as a negative value, resulting in the increase in the positive power of the fifth lens L5 being facilitated. Thereby, correcting spherical aberration being facilitated, or suppressing the total length of the lens system will be facilitated.

Note that it is preferable for the conditional formulas below, in each of which the upper or lower limits are added to the conditional formulae above or the lower or upper limits are changed in the conditional formulas above to be further satisfied so as to improve the above advantageous effects. In addition, preferably, the conditional formulae to be described below, each of which is configured by combining a changed value of the lower limit and a changed value of the upper limit, may be satisfied. Preferred modifications of conditional formulae will be described below as an example, but the modifications of conditional formulae are not limited to those listed below and the changed values described below may be combined.

It is preferable for the upper limit defined by conditional formula (1) to be −3.3, and more preferably −3.5.

It is preferable for conditional formula (1) to be provided with the lower limit and for the lower limit to be −50. Thereby, suppressing an excessive decrease in the negative power of the first lens L1 will be facilitated. Further, achieving a wide angle of view will be facilitated or reducing the size of the lens system in the radial direction will be facilitated. It is more preferable for the lower limit defined by conditional formula (1) to be −40, even more preferably −35, and still more preferably −30. As described above, it is more preferable for conditional formulae (1-1) through (1-5) below to be satisfied:

$$f12/f < -3.3 \tag{1-1}$$

$$f12/f < -3.5 \tag{1-2}$$

$$-50 < f12/f < -3.2 \tag{1-3}$$

$$-40 < f12/f < -3.3 \tag{1-4}$$

$$-35 < f12/f < -3.3 \tag{1-5}.$$

It is preferable for the upper limit defined by conditional formula (2) to be 50, more preferably 45, even more preferably 42, and still more preferably 35.

It is preferable for conditional formula (2) to be provided with the lower limit, and for the lower limit to be 15. Thereby, suppressing the cost for the material of the seventh lens L7 will be facilitated. It is more preferable for the lower limit defined by conditional formula (2) to be 17. As described above, it is preferable for conditional formulae (2-1) through (2-5) below to be satisfied, for example:

$15 < \nu d7 < 55$ \hfill (2-1)

$\nu d7 < 50$ \hfill (2-2)

$\nu d7 < 45$ \hfill (2-3)

$\nu d7 < 42$ \hfill (2-4)

$15 < \nu d7 < 45$ \hfill (2-5).

It is preferable for conditional formula (3) to be provided with the upper limit, and for the upper limit to be 85. Thereby, reducing the cost for the material of the third lens L3 will be facilitated. It is more preferable for the upper limit defined by conditional formula (3) to be 70, even more preferably 68, and still more preferably 65.

It is preferable for the lower limit defined by conditional formula (3) to be 45, more preferably 50, and even more preferably 52. As described above, it is preferable for conditional formulae (3-1) through (3-6) below to be satisfied, for example:

$40 < \nu d3 < 85$ \hfill (3-1)

$40 < \nu d3 < 70$ \hfill (3-2)

$45 < \nu d3$ \hfill (3-3)

$50 < \nu d3$ \hfill (3-4)

$52 < \nu d3$ \hfill (3-5)

$50 < \nu d3 < 68$ \hfill (3-6).

It is preferable for the upper limit defined by conditional formula (4) to be 0.35, more preferably 0.3, even more preferably 0.25, still more preferably 0.2, even still more preferably, 0.15, and most preferably 0.1.

It is preferable for the lower limit defined by conditional formula (4) to be 0.01, more preferably 0.02, even more preferably 0.03, and still more preferably 0.04. As described above, it is preferable for conditional formulae (4-1) through (4-10) below to be satisfied:

$0.0 < D4/f < 0.35$ \hfill (4-1)

$0.0 < D4/f < 0.3$ \hfill (4-2)

$0.0 < D4/f < 0.25$ \hfill (4-3)

$0.0 < D4/f < 0.2$ \hfill (4-4)

$0.0 < D4/f < 0.15$ \hfill (4-5)

$0.0 < D4/f < 0.1$ \hfill (4-6)

$0.01 < D4/f < 0.35$ \hfill (4-7)

$0.02 < D4/f < 0.3$ \hfill (4-8)

$0.03 < D4/f < 0.25$ \hfill (4-9)

$0.04 < D4/f < 0.2$ \hfill (4-10).

It is preferable for conditional formula (5) to be provided with the upper limit, and for the upper limit to be 10. Thereby, increasing a difference in the radii of curvature of the object-side surface and the image-side surface of the second lens L2 will be facilitated, resulting in the increase in the power of the second lens L2 being facilitated. Further, correcting spherical aberration will be facilitated. It is preferable for the upper limit defined by conditional formula (5) to be 8, more preferably 6, even more preferably 5, and still more preferably 4.

It is preferable for the lower limit defined by conditional formula (5) to be −0.9, more preferably −0.89, even more preferably −0.88, still more preferably 0.0, and most preferably 0.1. As described above, it is preferable for conditional formulae (5-1) through (5-7) below to be satisfied, for example:

$-0.93 < (R3+R4)/(R3-R4) < 10$ \hfill (5-1)

$-0.93 < (R3+R4)/(R3-R4) < 8$ \hfill (5-2)

$-0.9 < (R3+R4)/(R3-R4) < 6$ \hfill (5-3)

$-0.89 < (R3+R4)/(R3-R4) < 5$ \hfill (5-4)

$-0.9 < (R3+R4)/(R3-R4) < 4$ \hfill (5-5)

$-0.88 < (R3+R4)/(R3-R4)$ \hfill (5-6)

$0.0 < (R3+R4)/(R3-R4)$ \hfill (5-7).

It is preferable for conditional formula (6) to be provided with the upper limit, and for the upper limit to be 15. Thereby, reducing the total length will be facilitated. It is preferable for the upper limit defined by conditional formula (6) to be 10, more preferably 8, and still more preferably 7.

It is preferable for the lower limit defined by conditional formula (6) to be 1.85, more preferably 1.9, and even more preferably 1.95. As described above, it is preferable for conditional formulae (6-1) through (6-5) below to be satisfied, for example:

$1.8 < f345/f < 15$ \hfill (6-1)

$1.8 < f345/f < 10$ \hfill (6-2)

$1.8 < f345/f < 8$ \hfill (6-3)

$1.9 < f345/f < 10$ \hfill (6-4)

$1.85 < f345/f < 7$ \hfill (6-5).

It is preferable for the upper limit defined by conditional formula (7) to be −0.43, and more preferably −0.44.

It is preferable for conditional formula (7) to be provided with the lower limit, and for the lower limit to be −5. Thereby, suppressing a decrease in the negative power of the first lens L1, i.e., decreasing the absolute value of the focal length of the first lens L1, will be facilitated, and achieving a wide angle of view will be facilitated. It is preferable for the lower limit defined by conditional formula (7) to be −3, more preferably −2, even more preferably −1, still more preferably −0.8, and most preferably −0.7. As described above, it is preferable for conditional formulae (7-1) through (7-6) below, for example, to be satisfied:

$-5 < f1/f2 < -0.43$ \hfill (7-1)

$-3 < f1/f2 < -0.42$ \hfill (7-2)

$-2 < f1/f2 < -0.42$ \hfill (7-3)

$-1 < f1/f2 < -0.42$ \hfill (7-4)

$-0.8 < f1/f2 < -0.42$ \hfill (7-5)

$-0.7 < f1/f2 < -0.42$ \hfill (7-6).

It is preferable for the upper limit defined by conditional formula (8) to be −0.2, more preferably −0.3, even more preferably −0.4, and most preferably −0.5.

It is preferable for the lower limit defined by conditional formula (8) to be −2.1, more preferably −2.0, even more preferably −1.9, and still more preferably −1.8. As described above, it is preferable for conditional formulae (8-1) through (8-10) below to be satisfied, for example:

$$-4.0<(R14+R15)/(R14-R15)<-0.01 \quad (8\text{-}1)$$

$$-3.0<(R14+R15)/(R14-R15)<-0.01 \quad (8\text{-}2)$$

$$-3.0<(R14+R15)/(R14-R15)<-0.2 \quad (8\text{-}3)$$

$$-2.1<(R14+R15)/(R14-R15)<-0.01 \quad (8\text{-}4)$$

$$-2.0<(R14+R15)/(R14-R15)<-0.2 \quad (8\text{-}5)$$

$$-1.9<(R14+R15)/(R14-R15)<-0.2 \quad (8\text{-}6)$$

$$-2.0<(R14+R15)/(R14-R15)<-0.3 \quad (8\text{-}7)$$

$$-1.8<(R14+R15)/(R14-R15)<-0.3 \quad (8\text{-}8)$$

$$-2.2<(R14+R15)/(R14-R15)<-0.4 \quad (8\text{-}9)$$

$$-2.1<(R14+R15)/(R14-R15)<-0.4 \quad (8\text{-}10).$$

It is preferable for the upper limit defined by conditional formula (9), and for the upper limit to be 3.0. Thereby, suppressing a decrease in the radius of curvature of the object-side surface, which is concave, of the third lens L3 will be facilitated, resulting in correction of spherical aberration being facilitated. It is more preferable for the upper limit defined by conditional formula (9) to be 2.0, even more preferably 1.0, still more preferably 0.95, and most preferably 0.9.

It is preferable for the lower limit defined by conditional formula (9) to be −0.75, more preferably −0.7, and still more preferably −0.68. As described above, it is preferable for conditional formulae (9-1) through (9-7) to be satisfied, for example.

$$-0.8<(R5+R6)/(R5-R6)<2.0 \quad (9\text{-}1)$$

$$-0.8<(R5+R6)/(R5-R6)<1.0 \quad (9\text{-}2)$$

$$-0.8<(R5+R6)/(R5-R6)<0.95 \quad (9\text{-}3)$$

$$-0.8<(R5+R6)/(R5-R6)<0.9 \quad (9\text{-}4)$$

$$-0.75<(R5+R6)/(R5-R6)<1.0 \quad (9\text{-}5)$$

$$-0.7<(R5+R6)/(R5-R6)<1.0 \quad (9\text{-}6)$$

$$-0.68<(R5+R6)/(R5-R6)<2.0 \quad (9\text{-}7).$$

It is preferable for conditional formula (10) to be provided with the upper limit, and for the upper limit to be 10. Thereby, increasing the positive power of the fifth lens L5 will be facilitated, resulting in suppression of angles, at which peripheral light rays enter an image sensor, being facilitated. It is more preferable for the upper limit defined by conditional formula (10) to be 8.0, even more preferably 5.0, still more preferably 4.0, and most preferably 3.5.

It is preferable for the lower limit defined by conditional formula (10) to be 1.27, more preferably 1.28, and still more preferably 1.3. As described above, it is preferable for conditional formulae (10-1) through (10-7) below to be satisfied, for example:

$$1.25<f5/f<10 \quad (10\text{-}1)$$

$$1.25<f5/f<8.0 \quad (10\text{-}2)$$

$$1.25<f5/f<5.0 \quad (10\text{-}3)$$

$$1.27<f5/f<4.0 \quad (10\text{-}4)$$

$$1.25<f5/f<3.5 \quad (10\text{-}5)$$

$$1.28<f5/f<5.0 \quad (10\text{-}6)$$

$$1.3<f5/f<5.0 \quad (10\text{-}7).$$

It is preferable for conditional formula (11) to be provided with the upper limit, and for the upper limit to be 5.0. Thereby, increasing the power of the fifth lens L5 will be facilitated, resulting in suppression of angles, at which chief rays of off-axis rays enter the image sensor, being facilitated or correction of spherical aberration being facilitated. It is more preferable for the upper limit defined by conditional formula (11) to be 4.0, even more preferably 3.0, still more preferably 2.5, and further more preferably 2.3.

It is preferable for the lower limit defined by conditional formula (11) to be 0.6, more preferably 0.65, even more preferably 0.7, and still more preferably 0.8. As described above, it is preferable for conditional formulae (11-1) through (11-8) below to be satisfied, for example:

$$0.65<(R10+R11)/(R10-R11) \quad (11\text{-}1)$$

$$0.5<(R10+R11)/(R10-R11)<5.0 \quad (11\text{-}2)$$

$$0.6<(R10+R11)/(R10-R11)<4.0 \quad (11\text{-}3)$$

$$0.7<(R10+R11)/(R10-R11)<3.0 \quad (11\text{-}4)$$

$$0.5<(R10+R11)/(R10-R11)<2.5 \quad (11\text{-}5)$$

$$0.5<(R10+R11)/(R10-R11)<2.3 \quad (11\text{-}6)$$

$$0.8<(R10+R11)/(R10-R11)<4.0 \quad (11\text{-}7)$$

$$0.65<(R10+R11)/(R10-R11)<3.0 \quad (11\text{-}8).$$

It is preferable for the upper limit defined by conditional formula (12) to be 0.7, more preferably 0.5, even more preferably 0.3, still more preferably 0.2, and most preferably 0.1.

It is preferable for conditional formula (12) to be provided with the lower limit, and for the lower limit to be −1.0. Thereby, suppressing a decrease in the radius of curvature of the object-side surface being facilitated, resulting in correction of field curvature and comatic aberration being facilitated while the sixth lens L6 is a biconvex lens. It is more preferable for the lower limit defined by conditional formula (12) to be −0.9, even more preferably −0.8, still more preferably −0.7, and most preferably −0.6. As described above, it is preferable for conditional formulae (12-1) through (12-7) below to be satisfied, for example:

$$-1.0<(R12+R13)/(R12-R13)<1.0 \quad (12\text{-}1)$$

$$(R12+R13)/(R12-R13)<0.5 \quad (12\text{-}2)$$

$$-0.9<(R12+R13)/(R12-R13)<0.3 \quad (12\text{-}3)$$

$$-0.8<(R12+R13)/(R12-R13)<0.2 \quad (12\text{-}4)$$

$$-0.7<(R12+R13)/(R12-R13)<0.5 \quad (12\text{-}5)$$

$$-0.6<(R12+R13)/(R12-R13)<0.7 \quad (12\text{-}6)$$

$$-0.8<(R12+R13)/(R12-R13)<0.3 \quad (12\text{-}7).$$

It is preferable for conditional formula (13) to be provided with the upper limit, and for the upper limit to be 85. Thereby, reducing the cost for the material of the fifth lens L5 will be facilitated. It is more preferable for the upper limit defined by conditional formula (13) to be 70, even more preferably 68, and still more preferably 65.

It is preferable for the lower limit defined by conditional formula (13) to be 28, more preferably 30, and even more preferably 35. As described above, it is preferable for conditional formulae (13-1) through (13-5) below to be satisfied, for example:

$$30<\text{vd}5 \quad (13\text{-}1)$$

$$25<\text{vd}5<85 \quad (13\text{-}2)$$

$$25<\text{vd}5<70 \quad (13\text{-}3)$$

$$28<\text{vd}5<68 \quad (13\text{-}4)$$

$$30<\text{vd}5<65 \quad (13\text{-}5).$$

It is preferable for the upper limit defined by conditional formula (14) to be 8, more preferably 7, even more preferably 6, still more preferably 5, and most preferably 4.5.

It is preferable for the lower limit defined by conditional formula (14) to be 0.6, more preferably 0.8, even more preferably 1.0, and still more preferably 1.2. As described above, it is preferable for conditional formulae (14-1) through (14-7) below to be satisfied, for example:

$$0.5<f3/f<7 \quad (14\text{-}1)$$

$$0.8<f3/f<10 \quad (14\text{-}2)$$

$$0.5<f3/f<10 \quad (14\text{-}3)$$

$$0.6<f3/f<8 \quad (14\text{-}4)$$

$$0.8<f3/f<7 \quad (14\text{-}5)$$

$$1.0<f3/f<6 \quad (14\text{-}6)$$

$$1.2<f3/f<5 \quad (14\text{-}7).$$

It is preferable for the upper limit defined by conditional formula (15) to be 6.5, more preferably 6, even more preferably 5, and still more preferably 4.5.

It is preferable for the lower limit defined by conditional formula (15) to be 0.7, more preferably 0.9, even more preferably 1.2, still more preferably 1.5, and most preferably 1.7. As described above, it is preferable for conditional formulae (15-1) through (15-7) below to be satisfied, for example:

$$0.5<f2/f<6 \quad (15\text{-}1)$$

$$0.9<f2/f<7 \quad (15\text{-}2)$$

$$0.7<f2/f<6.5 \quad (15\text{-}3)$$

$$0.9<f2/f<6 \quad (15\text{-}4)$$

$$1.2<f2/f<5 \quad (15\text{-}5)$$

$$1.5<f2/f<4.5 \quad (15\text{-}6)$$

$$1.7<f2/f<7 \quad (15\text{-}7).$$

It is preferable for the upper limit defined by conditional formula (16) to be −0.4, more preferably −0.6, even more preferably −0.8, and still more preferably −1.0.

It is preferable for conditional formula (16) to be provided with the lower limit, and for the lower limit to be −10. Thereby, increasing the power of the first lens L1 will be facilitated, resulting in achievement of a wide angle of view being facilitated. It is preferable for the lower limit defined by conditional formula (16) to be −8, more preferably −7, even more preferably −5, still more preferably −3, and most preferably −2. As described above, it is preferable for conditional formulae (16-1) through (16-7) below to be satisfied, for example:

$$-10<f1/f<-0.25 \quad (16\text{-}1)$$

$$-8<f1/f<-0.25 \quad (16\text{-}2)$$

$$-8<f1/f<-0.4 \quad (16\text{-}3)$$

$$-7<f1/f<-0.4 \quad (16\text{-}4)$$

$$-5<f1/f<-0.6 \quad (16\text{-}5)$$

$$-3<f1/f<-0.8 \quad (16\text{-}6)$$

$$-2<f1/f<-1.0 \quad (16\text{-}7).$$

It is preferable for the upper limit defined by conditional formula (17) to be 10, more preferably 8, even more preferably 6, and still more preferably 5.

It is preferable for the lower limit defined by conditional formula (17) to be 0.5, more preferably 0.8, even more preferably 1.0, and still more preferably 1.1. As described above, it is preferable for conditional formulae (17-1) through (17-8) below to be satisfied, for example:

$$0.3<f123/f<15 \quad (17\text{-}1)$$

$$0.5<f123/f<10 \quad (17\text{-}2)$$

$$0.8<f123/f<8 \quad (17\text{-}3)$$

$$1.0<f123/f<6 \quad (17\text{-}4)$$

$$1.1<f123/f<5 \quad (17\text{-}5)$$

$$0.3<f123/f<10 \quad (17\text{-}6)$$

$$0.5<f123/f<6 \quad (17\text{-}7)$$

$$0.8<f123/f<8 \quad (17\text{-}8).$$

It is preferable for the upper limit defined by conditional formula (18) to be 15, more preferably 10, even more preferably 8, still more preferably 7, and most preferably 6.

It is preferable for the lower limit defined by conditional formula (18) to be 0.8, more preferably 1.0, and even more preferably 1.2. As described above, it is preferable for conditional formulae (18-1) through (18-7) below to be satisfied, for example:

$$0.5<f234/f<10 \quad (18\text{-}1)$$

$$0.8<f234/f<15 \quad (18\text{-}2)$$

$$1.0<f234/f<8 \quad (18\text{-}3)$$

$$1.2<f234/f<7 \quad (18\text{-}4)$$

$$1.0<f234/f<6 \quad (18\text{-}5)$$

$$0.8 < f234/f < 8 \tag{18-6}$$

$$0.5 < f234/f < 6 \tag{18-7}$$

It is preferable for the upper limit defined by conditional formula (19) to be 9, more preferably 8, even more preferably 7, still more preferably 6, and most preferably 5.5.

It is preferable for the lower limit defined by conditional formula (19) to be 0.8, more preferably 1.0, even more preferably 1.2, and still more preferably 1.5. As described above, it is preferable for conditional formulae (19-1) through (19-8) below to be satisfied, for example:

$$0.5 < f12345/f < 8 \tag{19-1}$$

$$0.5 < f12345/f < 9 \tag{19-2}$$

$$0.8 < f12345/f < 8 \tag{19-3}$$

$$1.0 < f12345/f < 7 \tag{19-4}$$

$$1.2 < f12345/f < 6 \tag{19-5}$$

$$1.5 < f12345/f < 5.5 \tag{19-6}$$

$$0.8 < f12345/f < 10 \tag{19-7}$$

$$0.8 < f12345/f < 7 \tag{19-8}$$

It is preferable for the upper limit defined by conditional formula (20) to be 8, more preferably 6, even more preferably 5, still more preferably 4, and most preferably 3.

It is preferable for the lower limit defined by conditional formula (20) to be 0.6, more preferably 0.8, even more preferably 1.0, and still more preferably 1.2. As described above, it is preferable for conditional formulae (20-1) through (20-7) below to be satisfied, for example:

$$0.6 < f2345/f < 8 \tag{20-1}$$

$$0.8 < f2345/f < 6 \tag{20-2}$$

$$1.0 < f2345/f < 5 \tag{20-3}$$

$$1.2 < f2345/f < 4 \tag{20-4}$$

$$1.0 < f2345/f < 3 \tag{20-5}$$

$$0.4 < f2345/f < 6 \tag{20-6}$$

$$0.8 < f2345/f < 8 \tag{20-7}$$

It is preferable for the upper limit defined by conditional formula (21) to be 4.0, more preferably 3.0, and even more preferably 2.0.

It is preferable for the lower limit defined by conditional formula (21) to be 0.3, more preferably 0.5, and even more preferably 0.6. As described above, it is preferable for conditional formulae (21-1) through (21-6) below to be satisfied, for example:

$$0.3 < f3456/f < 4.0 \tag{21-1}$$

$$0.5 < f3456/f < 3.0 \tag{21-2}$$

$$0.6 < f3456/f < 2.0 \tag{21-3}$$

$$0.3 < f3456/f < 5.0 \tag{21-4}$$

$$0.1 < f3456/f < 2.0 \tag{21-5}$$

$$0.3 < f3456/f < 3.0 \tag{21-6}$$

It is preferable for the upper limit defined by conditional formula (22) to be 3.0, more preferably 2.0, even more preferably 1.0, and still more preferably 0.9.

It is preferable for the lower limit defined by conditional formula (22) to be −3.5, more preferably −3.0, even more preferably −2.5, and still more preferably −2.0. As described above, it is preferable for conditional formulae (22-1) through (22-5) below to be satisfied, for example:

$$-3.5 < (R8+R9)/(R8-R9) < 3.0 \tag{22-1}$$

$$-3.0 < (R8+R9)/(R8-R9) < 2.0 \tag{22-2}$$

$$-2.5 < (R8+R9)/(R8-R9) < 1.0 \tag{22-3}$$

$$-2.0 < (R8+R9)/(R8-R9) < 2.0 \tag{22-4}$$

$$-3.0 < (R8+R9)/(R8-R9) < 3 \tag{22-5}$$

It is preferable for the upper limit defined by conditional formula (23) to be 2, more preferably 1, even more preferably 0.7, still more preferably 0.5, further more preferably 0.3, and most preferably 0.2.

It is preferable for the lower limit defined by conditional formula (23) to be −2, more preferably −1, even more preferably −0.7, still more preferably −0.5, and most preferably −0.3. As described above, it is preferable for conditional formulae (23-1) through (23-6) below to be satisfied, for example:

$$-1 < f/f45 < 1 \tag{23-1}$$

$$-0.7 < f/f45 < 0.7 \tag{23-2}$$

$$-0.5 < f/f45 < 0.5 \tag{23-3}$$

$$-0.3 < f/f45 < 1 \tag{23-4}$$

$$-1 < f/f45 < 0.3 \tag{23-5}$$

$$-0.5 < f/f45 < 0.3 \tag{23-6}$$

The aperture stop refers to a stop which determines the F number (Fno) of the lens system. It is preferable for the aperture stop to be disposed on the object side of the sixth lens L6. In this case, "the aperture stop is disposed on the object side of the sixth lens L6" means that the center (the position of the optical axis) of the aperture stop is more toward the object side than the image-side surface of the sixth lens L6. By disposing the aperture stop on the object side of the sixth lens L6, decreasing the aperture diameter of the first lens L1 will be facilitated, resulting in the reduction in the diameters of lenses being facilitated. For example, when the imaging lenses of the present embodiments are used in vehicle mounted cameras, lens portions, which are exposed to the exterior of a vehicle, are required to be made small so as not to spoil the appearance of vehicles. By disposing the aperture stop on the object side of the sixth lens L6, decreasing the aperture diameter of the first lens L1 will be facilitated. Thereby, making the lens portions which are exposed to the exterior of a vehicle small will be facilitated. Further, suppressing the angles at which light rays enter the image sensor will be facilitated, resulting in suppression of shading being facilitated.

It is preferable for the aperture stop to be disposed on the object side of the fifth lens L5.

It is preferable for the aperture stop to be disposed on the object side of the image-side surface of the fourth lens L4. Thereby, miniaturizing portions which are exposed to the exterior of the lens system will be facilitated.

It is preferable for the aperture stop to be disposed on the image side of the second lens L2. Thereby, the diameters of the seventh lens L7 and the first lens L1 can be balanced, resulting in reduction in the entire lens diameter being facilitated.

It is preferable for the aperture stop to be disposed on the image side of the third lens L3.

In order to miniaturize the portions which are exposed to the exterior of the lens system and reduce the diameters of the entire lens system in a well-balanced manner, it is preferable for the aperture stop to be disposed between the second lens L2 and the third lens L3, between the third lens L3 and the fourth lens L4, or between the fourth lens L4 and the fifth lens L5.

It is preferable for the first lens L1 to have a convex surface toward the object side. Thereby, correcting distortion favorably will be facilitated.

It is preferable for the first lens L1 to have a meniscus shape with a convex surface toward the object side. Thereby, correcting distortion will be facilitated.

It is preferable for the second lens L2 to be a lens having a convex surface toward the image side. Thereby, correcting astigmatism will be facilitated.

It is preferable for the object-side surface of the second lens L2 to be concave. Thereby, correcting distortion will be facilitated. The object-side surface of the second lens L2 may be convex. Thereby, correcting astigmatism will be facilitated.

It is preferable for the object-side surface of the third lens L3 to be convex. Thereby, correcting astigmatism will be facilitated.

It is preferable for the image-side surface of the third lens L3 to be convex. Thereby, correcting spherical aberration will be facilitated.

It is preferable for the object-side surface of the fourth lens L4 to be concave. Thereby, increasing the negative power of the fourth lens L4 will be facilitated, resulting in correction of longitudinal chromatic aberration or astigmatism being facilitated.

It is preferable for the image-side surface of the fourth lens L4 to be concave. Thereby, increasing the negative power of the fourth lens L4 will be facilitated, resulting in correction of longitudinal chromatic aberration or spherical aberration being facilitated.

It is preferable for the object-side surface of the fifth lens L5 to be concave. Thereby, correcting astigmatism will be facilitated.

It is preferable for the image-side surface of the fifth lens L5 to be convex or planar. Thereby, correcting spherical aberration will be facilitated.

It is preferable for the object-side surface of the sixth lens L6 to be convex. Thereby, correcting spherical aberration will be facilitated.

It is preferable for the image-side surface of the sixth lens L6 to be convex. Thereby, correcting astigmatism will be facilitated.

It is preferable for the object-side surface of the seventh lens L7 to be concave. Thereby, correcting astigmatism will be facilitated.

It is preferable for the image-side surface of the seventh lens L7 to be planar or convex. Thereby, suppressing the angles at which the chief rays of the off-axis rays enter the image sensor will be facilitated. Alternatively, the image-side surface of the seventh lens L7 may be concave. Thereby, correcting astigmatism will be facilitated.

It is preferable for the Abbe's number of the material for the first lens L1 with respect to the d line to be greater than or equal to 30. This enables longitudinal chromatic aberration and lateral chromatic aberration to be corrected favorably. In addition, it is more preferable for the Abbe's number of the material for the first lens L1 with respect to the d line to be greater than or equal to 35, and even more preferably greater than or equal to 40.

It is preferable for the Abbe's number of the material for the first lens L1 with respect to the d line to be less than or equal to 85. Thereby, increasing the refractive index of the material for the first lens L1 will be facilitated, resulting in achievement of a wide angle of view or reduction in the cost for the material of the first lens L1 will be facilitated. In addition, it is more preferable for the Abbe's number of the material for the first lens L1 with respect to the d line to be less than or equal to 80, even more preferably less than or equal to 70, and still more preferably less than or equal to 65.

It is preferable for the Abbe's number of the material for the second lens L2 with respect to the d line to be greater than or equal to 15. This enables longitudinal chromatic aberration to be corrected favorably. In addition, it is more preferable for the Abbe's number of the material for the second lens L2 with respect to the d line to be greater than or equal to 18, and even more preferably greater than or equal to 20.

It is preferable for the Abbe's number of the material for the second lens L2 with respect to the d line to be less than or equal to 60. This enables lateral chromatic aberration to be corrected favorably. In addition, it is more preferable for the Abbe's number of the material for the second lens L2 with respect to the d line to be less than or equal to 50, and even more preferably less than or equal to 45.

It is preferable for the Abbe's number of the material for the fourth lens L4 with respect to the d line to be less than or equal to 40. This enables longitudinal chromatic aberration to be corrected favorably. In addition, it is more preferable for the Abbe's number of the material for the fourth lens L4 with respect to the d line to be less than or equal to 35, even more preferably less than or equal to 30, still more preferably less than or equal to 25, and most preferably less than or equal to 20.

It is preferable for the Abbe's number of the material for the sixth lens L6 with respect to the d line to be greater than or equal to 30. This enables longitudinal chromatic aberration and lateral chromatic aberration to be corrected favorably. In addition, it is more preferable for the Abbe's number of the material for the sixth lens L6 with respect to the d line to be greater than or equal to 40, even more preferably greater than or equal to 50, and still more preferably greater than or equal to 55.

It is preferable for the Abbe's number of the material for the sixth lens L6 with respect to the d line to be less than or equal to 80. Thereby, reducing the cost for the material of the sixth lens L6 will be facilitated, or increasing the refractive index of the sixth lens L6 will be facilitated, resulting in correction of field curvature being facilitated. In addition, it is more preferable for the Abbe's number of the material for the sixth lens L6 with respect to the d line to be less than or equal to 70, and even more preferably less than or equal to 65.

In the imaging lenses according to the first through the third embodiments of the present disclosure, it is preferable for one of the surfaces of each lens of the first lens L1 through the seventh lens L7 to be aspherical. This enables various aberrations to be corrected favorably.

It is preferable for at least one of the surfaces of the second lens L2 to be aspherical. By configuring at least one of the surfaces of the second lens L2 to be aspherical, correcting field curvature and spherical aberration will be facilitated. This enables favorable resolution to be obtained. It is more preferable for both surfaces of the second lens L2 to be aspherical.

It is preferable for the object-side surface of the second lens L2 to be aspherical. Thereby, correcting spherical aberration, astigmatism, and distortion favorably will be facilitated.

It is preferable for the image-side surface of the second lens L2 to be aspherical. Thereby, correcting spherical aberration, astigmatism, and distortion favorably will be facilitated.

It is preferable for the object-side surface of the second lens L2 to have a shape in which the center (paraxial region) has a positive power and the edge of the effective diameter has a weaker positive power than that of the center. Alternatively, it is preferable for the object-side surface of the second lens L2 to have a shape in which the center has a positive power and the edge of the effective diameter has a negative power. Thereby, correcting spherical aberration and astigmatism will be facilitated.

In aspherical surfaces, "a convex surface (a positive power)" and "a concave surface (a negative power)" should be considered in paraxial regions, unless otherwise noted. The power at each of the points in regions outside the paraxial regions in aspherical surfaces should be determined depending on whether the absolute value of the radius of curvature at a certain point is larger or smaller than the absolute value of the paraxial radius of curvature. In such a case, the radius of curvature at the certain point is the length from the certain point to the point at which the normal line of the surface at the certain point intersects with the optical axis. When the absolute value of the radius of curvature at a certain point on an aspherical surface is greater than the absolute value of the paraxial radius of curvature, power at the point is smaller (weaker) than those in the paraxial regions. When the absolute value of the radius of curvature at a certain point on an aspherical surface is smaller than the absolute value of the paraxial radius of curvature, the power at the point is greater (stronger) than those in the paraxial regions.

In aspherical surfaces, "a convex surface (a positive power)" or "a concave surface (a negative power)" at each of the points in regions outside the paraxial regions is determined depending on which side of a point at which a surface at a certain point intersects with the optical axis a point at which the normal line intersects with the optical axis is. In the case that a surface is on the object side, when a point at which the normal line intersects with the optical axis is on the image side of a point at which a surface at a certain point intersects with the optical axis, the surface at the certain point is a convex surface (positive power). Further, when a point at which the normal line intersects with the optical axis is on the object side of a point at which a surface at a certain point intersects with the optical axis, the surface at the certain point is concave (negative power). In the case that a surface is on the image side, when a point at which the normal line intersects with the optical axis is on the object side of a point at which a surface at a certain point intersects with the optical axis, the surface at the certain point is convex (positive power). Further, when a point at which the normal line intersects with the optical axis is on the image side of a point at which a surface at a certain point intersects with the optical axis, the surface at the certain point is concave (negative power).

Note that "the effective diameter of a surface" refers to the diameter of a circle constituted by an outermost point in the radial direction (a point farthest from the optical axis) among points where all of the rays contributing to image formation intersect with lens surfaces, and the term "edge of the effective diameter" refers to this outermost point. Note that in systems which have rotation symmetry with respect to the optical axis, a graphic constituted by the above outermost point is a circle. However, in systems which do not have rotation symmetry, the graphic is not a circle. In such a case, the diameter of an equivalent circle may be the effective diameter.

Figure 2:
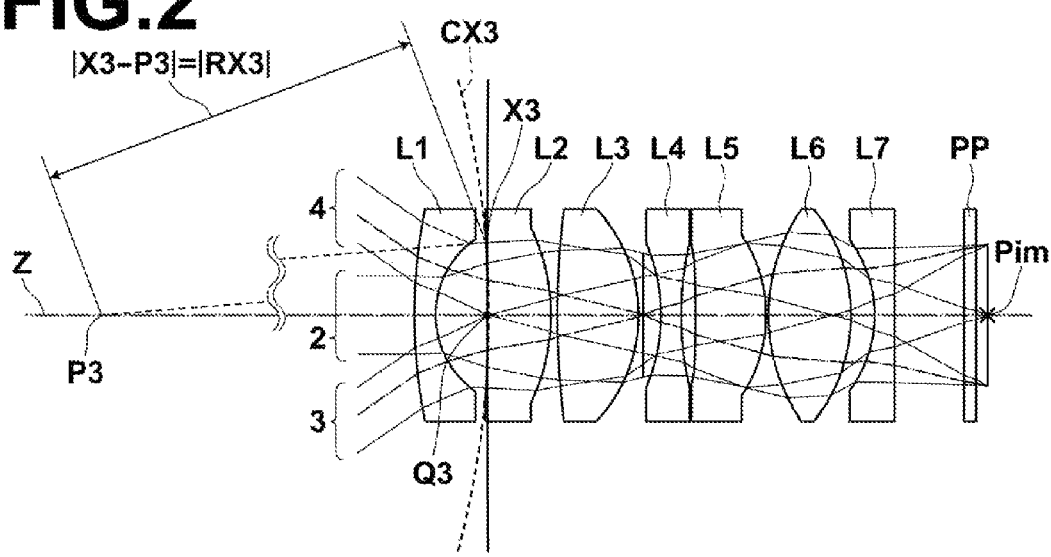
FIG. 2 is a view for explaining a surface shape and the like of the second lens.

A shape of an aspherical surface will be specifically described below. FIG. 2 is a diagram for describing the shape of a second lens surface. Here, a lens surface of each lens is i. "i" is a symbol which represents the corresponding lens surface. For example, when the object-side surface of the second lens L2 is represented by 3, the following description with respect to the object-side surface of the second lens L2 can be understood with i as 3. Further, when a certain point on a lens surface i is designated as Xi and an intersection of the normal line on the point and the optical axis is designated as Pi, the length (|Xi-Pi|) of Xi-Pi is defined as the absolute value |RXi| of the radius of curvature on the point Xi, and Pi is defined as the center of curvature at the point Xi. Further, an intersection of the i-th lens surface and the optical axis is designated as Qi. In this case, a power at a point Xi is defined depending on whether a point Pi is on the object side or the image side based on a point Qi as the reference. In the object-side surface, in the case that a point Pi is on the image side of a point Qi, the power is defined as positive, whereas in the case that the point Pi is on the object side of the point Qi, the power is defined as negative. In the image-side surface, in the case that the point Pi is on the object side of the point Qi, the power is defined as positive, whereas in the case that the point Pi is on the image side of the point Qi, the power is defined as negative.

When the power in the center is compared to the power at the point Xi, the absolute value of the radius of curvature in the center (paraxial radius of curvature) is compared to the absolute value |RXi| of the radius of curvature at the point Xi. In the case that |RXi| is smaller than the absolute value of the paraxial radius of curvature, the power at the point Xi is greater than the power in the center. In contrast, in the case that |RXi| is greater than the absolute value of the paraxial radius of curvature, the power at the point Xi is weaker than the power in the center. The same applies to both the case that a surface has the positive power and the case that a surface has the negative power.

Here, referring to FIG. 2, the shape of the object-side surface of the second lens L2 above will be described. FIG. 2 illustrates an optical path diagram of the imaging lens 1 illustrated in FIG. 1. In FIG. 2, a point Q3 is the center of the object-side surface of the second lens L2, and an intersection of the object-side surface of the second lens L2 and the optical axis Z. Further, in FIG. 2, the point X3 on the object-side surface of the second lens L2 is at the edge of the effective diameter, and is an intersection of the outermost ray, which is included in off-axis rays 3, and the object-side surface of the second lens L2. In FIG. 2, although the point X3 is at the edge of the effective diameter, the point X3 is an arbitrary point on the object-side surface of the second lens L2. Therefore, other points can be understood in the same manner.

In this case, an intersection of the normal line of a lens surface at a point X3 with the optical axis Z is defined as a point P3 as illustrated in FIG. 2, a line segment X3-P3 connecting between a point X3 and a point P3 is defined as the radius of curvature RX3 at the point X3, and the length |X3-P3| of the line segment X3-P3 is defined as the absolute value |RX3| of the radius of curvature RX3. That is, |X3-P3| is |RX3|. Further, the radius of curvature at the point Q3, i.e., the radius of curvature in the center of the object-side surface of the second lens L2 is designated as R3, and the absolute value thereof is designated as |R3| (not shown in FIG. 2 because the value of |R3| is extremely large).

For example, the expression "a shape in which the center has a positive power and the edge of the effective diameter has a negative power" of the object-side surface of the second lens L2 described above means, when a point X3 is the edge of the effective diameter, a convex shape in the paraxial region including a point Q3 and a shape in which a point P3 is on the object side of the point Q3.

Further, the expression "the center has a positive power, and the edge of the effective diameter has a weaker positive power than that of the center" of the object-side surface of the second lens L2 means, when a point X3 is the edge of the effective diameter, a convex shape in the paraxial region including a point Q3 and a shape in which a point P3 is on the image side than the point Q3 and the absolute value |RX3| of the radius of curvature at a point X3 is greater than the absolute value |R3| of the radius of curvature at the point Q3.

The object-side surface of the second lens L2 may have a shape in which the center has a negative power and the edge of the effective diameter has a weaker negative power than that of the center. Thereby, correcting spherical aberration and astigmatism will be facilitated.

In addition, the object-side surface of the second lens L2 may have a shape in which the center has a positive power and the edge of the effective diameter has a stronger positive power than that of the center. Thereby, correcting astigmatism will be facilitated.

It is preferable for the image-side surface of the second lens L2 to have a shape in which the center has a positive power and the edge of the effective diameter has a weaker positive power than that of the center, or a shape in which the center has a positive power and the edge of the effective diameter has a negative power. Thereby, correcting spherical aberration and astigmatism will be facilitated.

It is preferable for at least one of the surfaces of the third lens L3 to be aspherical. By configuring at least one of the surfaces of the third lens L3 to be aspherical, correcting spherical aberration and astigmatism will be facilitated. This enables favorable resolution to be obtained. It is more preferable for both surfaces of the third lens L3 to be aspherical.

It is preferable for the object-side surface of the third lens L3 to be aspherical. Thereby, correcting spherical aberration and astigmatism favorably will be facilitated.

The object-side surface of the third lens L3 may have a shape in which the center has a positive power and the edge of the effective diameter has a weaker positive power than that of the center. Thereby, correcting spherical aberration and astigmatism will be facilitated.

It is preferable for the image-side surface of the third lens L3 to be aspherical. Thereby, correcting spherical aberration favorably will be facilitated.

The image-side surface of the third lens L3 may have a shape in which the center has a positive power and the edge of the effective diameter has a stronger positive power than that of the center. Thereby, correcting spherical aberration will be facilitated.

It is preferable for at least one of the surfaces of the fourth lens L4 to be aspherical. By configuring at least one of the surfaces of the fourth lens L4 to be aspherical, correcting spherical aberration and field curvature will be facilitated. This enables favorable resolution to be obtained. It is more preferable for both surfaces of the fourth lens L4 to be aspherical.

It is preferable for the object-side surface of the fourth lens L4 to have a shape in which the center has a negative power and the edge of the effective diameter has a weaker negative power than that of the center. Thereby, correcting spherical aberration and astigmatism will be facilitated.

It is preferable for the image-side surface of the fourth lens L4 to have a shape in which the center has a negative power and the edge of the effective diameter has a stronger negative power than that of the center. Thereby, correcting spherical aberration and astigmatism will be facilitated.

It is preferable for at least one of the surfaces of the fifth lens L5 to be aspherical. By configuring at least one of the surfaces of the fifth lens L5 to be aspherical, correcting spherical aberration and astigmatism will be facilitated. This enables favorable resolution to be obtained. It is more preferable for both surfaces of the fifth lens L5 to be aspherical.

It is preferable for the object-side surface of the fifth lens L5 to be aspherical. Thereby, correcting spherical aberration and astigmatism favorably will be facilitated.

It is preferable for the object-side surface of the fifth lens L5 to have a shape in which the center has a negative power and the edge of the effective diameter has a stronger negative power than that of the center or a shape in which the center has a positive power and the edge of the effective diameter has a negative power. Thereby, correcting spherical aberration will be facilitated.

The object-side surface of the fifth lens L5 may have a shape in which the center has a positive power and the edge of the effective diameter has a stronger positive power than that of the center. Thereby, correcting astigmatism will be facilitated.

It is preferable for the image-side surface of the fifth lens L5 to be aspherical. Thereby, correcting spherical aberration and astigmatism favorably will be facilitated.

The image-side surface of the fifth lens L5 may have a shape in which the center has a positive power and the edge of the effective diameter has a stronger positive power than that of the center. Thereby, correcting astigmatism will be facilitated.

The image-side surface of the fifth lens L5 may have a shape in which the center has a positive power and the edge of the effective diameter has a weaker positive power than that of the center. Thereby, correcting spherical aberration will be facilitated.

It is preferable for at least one of the surfaces of the seventh lens L7 to be aspherical. By configuring at least one of the surfaces of the seventh lens L7 to be aspherical, correcting spherical aberration and astigmatism will be facilitated. This enables favorable resolution to be obtained. It is more preferable for both surfaces of the seventh lens L7 to be aspherical.

It is preferable for the object-side surface of the seventh lens L7 to be aspherical. Thereby, correcting spherical aberration and astigmatism favorably will be facilitated.

The object-side surface of the seventh lens L7 may have a shape in which the center has a negative power and the edge of the effective diameter has a stronger negative power than that of the center. Thereby, correcting astigmatism and comatic aberration will be facilitated.

It is preferable for the image-side surface of the seventh lens L7 to be aspherical. Thereby, correcting spherical aberration favorably will be facilitated.

The image-side surface of the seventh lens L7 may have a shape in which the center has a negative power and the edge of the effective diameter has a weaker negative power than that of the center or a shape in which the center has a negative power and the edge of the effective diameter has a positive power. Thereby, correcting astigmatism will be facilitated.

The image-side surface of the seventh lens L7 may have a shape in which the center has a planar surface or a positive power, and the edge of the effective diameter has a stronger positive power than that of the center. Thereby, correcting astigmatism will be facilitated.

It is preferable for the material of the first lens L1 to be glass. For example, when the imaging lens is used in severe environments as vehicle mounted cameras, surveillance cameras, and the like, there is demand for the first lens L1 disposed at the most-object side to be made of a material which is resistant to surface deterioration caused by wind and rain, changes in temperature due to direct sunlight, and chemical agents such as oil, a detergent, and the like, i.e., a material which has high water resistance, weather resistance, acid resistance, chemical resistance, and the like. Further, there is demand for the first lens L1 to be made of a material which is hard and not likely to break. Configuring the material to be glass enables these demands to be satisfied. Alternatively, the material for the first lens L1 may be a transparent ceramic.

Note that protection means for improving the strength, scratch resistance, and chemical resistance may be provided on the object-side surface of the first lens L1. In such a case, the material of the first lens L1 may be plastic. Such protection means may be a hard coat or a water-repelling coat.

In lenses for vehicle mounted cameras, for example, there is demand for the lenses to be resistant to various impacts. Accordingly, it is preferable for the first lens L1 to be thick, and for the center thickness of the first lens L1 to be greater than or equal to 0.5 mm.

When used for vehicle mounted cameras, for example, lenses are required to be usable in a wide temperature range from ambient temperatures in cold climates to temperatures in the interior of vehicles in summer in the tropics. In order to manufacture optical systems which have good environmental resistance sufficient to withstand such conditions, it is preferable for all the lenses to be glass. When used as lenses for surveillance cameras or for vehicle mounted cameras, there is possibility for the imaging lens to be used under various conditions such as a wide temperature range from a high temperature to a low temperature, high humidity, and the like. In order to manufacture the optical systems which are resistant to these conditions, it is preferable for all the lenses to be formed of glass.

It is preferable for the materials of any one or a plurality of arbitrary combinations of the first lens L1 through the seventh lens L7 to be plastic. Configuring the materials to be plastic facilitates reduction in the cost and the weight of the lens system and enables aspherical surface shapes to be manufactured accurately and inexpensively, resulting in correction of spherical aberration and field curvature becoming possible.

It is preferable for the imaging lens to include a plastic lens having a positive power and a plastic lens having a negative power in order to manufacture the lens system which is resistant to changes in temperature. In general, plastic lenses have characteristics which vary significantly due to changes in temperature, which causes focus shift to occur. However, configuring the lens system to include the plastic lens having a positive power and the plastic lens having a negative power causes changes in the power to be cancelled out, thereby enabling deterioration in performance to be minimized.

Acrylic, a polyolefin-based material, a polycarbonate-based material, an epoxy resin, PET (Polyethylene terephthalate), PES (Poly Ether Sulphone), a polycarbonate, and the like can be employed as the material of the plastic, for example.

Note that a filter which cuts blue light from ultraviolet light or an IR (InfraRed) cutting filter which cuts infrared light may be provided between the lens system and the image sensor 5 according to the application of the imaging lens 1. A coating which has the same characteristics as those of the filters above may be applied onto the lens surface. Alternatively, materials which absorb ultraviolet light, blue light, infrared light, and the like may be applied as the materials of any of the lenses.

FIG. 1 shows the example in which an optical member PP that presumes various types of filters, and the like is disposed between the lens system and the image sensor 5, but these various types of filters may be disposed between the respective lenses, instead. Alternatively, a coating, which exhibits the same effects as the various types of filters, may be applied onto the lens surfaces of any of the lenses included in the imaging lens.

Note that there is a possibility that the rays which pass the exterior of the effective diameters between the respective lenses will become stray light and reach the image surface, resulting in turning to ghosts. Accordingly, it is preferable for a light cutting means for shielding the stray light to be provided as necessary. As this light cutting means, an opaque paint may be applied onto portions of the outside of the effective diameters of the lenses, or an opaque plate may be provided therein, for example. Alternatively, opaque plates may be provided as the light cutting means on optical paths of the rays which become stray light. Alternatively, something like a hood for shielding stray light may be disposed more toward the object side than the most-object-side lens. FIG. 1 shows an example in which light cutting means 11 is provided at the exterior of the effective diameter of the image-side surface of the first lens L1. Note that the positions in which the light cutting means are provided are not limited to the example shown in FIG. 1, and the light cutting means may be provided on other lenses or between the lenses.

Moreover, members such as a stop and the like which shields peripheral rays may be disposed between the respective lenses within a range in which no actual problems for the ratio of the amount of peripheral rays will arise. The peripheral rays are rays which pass through peripheral portions of an entrance pupil in the optical system among the rays emitted from an object point outside of the optical axis Z. Disposing the member which shields the peripheral rays in such a manner enables image quality of the peripheral portions of the image formation region to be improved. Further, shielding the light which generates ghosts by the member enables ghosts to be reduced.

Further, it is preferable for the lens system to be configured by only seven lenses including a first lens L1 through a seventh lens L7.

The imaging apparatus according to the present embodiment is equipped with the imaging lens according to the present embodiment. Accordingly, the imaging apparatus can be configured in the small size, and bright and favorable images with high resolution can be obtained by using an image sensor.

Note that images captured by the imaging apparatus provided with the imaging lenses according to the first embodiment through the third embodiment may be displayed on mobile phones (including smart phones). For example, there is a case that the imaging apparatus provided with the imaging lens of the present embodiment is mounted on a car as a vehicle mounted camera, the vehicle mounted camera captures images behind and around the car, and then the captured images are displayed on a display device. In such a case, in a car mounted with a car navigation system, the captured images can be displayed on the display device of the car navigation system. However, in the case that the car navigation system is not mounted on the car, a dedicated display device such as a liquid crystal display, or the like is required to be installed in the car. However, display devices are expensive. Meanwhile, the recent mobile phones are mounted with display devices having high performance which enables moving pictures and web sites to be viewed. Using mobile phones as the display devices for vehicle mounted cameras eliminates the necessity for mounting dedicated display devices on cars without car navigation systems, resulting in enabling vehicle mounted cameras to be mounted on cars at low cost.

Here, the images captured by the vehicle mounted camera may be wire-transmitted to a mobile phone via a cable, and the like or may be wirelessly transmitted to a mobile phone via infrared communication, and the like. Further, when the car's gear is set to reverse or a turn signal is activated, the images captured by the vehicle mounted camera may be automatically displayed on the display device of the mobile phone by coordinating the operating condition of the mobile phone with that of the car.

Note that the display device for displaying images captured by the vehicle mounted camera is not limited to a mobile phone, and may be such a portable data terminal as a PDA, and the like, a compact personal computer, or a laptop car navigation system.

Further, a mobile phone equipped with the imaging lens of the present disclosure may be fixed to a car to be used as a vehicle mounted camera. Recent smart phones have processing capabilities which are equivalent to those of PC's. Accordingly, the cameras for the mobile phones can be employed the same as vehicle mounted cameras, for example by fixing a mobile phone to a dashboard, and the like in the car, and directing the camera forward. Note that a function for recognizing white lines and road signs and giving a caution may be included as an application for the smart phone. Further, the mobile phone may be a system which executes warnings when dozing and looking-aside are found by directing the camera towards a driver. Further, the mobile phone may be a part of the system that performs a steering wheel operation by coordinating with the car. There is demand for vehicle mounted camera to be resistant to severe environments because cars are left in high temperature environments and low temperature environments. When the imaging lens of the present disclosure is mounted on mobile phones, the mobile phones will be carried with drivers out of the cars except while driving. Accordingly, the imaging lens can be made less resistant to the environment; thereby a vehicle mounted system can be introduced at low cost.

[Numerical Examples of the Imaging Lens]

Next, Numerical Examples of the imaging lens of the present disclosure will be described.

Example 1

Figure 3:
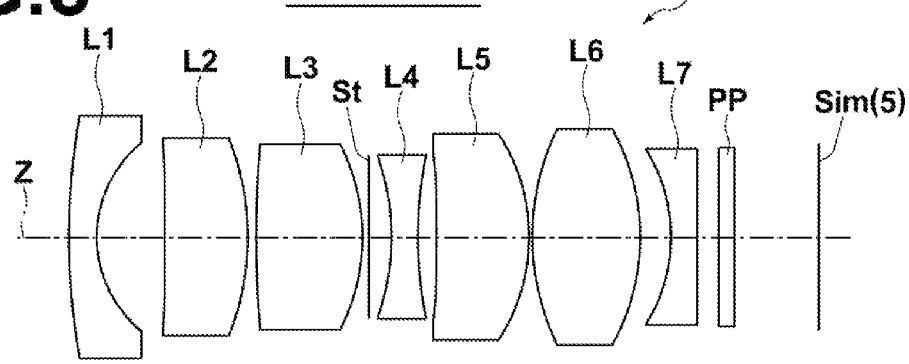
FIG. 3 is a cross-sectional view illustrating the lens configuration of an imaging lens of Example 1 of the present disclosure.

FIG. 3 illustrates a cross-sectional view illustrating the lens configuration of an imaging lens of Example 1. In FIG. 3, the left side is the object side, and the right side is the image side. An aperture stop St, an optical member PP, and an image sensor 5 disposed on an image surface Sim are also shown in the same manner as in FIG. 1. An aperture stop St of each of the Figures does not necessarily represent the shape or size thereof, but the position thereof on the optical axis Z. Tables represents data related to the imaging lens of Example 1. In Table 1, (A) denotes basic lens data, (B) denotes various data, and (C) denotes aspherical surface data.

In basic lens data, the column of Si shows the i-th (i=1, 2, 3, . . . ) surface number, the value of i sequentially increasing from the object-side surface of the constituent element at the most object side, which is designated as 1, toward the image side. The column Ri shows the radii of curvature of the i-th surface, and the column Di shows the distances between i-th surfaces and i+1st surfaces along the optical axis Z. Further, the column Ndj shows the refractive indices of j-th (j=1, 2, 3, . . . ) constituent elements with respect to the d-line (wavelength: 587.56 nm), the value of j sequentially increasing from the constituent element at the most object side, which is designated as 1, toward the image side. The column vdj shows the Abbe numbers of j-th optical elements with respect to the d-line.

Note that the basic lens data also shows an aperture stop St and an optical member PP. The column of the surface number of a surface corresponding to the aperture stop St indicates the letters (St). Note that the sign of the radius of curvature is positive in the case that a surface shape has a convex surface toward the object side, and negative in the case that a surface shape has a convex toward the image side.

In various data, L (in Air) is the distance (air converted length corresponds to back focus) along the optical axis Z from the object-side surface of the first lens L1 to the image surface Sim, Bf (in Air) is the distance (air converted length corresponds to back focus) along the optical axis from the image-side surface of the most-image-side lens to the image surface Sim, f is the focal length of the entire system, f1 through f7 are the respective focal lengths of the first lens through the seventh lens L7, f12 is the combined focal length of the first lens L1 and the second lens L2, f45 is the combined focal length of the fourth lens L4 and the fifth lens L5, f123 is the combined focal length of the first lens L1, the second lens L2, and the third lens L3, f234 is the combined focal length of the second lens L2, the third lens L3, and the fourth lens L4, f345 is the combined focal length of the third lens L3, the fourth lens L4, and the fifth lens L5, f2345 is the combined focal length of the second lens L2, the third lens L3, the fourth lens L4, and the fifth lens L5, f3456 is the combined focal length of the third lens L3, the fourth lens L4, the fifth lens L5, and the sixth lens L6, and f12345 is the combined focal length of the first lens L1, the second lens L2, the third lens L3, the fourth lens L4, and the fifth lens L5.

In the basic lens data, the mark "*" is indicated at surface numbers of aspherical surfaces. Numerical values of paraxial radii of curvature (the radii of curvature of the center) are shown as the radii of curvature of aspherical surfaces. The aspherical surface data shows surface numbers of the aspherical surfaces and aspherical surface coefficients with respect to the aspherical surfaces. Note that "E-n" (n: integer) in each of the numerical values of the aspherical surface coefficients means "×10$^{-n}$", and "E+n" therein means "×10$^n$". The aspherical surface coefficients are the values of respective coefficients K, RBm (m=3, 4, 5, ... 11) in the aspherical surface formula below:

$$Zd = C \cdot h^2 / \{1 + (1 - K \cdot C^2 \cdot h^2)^{1/2}\} + \Sigma RBm \cdot h^m$$

where,
Zd is the depth of an aspheric surface (the length of a perpendicular line drawn from a point on an aspheric surface with a height h to a plane perpendicular to the optical axis which contacts the peak of the aspheric surface),
h is height (the distance from the optical axis to a lens surface),
C is an inverse number of a paraxial radius of curvature,
K, RBm is aspherical surface coefficients (m=3, 4, 5, ... 11).

In each of Tables below, mm is used as the unit of length, but other appropriate units may also be used, as optical systems are usable even when they are proportionally enlarged or miniaturized. In addition, the numerical values in Table 1 are rounded to a predetermined number of digits.

TABLE 1

Example 1

(A)

| Si | Ri | Di | Ndj | ν dj |
|---|---|---|---|---|
| 1 | 22.5983 | 0.9000 | 1.7550 | 52.3 |
| 2 | 3.9407 | 2.2000 | | |
| *3 | 1418.1890 | 2.7000 | 1.6889 | 31.1 |
| 4 | −8.6283 | 0.2674 | | |
| 5 | 35.5170 | 3.4500 | 1.6180 | 63.3 |
| 6 | −6.5413 | 0.2000 | | |
| 7(St) | ∞ | 0.7499 | | |
| 8 | −7.7661 | 0.8527 | 1.8081 | 22.8 |
| 9 | 13.1836 | 0.6000 | | |
| *10 | −128.2980 | 3.0000 | 1.6935 | 53.2 |
| *11 | −6.2299 | 0.1072 | | |
| 12 | 7.9583 | 3.5000 | 1.6180 | 63.3 |
| 13 | −7.2032 | 0.9972 | | |
| 14 | −5.3495 | 0.8502 | 1.6989 | 30.1 |
| 15 | ∞ | 0.70000 | | |
| 16 | ∞ | 0.50000 | 1.5168 | 64.2 |
| 17 | ∞ | 2.74583 | | |
| Image Surface | ∞ | | | |

(B)

| | |
|---|---|
| L(in Air) | 24.15 |
| Bf(in Air) | 3.78 |
| f | 4.89 |
| f1 | −6.46 |
| f2 | 12.46 |
| f3 | 9.23 |
| f4 | −5.94 |
| f5 | 9.35 |
| f6 | 6.71 |
| f7 | −7.65 |
| f12 | −34.63 |
| f45 | −82.49 |
| f123 | 6.76 |
| f234 | 13.80 |
| f345 | 15.05 |
| f2345 | 8.83 |
| f3456 | 5.18 |
| f12345 | 11.43 |

(C)

| Surface Numbers | K | RB3 | RB4 | RB5 | RB6 |
|---|---|---|---|---|---|
| 3 | 1.0000000E+00 | 9.4054568E−04 | −9.6514452E−04 | 2.8120323E−04 | −4.8998712E−04 |
| 10 | 1.0000000E+00 | 7.9959130E−04 | −8.3031227E−04 | 3.7856728E−05 | −5.9007147E−04 |
| 11 | 1.0000000E+00 | 5.3789577E−03 | −8.8065545E−03 | 5.8275261E−03 | −8.9014027E−04 |

(C)

| Surface Numbers | RB7 | RB8 | RB9 | RB10 | RB11 |
|---|---|---|---|---|---|
| 3 | 1.1874261E−04 | 9.9267336E−05 | −5.1706250E−05 | 6.6665663E−06 | 0.0000000E+00 |
| 10 | 5.4237086E−04 | −1.9861960E−04 | 1.3536992E−05 | 4.2587338E−06 | −4.5704597E−07 |
| 11 | −7.0952284E−04 | 2.2388477E−04 | 6.3404446E−05 | −3.6597826E−05 | 4.4253374E−06 |

FIG. 29 are diagrams that illustrates, in order from the left of the drawing sheet, spherical aberration, astigmatism, distortion, and lateral chromatic aberration of the imaging lens in Example 1. F in each of spherical aberrations diagrams refers to an F value, ω in each of the other aberration diagrams refers to a half angle of view. Distortion diagrams show the amount of displacement from an ideal image height which is f×tan(ϕ) by using the focal length f of the entire system and an angle of view ϕ (which is a variable, 0≤ϕ≤ω). Each aberration diagram shows aberration with respect to the d-line (wavelength: 587.56 nm) as the reference wavelength. The spherical aberration diagram also shows aberrations with respect to the F-line (wavelength: 486.13 nm), the C-line (wavelength: 656.27 nm), the s-line (wavelength: 852.11 nm), and aberration with respect to the offense against the sine condition (denoted as SNC). The lateral chromatic aberration diagram also shows aberrations with respect to the F-line, the C-line, and the s-line. The types of lines in the lateral chromatic aberration diagram are the same as those in the spherical aberration diagram. Accordingly, redundant descriptions thereof will be omitted.

As the items in the data, the meanings thereof, and the manners in which they are shown, in the descriptions for Example 1 above, apply to Examples below, unless otherwise noted.

Example 2

FIG. 4 is a cross-sectional view illustrating the imaging lens of Example 2. Table 2 represents basic lens data, various data, and aspherical surface data regarding the imaging lens of Example 2. FIG. 30 illustrates, in order from the left of the drawing sheet, spherical aberration diagram, astigmatism diagram, distortion diagram, and lateral chromatic aberration diagram of the imaging lens in Example 2.

TABLE 2

Example 2

(A)

| Si | Ri | Di | Ndj | ν dj |
|---|---|---|---|---|
| 1 | 22.9171 | 0.8999 | 1.8348 | 42.7 |
| 2 | 3.7817 | 2.0863 | | |
| *3 | 402.1602 | 2.7000 | 1.6889 | 31.1 |
| 4 | −7.3284 | 0.2497 | | |
| 5 | 29.8443 | 3.4499 | 1.6180 | 63.3 |
| 6 | −6.5019 | 0.2000 | | |
| 7(St) | ∞ | 0.7499 | | |
| 8 | −8.6828 | 0.7999 | 1.8052 | 25.4 |
| 9 | 9.3477 | 0.6000 | | |
| *10 | −89.1771 | 2.8653 | 1.6935 | 53.2 |
| *11 | −6.6544 | 0.1072 | | |
| 12 | 7.5575 | 3.5000 | 1.6180 | 63.3 |
| 13 | −7.2865 | 1.0315 | | |
| 14 | −5.1335 | 0.8502 | 1.7847 | 26.3 |
| 15 | −20.0000 | 0.70000 | | |
| 16 | ∞ | 0.50000 | 1.5168 | 64.2 |
| 17 | ∞ | 3.07701 | | |
| Image Surface | ∞ | | | |

(B)

| | |
|---|---|
| L(in Air) | 24.20 |
| Bf(in Air) | 4.11 |
| f | 4.89 |
| f1 | −5.54 |
| f2 | 10.48 |
| f3 | 8.96 |
| f4 | −5.48 |
| f5 | 10.22 |
| f6 | 6.60 |
| f7 | −9.03 |
| f12 | −42.40 |
| f45 | −26.52 |
| f123 | 6.05 |
| f234 | 10.97 |
| f345 | 19.34 |
| f2345 | 8.48 |
| f3456 | 5.45 |
| f12345 | 14.58 |

(C)

| Surface Numbers | K | RB3 | RB4 | RB5 | RB6 |
|---|---|---|---|---|---|
| 3 | 1.0000000E+00 | 2.3066340E−03 | −2.7796590E−03 | 1.1546321E−03 | −5.9238900E−04 |
| 10 | 1.0000000E+00 | −9.4583077E−05 | 7.1009942E−04 | −4.1812964E−04 | −6.5397848E−04 |
| 11 | 1.0000000E+00 | 5.5794377E−03 | −9.5264121E−03 | 6.5158329E−03 | −1.1461634E−03 |

TABLE 2-continued

Example 2

(C)

| Surface Numbers | RB7 | RB8 | RB9 | RB10 | RB11 |
|---|---|---|---|---|---|
| 3 | 7.4730944E−05 | 1.0249124E−04 | −4.8055549E−05 | 6.3602745E−06 | 0.0000000E+00 |
| 10 | 6.1447509E−04 | −1.9617303E−04 | 5.8341263E−06 | 3.9869439E−06 | −1.9528722E−07 |
| 11 | −7.1763112E−04 | 2.4245511E−04 | 6.5090033E−05 | −3.9128704E−05 | 4.7994810E−06 |

Example 3

FIG. 5 is a cross-sectional view illustrating the imaging lens in Example 3. Table 3 represents basic lens data, various data, and aspherical surface data regarding the imaging lens of Example 3. FIG. 31 illustrates, in order from the left of the drawing sheet, spherical aberration diagram, astigmatism diagram, distortion diagram, and lateral chromatic aberration diagram of the imaging lens in Example 3.

TABLE 3

Example 3

(A)

| Si | Ri | Di | Ndj | ν dj |
|---|---|---|---|---|
| 1 | 21.4885 | 0.9000 | 1.7725 | 49.6 |
| 2 | 4.2150 | 2.2000 | | |
| *3 | 57.7016 | 3.0624 | 1.6889 | 31.1 |
| 4 | −10.9634 | 0.3001 | | |
| 5 | 36.9490 | 3.4767 | 1.6180 | 63.3 |
| 6 | −7.1861 | 0.2000 | | |
| 7(St) | ∞ | 0.7499 | | |
| 8 | −10.0009 | 1.0000 | 1.8052 | 25.4 |
| 9 | 12.9243 | 0.6000 | | |
| *10 | −422.9977 | 3.0001 | 1.6935 | 53.2 |
| *11 | −5.9633 | 0.1072 | | |
| 12 | 7.0131 | 3.5000 | 1.6180 | 63.3 |
| 13 | −7.4273 | 0.8800 | | |
| 14 | −5.7143 | 0.9001 | 1.7847 | 26.3 |
| 15 | 20.0000 | 0.70000 | | |
| 16 | ∞ | 0.50000 | 1.5168 | 64.2 |
| 17 | ∞ | 2.09800 | | |
| Image Surface | ∞ | | | |

(B)

| | |
|---|---|
| L(in Air) | 24.00 |
| Bf(in Air) | 3.13 |
| f | 4.82 |
| f1 | −6.95 |
| f2 | 13.62 |
| f3 | 10.04 |
| f4 | −6.87 |
| f5 | 8.70 |
| f6 | 6.43 |
| f7 | −5.58 |
| f12 | −31.02 |
| f45 | 68.63 |
| f123 | 7.86 |
| f234 | 14.15 |
| f345 | 12.34 |
| f2345 | 8.66 |
| f3456 | 4.84 |
| f12345 | 9.24 |

(C)

| Surface Numbers | K | RB3 | RB4 | RB5 | RB6 |
|---|---|---|---|---|---|
| 3 | 1.0000000E+00 | 3.9174131E−03 | −3.6453651E−03 | 1.3998443E−03 | −5.8434217E−04 |
| 10 | 1.0000000E+00 | −9.1930626E−04 | 2.6210642E−04 | −5.1547775E−04 | −7.1766130E−04 |
| 11 | 1.0000000E+00 | 6.0059266E−03 | −1.0130481E−02 | 6.8629110E−03 | −1.2178260E−03 |

TABLE 3-continued

Example 3

(C)

| Surface Numbers | RB7 | RB8 | RB9 | RB10 | RB11 |
|---|---|---|---|---|---|
| 3 | 7.0852888E−05 | 9.9541709E−05 | −4.7335262E−05 | 6.0476550E−06 | 0.0000000E+00 |
| 10 | 6.0961095E−04 | −1.8934937E−04 | 8.5566180E−06 | 3.5780252E−06 | −1.8091868E−07 |
| 11 | −7.3636161E−04 | 2.4605836E−04 | 6.7182256E−05 | −3.8997464E−05 | 4.6757708E−06 |

Example 4

FIG. 6 is a cross-sectional view illustrating the imaging lens in Example 4. Table 4 represents basic lens data, various data, and aspherical surface data regarding the imaging lens of Example 6. FIG. 32 illustrates, in order from the left of the drawing sheet, spherical aberration diagram, astigmatism diagram, distortion diagram, and lateral chromatic aberration diagram of the imaging lens in Example 4.

TABLE 4

Example 4

(A)

| Si | Ri | Di | Ndj | ν dj |
|---|---|---|---|---|
| 1 | 19.5671 | 0.7999 | 1.7725 | 49.6 |
| 2 | 3.9995 | 2.2000 | | |
| *3 | −64.5178 | 2.7000 | 1.9229 | 20.9 |
| 4 | −9.6381 | 0.2497 | | |
| 5 | 30.8617 | 3.5500 | 1.6180 | 63.3 |
| 6 | −7.0917 | 0.2000 | | |
| 7(St) | ∞ | 0.7496 | | |
| 8 | −10.5844 | 0.8000 | 1.9229 | 18.9 |
| 9 | 10.8471 | 0.6000 | | |
| *10 | −82.7195 | 3.0000 | 1.8061 | 40.9 |
| *11 | −7.0089 | 0.1072 | | |
| 12 | 7.6129 | 3.6000 | 1.6180 | 63.3 |
| 13 | −7.6128 | 0.8502 | | |
| 14 | −5.4925 | 0.8999 | 1.6034 | 38.0 |
| 15 | ∞ | 0.70000 | | |
| 16 | ∞ | 0.50000 | 1.5168 | 64.2 |
| 17 | ∞ | 2.80562 | | |
| Image Surface | ∞ | | | |

(B)

| | |
|---|---|
| L(in Air) | 24.14 |
| Bf(in Air) | 3.84 |
| f | 4.91 |
| f1 | −6.66 |
| f2 | 11.99 |
| f3 | 9.68 |
| f4 | −5.70 |
| f5 | 9.33 |
| f6 | 6.77 |
| f7 | −9.10 |
| f12 | −48.56 |
| f45 | −51.10 |
| f123 | 6.94 |
| f234 | 14.35 |
| f345 | 17.16 |
| f2345 | 8.92 |
| f3456 | 5.31 |
| f12345 | 12.93 |

(C)

| Surface Numbers | K | RB3 | RB4 | RB5 | RB6 |
|---|---|---|---|---|---|
| 3 | 1.0000000E+00 | −1.3702487E−05 | 7.9431611E−04 | −1.1899369E−03 | 2.1183448E−04 |
| 10 | 1.0000000E+00 | −1.6560060E−03 | 4.7231665E−03 | −4.9882551E−03 | 1.5846179E−03 |
| 11 | 1.0000000E+00 | 2.1959441E−03 | −2.9599396E−03 | 1.1861529E−03 | 5.2111461E−04 |

TABLE 4-continued

Example 4

(C)

| Surface Numbers | RB7 | RB8 | RB9 | RB10 | RB11 |
|---|---|---|---|---|---|
| 3 | 4.6400135E−07 | 6.5081839E−05 | −3.5556830E−05 | 4.9959536E−06 | 0.0000000E+00 |
| 10 | 6.2284621E−04 | −4.9028670E−04 | 2.0449961E−05 | 4.1227663E−05 | −7.6257982E−06 |
| 11 | −5.6640934E−04 | 9.3984370E−05 | 4.5098336E−05 | −1.9218804E−05 | 2.0741270E−06 |

Example 5

FIG. 7 is a cross-sectional view illustrating the imaging lens in Example 5. Table 5 represents basic lens data, various data, and aspherical surface data regarding the imaging lens of Example 5. FIG. 33 illustrates, in order from the left of the drawing sheet, spherical aberration diagram, astigmatism diagram, distortion diagram, and lateral chromatic aberration diagram of the imaging lens in Example 5.

TABLE 5

Example 5

(A)

| Si | Ri | Di | Ndj | νdj |
|---|---|---|---|---|
| 1 | 19.8808 | 0.7999 | 1.7725 | 49.6 |
| 2 | 3.9724 | 2.1179 | | |
| *3 | −133.6526 | 2.7000 | 1.9229 | 20.9 |
| 4 | −10.1653 | 0.2497 | | |
| 5 | 33.3742 | 3.5500 | 1.6180 | 63.3 |
| 6 | −6.8191 | 0.2000 | | |
| 7(St) | ∞ | 0.7499 | | |
| 8 | −9.0334 | 0.9781 | 1.9229 | 18.9 |
| 9 | 12.9643 | 0.6000 | | |
| *10 | −132.8394 | 3.0000 | 1.8061 | 40.9 |
| *11 | −6.8855 | 0.1072 | | |
| 12 | 7.7158 | 3.6000 | 1.6180 | 63.3 |
| 13 | −7.7157 | 0.8801 | | |
| 14 | −5.5336 | 0.8999 | 1.6364 | 34.5 |
| 15 | ∞ | 0.70000 | | |
| 16 | ∞ | 0.50000 | 1.5168 | 64.2 |
| 17 | ∞ | 2.64988 | | |
| Image Surface | ∞ | | | |

(B)

| | |
|---|---|
| L(in Air) | 24.11 |
| Bf(in Air) | 3.68 |
| f | 4.89 |
| f1 | −6.57 |
| f2 | 11.80 |
| f3 | 9.48 |
| f4 | −5.65 |
| f5 | 8.91 |
| f6 | 6.85 |
| f7 | −8.69 |
| f12 | −45.04 |
| f45 | −78.83 |
| f123 | 6.93 |
| f234 | 13.82 |
| f345 | 15.68 |
| f2345 | 8.75 |
| f3456 | 5.24 |
| f12345 | 11.83 |

(C)

| Surface Numbers | K | RB3 | RB4 | RB5 | RB6 |
|---|---|---|---|---|---|
| 3 | 1.0000000E+00 | −1.1804103E−03 | 2.2329945E−03 | −1.9711382E−03 | 4.4551577E−04 |
| 10 | 1.0000000E+00 | 8.5939603E−03 | −1.5550297E−02 | 1.2774164E−02 | −4.2858468E−03 |
| 11 | 1.0000000E+00 | 4.5990284E−03 | −4.1208461E−03 | 6.7832681E−04 | 1.1147068E−03 |

TABLE 5-continued

Example 5

(C)

| Surface Numbers | RB7 | RB8 | RB9 | RB10 | RB11 |
|---|---|---|---|---|---|
| 3 | −1.9615356E−05 | 5.5820916E−05 | −3.1854677E−05 | 4.5271047E−06 | 0.0000000E+00 |
| 10 | −2.7637656E−04 | 3.2480745E−04 | 1.2564231E−04 | −8.8036521E−05 | 1.2375992E−05 |
| 11 | −6.6155419E−04 | 5.3336356E−05 | 5.4826563E−05 | −1.7612302E−05 | 1.6483969E−06 |

Example 6

FIG. 8 is a cross-sectional view illustrating the imaging lens in Example 6. Table 6 represents basic lens data, various data, and aspherical surface data regarding the imaging lens of Example 6. FIG. 34 illustrates, in order from the left of the drawing sheet, spherical aberration diagram, astigmatism diagram, distortion diagram, and lateral chromatic aberration diagram of the imaging lens in Example 6.

TABLE 6

Example 6

(A)

| Si | Ri | Di | Ndj | ν dj |
|---|---|---|---|---|
| 1 | 21.1263 | 1.2289 | 1.8830 | 40.8 |
| 2 | 3.9064 | 1.8493 | | |
| *3 | −268.5800 | 2.6042 | 1.9229 | 20.9 |
| *4 | −11.0433 | 0.2496 | | |
| 5 | 11.8210 | 3.7999 | 1.6180 | 63.3 |
| 6 | −6.2233 | 0.2000 | | |
| 7(St) | ∞ | 0.6999 | | |
| 8 | −16.9550 | 0.8926 | 1.9229 | 18.9 |
| 9 | 8.1639 | 0.7000 | | |
| *10 | −18.5875 | 3.0000 | 1.8061 | 40.9 |
| *11 | −6.6535 | 0.1072 | | |
| 12 | 6.8502 | 3.1999 | 1.6180 | 63.3 |
| 13 | −6.5074 | 0.8866 | | |
| 14 | −4.8272 | 0.8502 | 1.6727 | 32.1 |
| 15 | ∞ | 0.70000 | | |
| 16 | ∞ | 0.50000 | 1.5168 | 64.2 |
| 17 | ∞ | 2.20460 | | |
| Image Surface | ∞ | | | |

(B)

| | |
|---|---|
| L(in Air) | 23.50 |
| Bf(in Air) | 3.23 |
| f | 4.86 |
| f1 | −5.62 |
| f2 | 12.42 |
| f3 | 7.17 |
| f4 | −5.87 |
| f5 | 11.56 |
| f6 | 5.94 |
| f7 | −7.18 |
| f12 | −18.84 |
| f45 | −27.00 |
| f123 | 5.65 |
| f234 | 8.00 |
| f345 | 13.36 |
| f2345 | 7.80 |
| f3456 | 5.58 |
| f12345 | 12.35 |

(C)

| Surface Numbers | K | RB3 | RB4 | RB5 | RB6 |
|---|---|---|---|---|---|
| 3 | 1.0000000E+00 | 5.5611665E−04 | −2.8957254E−04 | 2.1546567E−04 | 2.7371811E−05 |
| 4 | 1.0000000E+00 | −1.0796015E−03 | 1.7780246E−03 | −4.4918250E−04 | 2.3098774E−06 |
| 10 | 1.0000000E+00 | 1.9644312E−05 | −1.0102628E−03 | −1.7192549E−04 | −3.2566683E−05 |
| 11 | 1.0000000E+00 | 1.8514892E−03 | −2.0314541E−03 | 5.2764382E−04 | 4.9695790E−05 |

TABLE 6-continued

Example 6

(C)

| Surface Numbers | RB7 | RB8 | RB9 | RB10 | RB11 |
|---|---|---|---|---|---|
| 3 | 6.8076988E−07 | −6.0812828E−07 | −1.7060354E−07 | 1.3310841E−07 | 6.9530754E−08 |
| 4 | 3.6813847E−05 | 7.3016410E−06 | −2.1671133E−06 | −1.1849490E−06 | 3.4143351E−07 |
| 10 | −1.3779002E−05 | −9.4373256E−06 | −5.6345639E−06 | −1.1508838E−06 | 9.5053859E−07 |
| 11 | −2.6460249E−05 | −1.0426289E−05 | −1.4972542E−06 | 3.9088980E−07 | 3.4510843E−07 |

Example 7

FIG. 9 is a cross-sectional view illustrating the imaging lens in Example 7. Table 7 represents basic lens data, various data, and aspherical surface data regarding the imaging lens of Example 7. FIG. 35 illustrates, in order from the left of the drawing sheet, spherical aberration diagram, astigmatism diagram, distortion diagram, and lateral chromatic aberration diagram of the imaging lens in Example 7.

TABLE 7

Example 7

(A)

| Si | Ri | Di | Ndj | ν dj |
|---|---|---|---|---|
| 1 | 14.2002 | 0.8000 | 1.7550 | 52.3 |
| 2 | 3.6961 | 1.9000 | | |
| *3 | 55.0693 | 2.2229 | 1.6889 | 31.1 |
| 4 | −12.7671 | 0.3000 | | |
| 5 | 29.9751 | 3.8589 | 1.6180 | 63.3 |
| 6 | −6.0355 | 0.2000 | | |
| 7(St) | ∞ | 0.7499 | | |
| 8 | −6.4492 | 1.0000 | 1.7847 | 26.3 |
| 9 | 15.1017 | 0.6000 | | |
| *10 | 200.2246 | 2.6815 | 1.6935 | 53.2 |
| *11 | −6.0645 | 0.1072 | | |
| 12 | 6.6032 | 3.4000 | 1.6180 | 63.3 |
| 13 | −7.3535 | 1.0969 | | |
| 14 | −4.9733 | 0.8502 | 1.7847 | 26.3 |
| 15 | ∞ | 0.70000 | | |
| 16 | ∞ | 0.50000 | 1.5168 | 64.2 |
| 17 | ∞ | 2.24085 | | |
| Image Surface | ∞ | | | |

(B)

| | |
|---|---|
| L(in Air) | 23.04 |
| Bf(in Air) | 3.27 |
| f | 4.85 |
| f1 | −6.84 |
| f2 | 15.25 |
| f3 | 8.48 |
| f4 | −5.64 |
| f5 | 8.53 |
| f6 | 6.21 |
| f7 | −6.34 |
| f12 | −18.67 |
| f45 | −134.08 |
| f123 | 7.72 |
| f234 | 16.43 |
| f345 | 13.01 |
| f2345 | 9.04 |
| f3456 | 4.89 |
| f12345 | 12.34 |

(C)

| Surface Numbers | K | RB3 | RB4 | RB5 | RB6 |
|---|---|---|---|---|---|
| 3 | 1.0000000E+00 | 9.8386231E−03 | −1.8422509E−02 | 1.7331268E−02 | −8.4402051E−03 |
| 10 | 1.0000000E+00 | −1.9755946E−03 | 2.4058701E−03 | −2.7371272E−03 | 1.1100397E−03 |
| 11 | 1.0000000E+00 | 5.4668551E−03 | −8.6913399E−03 | 6.2846647E−03 | −1.9831987E−03 |

TABLE 7-continued

Example 7

(C)

| Surface Numbers | RB7 | RB8 | RB9 | RB10 | RB11 |
|---|---|---|---|---|---|
| 3 | 1.4935082E−03 | 3.3546519E−04 | −1.7887601E−04 | 2.0744780E−05 | 0.0000000E+00 |
| 10 | −2.1077791E−04 | −3.5893960E−05 | 3.2091205E−05 | −1.4897266E−05 | 2.8050963E−06 |
| 11 | −5.4269565E−05 | 1.4801958E−04 | 6.5276760E−06 | −1.7042864E−05 | 2.7217627E−06 |

Example 8

FIG. 10 is a cross-sectional view illustrating the imaging lens in Example 8. Table 8 represents basic lens data, various data, and aspherical surface data regarding the imaging lens of Example 8. FIG. 36 illustrates, in order from the left of the drawing sheet, spherical aberration diagram, astigmatism diagram, distortion diagram, and lateral chromatic aberration diagram of the imaging lens in Example 8.

TABLE 8

Example 8

(A)

| Si | Ri | Di | Ndj | ν dj |
|---|---|---|---|---|
| 1 | 21.6205 | 0.8000 | 1.7725 | 49.6 |
| 2 | 3.4800 | 1.8847 | | |
| *3 | 43.5111 | 2.5000 | 1.9229 | 20.9 |
| *4 | −14.9446 | 0.2999 | | |
| 5 | 13.5452 | 3.4985 | 1.6180 | 63.3 |
| 6 | −5.3399 | 0.2000 | | |
| 7(St) | ∞ | 0.6999 | | |
| 8 | −34.4208 | 0.8001 | 1.9229 | 18.9 |
| 9 | 6.5967 | 0.8000 | | |
| *10 | 107.1736 | 2.4033 | 1.8061 | 40.9 |
| *11 | −9.1985 | 0.1072 | | |
| 12 | 6.1084 | 3.0002 | 1.6180 | 63.3 |
| 13 | −21.7654 | 0.8502 | | |
| 14 | −7.0720 | 0.8502 | 1.6009 | 41.4 |
| 15 | ∞ | 0.70000 | | |
| 16 | ∞ | 0.50000 | 1.5168 | 64.2 |
| 17 | ∞ | 1.86174 | | |
| Image Surface | ∞ | | | |

(B)

| | |
|---|---|
| L(in Air) | 21.59 |
| Bf(in Air) | 2.89 |
| f | 5.00 |
| f1 | −5.47 |
| f2 | 12.31 |
| f3 | 6.67 |
| f4 | −5.94 |
| f5 | 10.61 |
| f6 | 8.05 |
| f7 | −11.77 |
| f12 | −16.64 |
| f45 | −24.61 |
| f123 | 5.35 |
| f234 | 7.61 |
| f345 | 10.97 |
| f2345 | 6.87 |
| f3456 | 6.06 |
| f12345 | 10.27 |

(C)

| Surface Numbers | K | RB3 | RB4 | RB5 | RB6 |
|---|---|---|---|---|---|
| 3 | 1.0000000E+00 | 1.5242656E−03 | −1.0323877E−03 | 3.2907309E−04 | 8.8852663E−05 |
| 4 | 1.0000000E+00 | 4.7997895E−05 | 8.8354584E−04 | 7.3719851E−05 | 4.1638268E−05 |
| 10 | 1.0000000E+00 | −1.1988165E−03 | 4.2757601E−04 | 3.4279676E−04 | −1.0844808E−04 |
| 11 | 1.0000000E+00 | 5.4218772E−06 | −1.1359882E−04 | −1.2913814E−04 | 2.6333776E−05 |

TABLE 8-continued

Example 8

(C)

| Surface Numbers | RB7 | RB8 | RB9 | RB10 | RB11 |
|---|---|---|---|---|---|
| 3 | 2.7655784E−06 | −4.5098642E−06 | −1.0725530E−06 | 2.0841163E−07 | 1.3587618E−07 |
| 4 | 1.1831154E−05 | 9.0017482E−07 | −5.9575796E−07 | −9.5954288E−08 | 2.0347678E−07 |
| 10 | −5.0576480E−05 | −7.0384156E−07 | 6.1033321E−06 | 6.9684092E−07 | −6.4881703E−07 |
| 11 | 8.1017686E−06 | −2.3128659E−06 | −1.8265052E−06 | −4.3161481E−07 | 1.6922208E−07 |

Example 9

FIG. 11 is a cross-sectional view illustrating the imaging lens in Example 9. Table 9 represents basic lens data, various data, and aspherical surface data regarding the imaging lens of Example 9. FIG. 37 illustrates, in order from the left of the drawing sheet, spherical aberration diagram, astigmatism diagram, distortion diagram, and lateral chromatic aberration diagram of the imaging lens in Example 9.

TABLE 9

Example 9

(A)

| Si | Ri | Di | Ndj | ν dj |
|---|---|---|---|---|
| 1 | −18.8092 | 0.8001 | 1.5891 | 61.1 |
| 2 | 4.5276 | 1.4999 | | |
| 3 | 20.9792 | 2.1998 | 1.9037 | 31.3 |
| 4 | −14.4218 | 0.2496 | | |
| 5 | 8.8946 | 2.4999 | 1.6180 | 63.3 |
| 6 | −14.9806 | 0.2000 | | |
| 7(St) | ∞ | 0.7000 | | |
| 8 | −12.0425 | 0.7999 | 1.9229 | 18.9 |
| 9 | 9.1585 | 0.5000 | | |
| 10 | −60.0000 | 2.3999 | 1.9037 | 31.3 |
| 11 | −6.6846 | 0.1072 | | |
| 12 | 6.1427 | 3.0003 | 1.6180 | 63.3 |
| 13 | −8.9981 | 0.8502 | | |
| 14 | −6.9016 | 0.8502 | 1.7847 | 26.3 |
| 15 | ∞ | 0.70000 | | |
| 16 | ∞ | 0.50000 | 1.5168 | 64.2 |
| 17 | ∞ | 1.89703 | | |
| Image Surface | ∞ | | | |

(B)

| | |
|---|---|
| L(in Air) | 19.58 |
| Bf(in Air) | 2.93 |
| f | 5.06 |
| f1 | −6.12 |
| f2 | 9.75 |
| f3 | 9.41 |
| f4 | −5.54 |
| f5 | 8.15 |
| f6 | 6.39 |
| f7 | −8.80 |
| f12 | −44.93 |
| f45 | −82.31 |
| f123 | 7.86 |
| f234 | 8.80 |
| f345 | 14.29 |
| f2345 | 7.16 |
| f3456 | 5.18 |
| f12345 | 12.31 |

Example 10

FIG. 12 is a cross-sectional view illustrating the imaging lens in Example 10. Table 10 represents basic lens data, various data, and aspherical surface data regarding the imaging lens of Example 10. FIG. 38 illustrates, in order from the left of the drawing sheet, spherical aberration diagram, astigmatism diagram, distortion diagram, and lateral chromatic aberration diagram of the imaging lens in Example 10.

TABLE 10

Example 10

(A)

| Si | Ri | Di | Ndj | ν dj |
|---|---|---|---|---|
| 1 | −20.8811 | 0.7999 | 1.5891 | 61.1 |
| 2 | 5.0328 | 1.4999 | | |
| 3 | 76.2125 | 2.1998 | 1.9229 | 18.9 |
| 4 | −15.7371 | 0.2496 | | |
| 5 | 5.5323 | 2.1999 | 1.6180 | 63.3 |
| 6 | −13.2582 | 0.2000 | | |
| 7(St) | ∞ | 0.7001 | | |
| 8 | −6.6598 | 0.7999 | 1.9229 | 18.9 |
| 9 | 8.7959 | 0.5000 | | |
| 10 | 0.0000 | 2.5995 | 1.9037 | 31.3 |
| 11 | −5.9920 | 0.1072 | | |
| 12 | 6.3803 | 3.0002 | 1.6180 | 63.3 |
| 13 | −20.8543 | 0.8502 | | |
| 14 | −11.9979 | 0.8502 | 1.7847 | 26.3 |
| 15 | ∞ | 0.70000 | | |
| 16 | ∞ | 0.50000 | 1.5168 | 64.2 |
| 17 | ∞ | 1.96081 | | |
| Image Surface | ∞ | | | |

(B)

| | |
|---|---|
| L(in Air) | 19.55 |
| Bf(in Air) | 2.99 |
| f | 5.07 |
| f1 | −6.81 |
| f2 | 14.30 |
| f3 | 6.61 |
| f4 | −4.01 |
| f5 | 6.63 |
| f6 | 8.25 |
| f7 | −15.29 |
| f12 | −19.71 |
| f45 | −50.43 |
| f123 | 6.10 |
| f234 | 11.42 |
| f345 | 11.13 |
| f2345 | 7.40 |
| f3456 | 5.82 |
| f12345 | 11.02 |

Example 11

FIG. 13 is a cross-sectional view illustrating the imaging lens in Example 11. Table 11 represents basic lens data, various data, and aspherical surface data regarding the imaging lens of Example 11. FIG. 39 illustrates, in order from the left of the drawing sheet, spherical aberration diagram, astigmatism diagram, distortion diagram, and lateral chromatic aberration diagram of the imaging lens in Example 11.

TABLE 11

Example 11

(A)

| Si | Ri | Di | Ndj | ν dj |
|---|---|---|---|---|
| 1 | 21.5001 | 0.8169 | 1.7550 | 52.3 |
| 2 | 3.7724 | 1.5000 | | |
| 3 | 15.2531 | 2.1998 | 1.8830 | 40.8 |
| 4 | −39.2280 | 0.2497 | | |
| 5 | 8.5962 | 2.0854 | 1.6180 | 63.3 |
| 6 | −34.8086 | 0.2000 | | |
| 7(St) | ∞ | 0.7498 | | |
| 8 | −80.2577 | 0.8876 | 1.9229 | 18.9 |
| 9 | 8.5810 | 0.5000 | | |
| 10 | −101.4073 | 2.5995 | 1.9037 | 31.3 |
| 11 | −6.9601 | 0.1072 | | |
| 12 | 5.7660 | 3.0003 | 1.6180 | 63.3 |
| 13 | −11.2633 | 1.2264 | | |
| 14 | −6.8653 | 0.8503 | 1.9591 | 17.5 |
| 15 | ∞ | 0.70000 | | |
| 16 | ∞ | 0.50000 | 1.5168 | 64.2 |
| 17 | ∞ | 1.57427 | | |
| Image Surface | ∞ | | | |

(B)

| | |
|---|---|
| L(in Air) | 19.58 |
| Bf(in Air) | 2.60 |
| f | 4.98 |
| f1 | −6.18 |
| f2 | 12.68 |
| f3 | 11.36 |
| f4 | −8.36 |
| f5 | 8.16 |
| f6 | 6.62 |
| f7 | −7.16 |
| f12 | −16.46 |
| f45 | 31.18 |
| f123 | 16.89 |
| f234 | 10.40 |
| f345 | 10.90 |
| f2345 | 7.39 |
| f3456 | 4.92 |
| f12345 | 11.92 |

Example 12

FIG. 14 is a cross-sectional view illustrating the imaging lens in Example 12. Table 12 represents basic lens data, various data, and aspherical surface data regarding the imaging lens of Example 12, FIG. 40 illustrates, in order from the left of the drawing sheet, spherical aberration diagram, astigmatism diagram, distortion diagram, and lateral chromatic aberration diagram of the imaging lens in Example 12.

TABLE 12

Example 12

(A)

| Si | Ri | Di | Ndj | ν dj |
|---|---|---|---|---|
| 1 | 12.8270 | 1.8001 | 1.7725 | 49.6 |
| 2 | 3.2892 | 1.5668 | | |
| 3 | 9.4889 | 2.1997 | 1.9200 | 25.8 |
| 4 | −140.6338 | 0.3001 | | |
| 5 | 11.4219 | 2.1203 | 1.6180 | 63.3 |
| 6 | −7.7654 | 0.0000 | | |
| 7(St) | ∞ | 0.3002 | | |
| 8 | −10.0879 | 1.1496 | 1.9229 | 18.9 |
| 9 | 9.8635 | 0.4692 | | |
| 10 | 0.0000 | 2.5996 | 1.9200 | 29.8 |
| 11 | −6.3165 | 0.1072 | | |
| 12 | 5.9212 | 3.0002 | 1.6180 | 63.3 |
| 13 | −21.2195 | 0.9380 | | |
| 14 | −10.3540 | 0.8502 | 1.9591 | 17.5 |
| 15 | ∞ | 0.70000 | | |
| 16 | ∞ | 0.50000 | 1.5168 | 64.2 |
| 17 | ∞ | 1.57462 | | |
| Image Surface | ∞ | | | |

(B)

| | |
|---|---|
| L(in Air) | 20.01 |
| Bf(in Air) | 2.60 |
| f | 4.97 |
| f1 | −6.24 |
| f2 | 9.73 |
| f3 | 7.81 |
| f4 | −5.26 |
| f5 | 6.87 |
| f6 | 7.82 |
| f7 | −9.24 |
| f12 | −27.19 |
| f45 | 71.67 |
| f123 | 7.85 |
| f234 | 10.13 |
| f345 | 9.94 |
| f2345 | 6.78 |
| f3456 | 4.72 |
| f12345 | 9.61 |

Example 13

FIG. 15 is a cross-sectional view illustrating the imaging lens in Example 13. Table 13 represents basic lens data, various data, and aspherical surface data regarding the imaging lens of Example 13. FIG. 41 illustrates, in order from the left of the drawing sheet, spherical aberration diagram, astigmatism diagram, distortion diagram, and lateral chromatic aberration diagram of the imaging lens in Example 13.

TABLE 13

Example 13

(A)

| Si | Ri | Di | Ndj | ν dj |
|---|---|---|---|---|
| 1 | 19.0767 | 0.9000 | 1.58913 | 61.1 |
| 2 | 3.8767 | 2.8000 | | |
| 3 | −14.9165 | 3.5000 | 1.90366 | 31.3 |

TABLE 13-continued

| Example 13 | | | | |
|---|---|---|---|---|
| 4 | −7.9821 | 0.3000 | | |
| *5 | 8.9319 | 2.4719 | 1.53158 | 55.5 |
| *6 | −19.4733 | 0.2000 | | |
| 7(St) | ∞ | 0.7121 | | |
| *8 | −5.6092 | 0.8000 | 1.63350 | 23.6 |
| *9 | 10.7264 | 0.6000 | | |
| *10 | 14.1265 | 2.8000 | 1.53158 | 55.5 |
| *11 | −7.6775 | 0.1072 | | |
| 12 | 6.2949 | 3.7500 | 1.58913 | 61.1 |
| 13 | −10.7190 | 0.8799 | | |
| *14 | −9.3658 | 0.8503 | 1.63350 | 23.6 |
| 15 | ∞ | 0.7000 | | |
| 16 | ∞ | 0.5000 | 1.51680 | 64.2 |
| 17 | ∞ | 2.6497 | | |
| Image Surface | ∞ | | | |

(B)

| | |
|---|---|
| L(in Air) | 24.35 |
| Bf(in Air) | 3.68 |
| f | 4.85 |
| f1 | −8.44 |
| f2 | 15.33 |
| f3 | 11.88 |
| f4 | −5.71 |
| f5 | 9.79 |
| f6 | 7.33 |
| f7 | −14.78 |
| f12 | −124.29 |
| f45 | −28.91 |
| f123 | 7.47 |
| f234 | 34.62 |
| f345 | 26.64 |
| f2345 | 10.46 |
| f3456 | 6.38 |
| f12345 | 17.75 |

(C)

| Surface Numbers | K | RB3 | RB4 | RB5 | RB6 |
|---|---|---|---|---|---|
| 5 | −6.5750340E−01 | −8.9495999E−04 | −8.2737678E−05 | −6.5386728E−06 | −1.8140859E−07 |
| 6 | 3.3927014E+01 | 2.1528879E−03 | −6.0881532E−04 | 1.9726718E−05 | 3.3610736E−07 |
| 8 | −1.2589367E+01 | 4.1122567E−03 | −4.1957196E−04 | 3.6683667E−06 | 1.3058744E−06 |
| 9 | 0.0000000E+00 | −9.2852680E−04 | 5.9106420E−04 | −1.3505197E−05 | −1.6490412E−08 |
| 10 | 1.0000000E+00 | −1.1118621E−02 | 1.1534105E−03 | −5.3518559E−05 | 1.9124729E−06 |
| 11 | 2.2998481E+00 | −8.5075838E−04 | −2.4305063E−05 | 6.8191949E−06 | −3.9498819E−07 |
| 14 | 7.0406344E+00 | −7.6940529E−04 | 5.8959430E−05 | −1.6600756E−07 | −1.8870815E−07 |

(C)

| Surface Numbers | RB7 | RB8 | RB9 | RB10 | RB11 |
|---|---|---|---|---|---|
| 5 | 1.0412275E−08 | 2.0288337E−09 | 6.3022772E−10 | −7.1532671E−11 | 8.3743476E−13 |
| 6 | 9.4026874E−08 | 1.0770156E−08 | −1.5882368E−09 | −3.9092328E−11 | 4.8933968E−12 |
| 8 | 8.2926735E−08 | −2.4691888E−08 | −1.0241661E−09 | 6.0802052E−10 | −4.6108927E−11 |
| 9 | −6.5279093E−08 | −7.9294268E−09 | 1.4589556E−09 | 1.1576128E−10 | −1.6068907E−11 |
| 10 | −3.2670440E−08 | −3.9115857E−11 | −1.3707878E−10 | 1.5049943E−10 | −8.9208625E−13 |
| 11 | −2.2528855E−09 | −8.9173614E−10 | −5.5444904E−11 | −4.1476137E−12 | 1.2251155E−12 |
| 14 | 7.6746246E−08 | 1.5664395E−08 | −3.2512148E−09 | −2.0391678E−11 | 1.8844967E−11 |

Example 14

FIG. 16 is a cross-sectional view illustrating the imaging lens in Example 14. Table 14 represents basic lens data, various data, and aspherical surface data regarding the imaging lens of Example 14. FIG. 42 illustrates, in order from the left of the drawing sheet, spherical aberration diagram, astigmatism diagram, distortion diagram, and lateral chromatic aberration diagram of the imaging lens in Example 14.

TABLE 14

Example 14

(A)

| Si | Ri | Di | Ndj | ν dj |
|---|---|---|---|---|
| 1 | 24.6820 | 0.9000 | 1.5891 | 61.1 |
| 2 | 3.9538 | 2.8000 | | |
| 3 | −13.7354 | 3.5000 | 1.9037 | 31.3 |
| 4 | −7.7227 | 0.3000 | | |
| *5 | 9.3000 | 2.3656 | 1.5316 | 55.5 |
| *6 | −16.0593 | 0.2000 | | |
| 7(St) | ∞ | 0.7000 | | |
| *8 | −6.7169 | 0.8000 | 1.6335 | 23.6 |
| *9 | 9.0604 | 0.6000 | | |
| *10 | 13.4560 | 2.8000 | 1.5316 | 55.5 |
| *11 | −8.3193 | 0.1072 | | |
| 12 | 6.4814 | 3.7500 | 1.5891 | 61.1 |
| 13 | −10.8936 | 0.8800 | | |
| *14 | −9.2938 | 0.8502 | 1.6335 | 23.6 |
| 15 | ∞ | 0.70000 | | |
| 16 | ∞ | 0.50000 | 1.5168 | 64.2 |
| 17 | ∞ | 2.58794 | | |
| Image Surface | ∞ | | | |

(B)

| | |
|---|---|
| L(in Air) | 24.17 |
| Bf(in Air) | 3.62 |
| f | 4.83 |
| f1 | −8.12 |
| f2 | 15.30 |
| f3 | 11.45 |
| f4 | −5.97 |
| f5 | 10.12 |
| f6 | 7.50 |
| f7 | −14.67 |
| f12 | −104.15 |
| f45 | −28.88 |
| f123 | 7.08 |
| f234 | 27.59 |
| f345 | 24.18 |
| f2345 | 9.92 |
| f3456 | 6.51 |
| f12345 | 15.86 |

(C)

| Surface Numbers | K | RB3 | RB4 | RB5 | RB6 |
|---|---|---|---|---|---|
| 5 | −2.2328258E−01 | −1.1777139E−03 | −5.8035674E−05 | −8.3419155E−06 | −1.4191306E−07 |
| 6 | 1.8570847E+01 | 2.5769746E−03 | −4.5458818E−04 | 5.3581057E−06 | 3.5571305E−07 |
| 8 | −1.5874785E+01 | 5.2018291E−03 | −3.6889772E−04 | −2.9720629E−06 | 1.4616830E−06 |
| 9 | 0.0000000E+00 | −1.3193175E−04 | 6.1057877E−04 | −7.1968467E−06 | 1.3967600E−07 |
| 10 | 1.0000000E+00 | −8.3634504E−03 | 9.4907494E−04 | −2.4501313E−05 | 9.6814795E−07 |
| 11 | −1.3045935E+01 | −3.8039804E−03 | 1.5372661E−04 | −6.6093719E−06 | −1.3881925E−08 |
| 14 | 6.7128090E+00 | −9.0642752E−04 | −1.2290007E−05 | 4.4523987E−06 | −2.8630636E−07 |

(C)

| Surface Numbers | RB7 | RB8 | RB9 | RB10 | RB11 |
|---|---|---|---|---|---|
| 5 | 4.6906167E−09 | 1.7609689E−09 | 6.6249877E−10 | −6.3471392E−11 | 9.7534675E−13 |
| 6 | 9.3070408E−08 | 1.0824210E−08 | −1.5700239E−09 | −3.2497655E−11 | 5.1772793E−12 |
| 8 | 9.3806375E−08 | −2.4603117E−08 | −1.1229490E−09 | 5.6732402E−10 | −4.0217034E−11 |
| 9 | −4.3777530E−08 | −7.3856269E−09 | 1.5278744E−09 | 1.5836154E−10 | −3.2571115E−11 |
| 10 | −2.5559814E−08 | 6.6782100E−10 | 2.7324032E−11 | 1.0155090E−10 | −1.7384098E−12 |
| 11 | −3.7096749E−09 | −1.0553584E−09 | −5.9068872E−11 | −3.0957111E−12 | 1.3333855E−12 |
| 14 | 7.3852015E−08 | 1.5028620E−08 | −3.3080073E−09 | −9.9541232E−12 | 1.8902135E−11 |

Example 15

FIG. 17 is a cross-sectional view illustrating the imaging lens in Example 15. Table 15 represents basic lens data, various data, and aspherical surface data regarding the imaging lens of Example 15. FIG. 43 illustrates, in order from the left of the drawing sheet, spherical aberration diagram, astigmatism diagram, distortion diagram, and lateral chromatic aberration diagram of the imaging lens in Example 15.

TABLE 15

Example 15

(A)

| Si | Ri | Di | Ndj | ν dj |
|---|---|---|---|---|
| 1 | 23.2458 | 1.1960 | 1.5891 | 61.1 |
| 2 | 3.6265 | 2.5171 | | |
| 3 | −14.5774 | 3.5001 | 1.9037 | 31.3 |
| 4 | −7.5244 | 0.2910 | | |
| *5 | 12.7833 | 2.7000 | 1.5316 | 55.5 |
| *6 | −9.6384 | 0.2000 | | |
| 7(St) | ∞ | 0.7499 | | |
| *8 | −6.9710 | 0.8000 | 1.6335 | 23.6 |
| *9 | 8.4963 | 0.6000 | | |
| *10 | 20.5762 | 3.0000 | 1.5316 | 55.5 |
| *11 | −8.4978 | 0.1072 | | |
| 12 | 6.6165 | 3.8500 | 1.5891 | 61.1 |
| 13 | −9.8612 | 0.9829 | | |
| *14 | −11.8091 | 0.8502 | 1.6335 | 23.6 |
| 15 | ∞ | 0.70000 | | |
| 16 | ∞ | 1.00000 | 1.5168 | 64.2 |
| 17 | ∞ | 2.29905 | | |
| Image Surface | ∞ | | | |

(B)

| | |
|---|---|
| L(in Air) | 25.00 |
| Bf(in Air) | 3.66 |
| f | 4.70 |
| f1 | −7.46 |
| f2 | 13.93 |
| f3 | 10.79 |
| f4 | −5.93 |
| f5 | 11.73 |
| f6 | 7.36 |
| f7 | −18.64 |
| f12 | −102.29 |
| f45 | −19.83 |
| f123 | 6.65 |
| f234 | 20.30 |
| f345 | 30.09 |
| f2345 | 10.14 |
| f3456 | 6.64 |
| f12345 | 20.58 |

(C)

| Surface Numbers | K | RB3 | RB4 | RB5 | RB6 |
|---|---|---|---|---|---|
| 5 | 7.2952173E−01 | −7.4813348E−04 | −1.8441405E−05 | 2.0277048E−06 | −8.5396369E−09 |
| 6 | 4.9312325E+00 | 2.6939532E−03 | −3.4683428E−04 | 1.6177263E−05 | 5.3960643E−07 |
| 8 | −1.6929009E+01 | 2.8278310E−03 | −3.7452085E−04 | 1.1131976E−05 | 1.4440040E−06 |
| 9 | 0.0000000E+00 | 7.4775026E−04 | 5.2796034E−04 | −7.5035440E−06 | 2.1662263E−07 |
| 10 | 1.0000000E+00 | −5.6135718E−03 | 9.8694499E−04 | −3.4444714E−05 | 8.1726060E−07 |
| 11 | −1.2813847E+00 | −1.2993216E−03 | −2.3926381E−05 | 1.2266901E−06 | −1.5497796E−07 |
| 14 | 1.1504193E+01 | −1.9206224E−03 | −4.9332286E−05 | 4.4667401E−06 | −4.2602970E−07 |

(C)

| Surface Numbers | RB7 | RB8 | RB9 | RB10 | RB11 |
|---|---|---|---|---|---|
| 5 | 2.3880255E−09 | 1.6319156E−09 | 7.8269198E−10 | −4.5375066E−11 | −1.4529089E−12 |
| 6 | 1.0287882E−07 | 9.7803019E−09 | −1.7574842E−09 | −7.4886527E−11 | 1.1617299E−11 |
| 8 | 9.3498955E−08 | −2.3125675E−08 | −8.9450205E−10 | 5.0833882E−10 | −4.1311169E−11 |
| 9 | −2.8519482E−08 | −7.7133392E−09 | 5.6755554E−10 | 4.5600060E−11 | −1.4639276E−11 |
| 10 | −2.7151055E−08 | 5.4528596E−10 | −1.7980896E−11 | 9.0843384E−11 | −2.4286307E−12 |
| 11 | −3.2993532E−09 | −1.0009943E−09 | −5.0123124E−11 | −2.2792376E−12 | 1.3811504E−12 |
| 14 | 4.0393414E−08 | 1.5241597E−08 | −2.2766319E−09 | 4.3260163E−11 | 4.6815290E−12 |

Example 16

FIG. 18 is a cross-sectional view illustrating the imaging lens in Example 16. Table 16 represents basic lens data, various data, and aspherical surface data regarding the imaging lens of Example 16. FIG. 44 illustrates, in order from the left of the drawing sheet, spherical aberration diagram, astigmatism diagram, distortion diagram, and lateral chromatic aberration diagram of the imaging lens in Example 16.

TABLE 16

Example 16

(A)

| Si | Ri | Di | Ndj | ν dj |
|---|---|---|---|---|
| 1 | 23.0030 | 0.9000 | 1.5891 | 61.1 |
| 2 | 3.9455 | 2.8000 | | |
| 3 | -11.8641 | 3.5000 | 1.9037 | 31.3 |
| 4 | -6.5817 | 0.3000 | | |
| *5 | 16.9575 | 2.7000 | 1.5316 | 55.5 |
| *6 | -10.4760 | 0.2000 | | |
| 7(St) | ∞ | 0.7000 | | |
| *8 | -6.1023 | 0.8000 | 1.6335 | 23.6 |
| *9 | 9.3048 | 0.6000 | | |
| *10 | 9.3932 | 2.8000 | 1.5316 | 55.5 |
| *11 | -8.0869 | 0.1072 | | |
| 12 | 8.3763 | 3.7500 | 1.5891 | 61.1 |
| 13 | -10.8731 | 0.8800 | | |
| *14 | -10.7620 | 0.8502 | 1.6335 | 23.6 |
| 15 | ∞ | 0.70000 | | |
| 16 | ∞ | 0.50000 | 1.5168 | 64.2 |
| 17 | ∞ | 2.64752 | | |
| Image Surface | ∞ | | | |

(B)

| | |
|---|---|
| L(in Air) | 24.56 |
| Bf(in Air) | 3.68 |
| f | 4.88 |
| f1 | -8.23 |
| f2 | 12.44 |
| f3 | 12.61 |
| f4 | -5.70 |
| f5 | 8.66 |
| f6 | 8.66 |
| f7 | -16.99 |
| f12 | 63.77 |
| f45 | -48.24 |
| f123 | 6.60 |
| f234 | 30.75 |
| f345 | 22.82 |
| f2345 | 9.06 |
| f3456 | 6.75 |
| f12345 | 11.39 |

(C)

| Surface Numbers | K | RB3 | RB4 | RB5 | RB6 |
|---|---|---|---|---|---|
| 5 | -1.1138382E+00 | -3.4769930E-03 | -1.4223212E-04 | -1.0581360E-05 | -8.1360916E-08 |
| 6 | 8.7954059E+00 | -1.5265484E-03 | -2.0468882E-04 | 7.3822399E-06 | 3.7821209E-07 |
| 8 | -1.3920021E+01 | 4.2721162E-03 | -2.7483897E-04 | 2.0464966E-06 | 1.2031986E-06 |
| 9 | 0.0000000E+00 | 1.2173078E-03 | 5.0751214E-04 | -1.1298208E-05 | -1.0993132E-07 |
| 10 | 1.0000000E+00 | -8.7145767E-03 | 9.5934935E-04 | -2.9885231E-05 | 1.2852898E-06 |
| 11 | -1.3477239E+01 | -3.6226975E-03 | 1.5953523E-04 | -3.5700242E-06 | 4.4833332E-08 |
| 14 | 1.1103399E+01 | 7.3743944E-04 | -1.2354179E-06 | 6.8254553E-06 | -1.9811870E-07 |

(C)

| Surface Numbers | RB7 | RB8 | RB9 | RB10 | RB11 |
|---|---|---|---|---|---|
| 5 | -1.4896773E-12 | 6.4283816E-10 | 5.7828276E-10 | -3.9650081E-11 | -1.2631232E-12 |
| 6 | 9.2017008E-08 | 9.4621626E-09 | -1.8408636E-09 | -5.9800502E-11 | 1.0248657E-11 |
| 8 | 5.9632645E-08 | -2.6120073E-08 | -6.9128631E-10 | 5.5257486E-10 | -3.7507223E-11 |
| 9 | -5.3080984E-08 | -7.8956020E-09 | 1.4928516E-09 | -6.2921663E-11 | -3.5989278E-12 |
| 10 | -2.0799345E-08 | 1.5627358E-09 | -4.0966708E-11 | 5.5290144E-11 | -7.0592798E-12 |
| 11 | 9.1264588E-10 | -7.9172033E-10 | -1.7983636E-11 | -1.0863930E-11 | 1.8617632E-12 |
| 14 | 8.7061914E-08 | 1.5870960E-08 | -3.2366490E-09 | -2.4725942E-11 | 2.1052658E-11 |

Example 17

FIG. 19 is a cross-sectional view illustrating the imaging lens in Example 17. Table 17 represents basic lens data, various data, and aspherical surface data regarding the imaging lens of Example 17. FIG. 45 illustrates, in order from the left of the drawing sheet, spherical aberration diagram, astigmatism diagram, distortion diagram, and lateral chromatic aberration diagram of the imaging lens in Example 17.

TABLE 17

Example 17

(A)

| Si | Ri | Di | Ndj | ν dj |
|---|---|---|---|---|
| 1 | 23.0007 | 1.0546 | 1.5891 | 61.1 |
| 2 | 3.9005 | 2.5843 | | |
| 3 | −15.0634 | 3.4999 | 1.9037 | 31.3 |
| 4 | −8.7725 | 0.3000 | | |
| *5 | 17.2957 | 2.7000 | 1.5316 | 55.5 |
| *6 | −11.8924 | 0.2000 | | |
| 7(St) | ∞ | 0.7498 | | |
| *8 | −5.0235 | 1.0000 | 1.6335 | 23.6 |
| *9 | −16.8231 | 0.5900 | | |
| *10 | −267.0415 | 2.9925 | 1.5316 | 55.5 |
| *11 | −8.1372 | 0.1072 | | |
| 12 | 6.5086 | 3.7500 | 1.5891 | 61.1 |
| 13 | −8.0207 | 0.9221 | | |
| *14 | −5.5998 | 0.8502 | 1.6335 | 23.6 |
| 15 | ∞ | 0.70000 | | |
| 16 | ∞ | 0.50000 | 1.5168 | 64.2 |
| 17 | ∞ | 2.68161 | | |
| Image Surface | ∞ | | | |

(B)

| | |
|---|---|
| L(in Air) | 25.01 |
| Bf(in Air) | 3.71 |
| f | 4.76 |
| f1 | −8.14 |
| f2 | 18.39 |
| f3 | 13.70 |
| f4 | −11.69 |
| f5 | 15.73 |
| f6 | 6.74 |
| f7 | −8.84 |
| f12 | −34.64 |
| f45 | −342.98 |
| f123 | 10.42 |
| f234 | 17.48 |
| f345 | 18.47 |
| f2345 | 10.15 |
| f3456 | 5.58 |
| f12345 | 14.28 |

(C)

| Surface Numbers | K | RB3 | RB4 | RB5 | RB6 |
|---|---|---|---|---|---|
| 5 | 1.0173158E+00 | −7.7815906E−04 | 3.3528541E−06 | −3.7284573E−06 | −4.7668574E−08 |
| 6 | 1.2266417E+00 | −1.3664459E−04 | −1.0152890E−04 | −6.9566100E−08 | 4.5165240E−07 |
| 8 | −1.1334246E+00 | 6.9612534E−03 | −3.6910213E−04 | 9.4549523E−06 | 1.3840763E−06 |
| 9 | 0.0000000E+00 | 8.5746123E−03 | 2.3014450E−04 | 1.4986405E−06 | 2.9270849E−07 |
| 10 | 1.0000000E+00 | 1.8854236E−03 | 3.2935680E−04 | −1.6818575E−05 | −4.8799350E−07 |
| 11 | −2.3343205E−01 | −6.1902814E−04 | −5.8954493E−05 | −7.5472047E−07 | 6.2055094E−09 |
| 14 | −1.1880740E+00 | −4.1569538E−03 | −5.3601859E−05 | −2.1009250E−06 | −4.8914875E−07 |

(C)

| Surface Numbers | RB7 | RB8 | RB9 | RB10 | RB11 |
|---|---|---|---|---|---|
| 5 | 2.1446197E−09 | 1.4207732E−09 | 7.3117295E−10 | −4.9543863E−11 | −6.5135012E−13 |
| 6 | 9.7363078E−08 | 9.1861669E−09 | −1.6573302E−09 | −7.8632128E−11 | 9.3857461E−12 |
| 8 | 9.6156655E−08 | −2.2341728E−08 | −1.0712261E−09 | 4.7216424E−10 | −4.2953847E−11 |
| 9 | −2.8393121E−08 | −9.1585147E−09 | 2.4187792E−10 | −1.6925774E−11 | −8.1139623E−12 |
| 10 | −2.5404792E−08 | 8.9026158E−10 | −4.4499197E−11 | 7.6347764E−11 | −2.2926178E−12 |
| 11 | −2.4272251E−09 | −9.5535688E−10 | −4.5057366E−11 | −1.8450392E−12 | 1.2968772E−12 |
| 14 | 5.7117921E−08 | 2.1857391E−08 | −2.5727061E−09 | 8.5982306E−11 | −6.1070801E−13 |

Example 18

FIG. 20 is a cross-sectional view illustrating the imaging lens in Example 18. Table 18 represents basic lens data, various data, and aspherical surface data regarding the imaging lens of Example 18. FIG. 46 illustrates, in order from the left of the drawing sheet, spherical aberration diagram, astigmatism diagram, distortion diagram, and lateral chromatic aberration diagram of the imaging lens in Example 18.

TABLE 18

Example 18

(A)

| Si | Ri | Di | Ndj | ν dj |
|---|---|---|---|---|
| 1 | 23.0101 | 0.9000 | 1.5891 | 61.1 |
| 2 | 3.8928 | 2.8000 | | |
| 3 | −32.6406 | 3.5000 | 1.9037 | 31.3 |
| 4 | −12.0010 | 0.3000 | | |
| *5 | 13.5021 | 2.0000 | 1.5316 | 55.5 |
| *6 | −19.5434 | 0.2000 | | |
| 7(St) | ∞ | 0.7499 | | |
| *8 | −7.3027 | 1.0000 | 1.6335 | 23.6 |
| *9 | 932.6397 | 0.6000 | | |
| *10 | −88.0895 | 2.8000 | 1.5316 | 55.5 |
| *11 | −6.9260 | 0.1072 | | |
| 12 | 5.7834 | 3.8224 | 1.5891 | 61.1 |
| 13 | −8.4157 | 0.8800 | | |
| *14 | −4.9164 | 0.8503 | 1.6335 | 23.6 |
| 15 | ∞ | 0.70000 | | |
| 16 | ∞ | 0.50000 | 1.5168 | 64.2 |
| 17 | ∞ | 2.78448 | | |
| Image Surface | ∞ | | | |

(B)

| | |
|---|---|
| L(in Air) | 24.32 |
| Bf(in Air) | 3.81 |
| f | 4.88 |
| f1 | −8.09 |
| f2 | 19.44 |
| f3 | 15.34 |
| f4 | −11.43 |
| f5 | 13.97 |
| f6 | 6.46 |
| f7 | −7.76 |
| f12 | −26.36 |
| f45 | 254.59 |
| f123 | 14.26 |
| f234 | 21.35 |
| f345 | 18.56 |
| f2345 | 10.67 |
| f3456 | 5.31 |
| f12345 | 16.59 |

(C)

| Surface Numbers | K | RB3 | RB4 | RB5 | RB6 |
|---|---|---|---|---|---|
| 5 | 1.0000191E+00 | −5.3929568E−04 | −4.8003271E−06 | −2.3129330E−06 | −3.1395129E−08 |
| 6 | 1.2314022E+00 | −5.1599618E−04 | −1.4241048E−04 | 1.4964013E−06 | 4.5038888E−07 |
| 8 | 1.0424656E−01 | 3.8092916E−03 | −3.0717207E−04 | 1.0097921E−05 | 1.3862460E−06 |
| 9 | 0.0000000E+00 | 5.1974965E−03 | 2.5896987E−04 | 1.7040731E−06 | 3.0740978E−07 |
| 10 | 1.0000000E+00 | 1.6388690E−03 | 3.7618132E−04 | −1.9271569E−05 | −6.0763124E−07 |
| 11 | −2.0213197E−01 | −6.7130128E−04 | −1.4394891E−05 | −4.1454595E−06 | −3.9507558E−08 |
| 14 | −2.9781838E+00 | −5.7381676E−03 | 6.0351652E−05 | −7.0558944E−07 | −4.0513488E−07 |

(C)

| Surface Numbers | RB7 | RB8 | RB9 | RB10 | RB11 |
|---|---|---|---|---|---|
| 5 | 3.0143802E−09 | 1.3747862E−09 | 6.9637809E−10 | −5.0255229E−11 | −2.6726581E−13 |
| 6 | 9.5286771E−08 | 8.9328604E−09 | −1.6470330E−09 | −7.2005170E−11 | 9.8925896E−12 |
| 8 | 9.6808818E−08 | −2.2174664E−08 | −1.0545713E−09 | 4.7715814E−10 | −4.2828236E−11 |
| 9 | −2.6007116E−08 | −8.9270693E−09 | 2.2729822E−10 | −1.7260353E−11 | −8.2228860E−12 |
| 10 | −2.5104605E−08 | 9.3004700E−10 | −4.3928130E−11 | 7.6645482E−11 | −2.4700539E−12 |
| 11 | −2.6740996E−09 | −9.8058460E−10 | −4.6056212E−11 | −1.7198932E−12 | 1.3199752E−12 |
| 14 | 5.9318259E−08 | 2.0517587E−08 | −2.7109014E−09 | 6.5287256E−11 | 4.3013196E−12 |

Example 19

FIG. 21 is a cross-sectional view illustrating the imaging lens in Example 19. Table 19 represents basic lens data, various data, and aspherical surface data regarding the imaging lens of Example 19. FIG. 47 illustrates, in order from the left of the drawing sheet, spherical aberration diagram, astigmatism diagram, distortion diagram, and lateral chromatic aberration diagram of the imaging lens in Example 19.

TABLE 19

Example 19

(A)

| Si | Ri | Di | Ndj | ν dj |
|---|---|---|---|---|
| 1 | 23.0106 | 0.9000 | 1.5891 | 61.1 |
| 2 | 3.8293 | 2.8000 | | |
| 3 | −31.0317 | 3.5000 | 1.9037 | 31.3 |
| 4 | −12.1936 | 0.3000 | | |
| *5 | 14.4831 | 2.1040 | 1.5316 | 55.5 |
| *6 | −26.9416 | 0.2000 | | |
| 7(St) | ∞ | 0.7482 | | |
| *8 | −7.9475 | 0.8000 | 1.6335 | 23.6 |
| *9 | −220.9192 | 0.7558 | | |
| *10 | −83.0874 | 2.8242 | 1.5316 | 55.5 |
| *11 | −7.8131 | 0.2000 | | |
| 12 | 5.8685 | 4.2097 | 1.6180 | 63.3 |
| 13 | −9.0197 | 0.8800 | | |
| *14 | −5.3751 | 0.8502 | 1.6335 | 23.6 |
| 15 | ∞ | 0.70000 | | |
| 16 | ∞ | 0.50000 | 1.5168 | 64.2 |
| 17 | ∞ | 2.97983 | | |
| Image Surface | ∞ | | | |

(B)

| | |
|---|---|
| L(in Air) | 25.08 |
| Bf(in Air) | 4.01 |
| f | 4.85 |
| f1 | −7.94 |
| f2 | 20.43 |
| f3 | 18.04 |
| f4 | −13.03 |
| f5 | 16.01 |
| f6 | 6.45 |
| f7 | −8.48 |
| f12 | −23.08 |
| f45 | 716.40 |
| f123 | 20.17 |
| f234 | 23.70 |
| f345 | 22.05 |
| f2345 | 11.78 |
| f3456 | 5.46 |
| f12345 | 24.00 |

(C)

| Surface Numbers | K | RB3 | RB4 | RB5 | RB6 |
|---|---|---|---|---|---|
| 5 | 6.5806721E−01 | −6.3771972E−04 | 1.6370081E−05 | −4.9800689E−06 | −8.9123527E−08 |
| 6 | 1.2006027E+01 | −1.6809586E−03 | −1.2042583E−04 | 6.5197806E−07 | 5.0089674E−07 |
| 8 | 9.6087773E−02 | 3.1892472E−03 | −2.4001475E−04 | 1.1192829E−05 | 1.4996040E−06 |
| 9 | 0.0000000E+00 | 5.9919630E−03 | 2.2543612E−04 | 2.9253843E−06 | 3.0057103E−07 |
| 10 | 1.0000000E+00 | 2.2021407E−03 | 2.6421130E−04 | −1.4711465E−05 | −4.6989346E−07 |
| 11 | −1.9765591E−01 | −3.5815697E−04 | −2.8087034E−05 | −1.9644925E−06 | −3.3923381E−08 |
| 14 | −2.8533121E+00 | −5.1801690E−03 | 2.4709447E−06 | 8.6041312E−07 | −5.0521540E−07 |

(C)

| Surface Numbers | RB7 | RB8 | RB9 | RB10 | RB11 |
|---|---|---|---|---|---|
| 5 | 5.8900880E−09 | 2.9859060E−09 | 8.4762777E−10 | −8.0185639E−11 | 5.5869260E−13 |
| 6 | 1.1268365E−07 | 1.1598765E−08 | −1.4973251E−09 | −1.0384910E−10 | 8.0636783E−12 |
| 8 | 1.0928062E−07 | −2.0792985E−08 | −9.5516315E−10 | 3.9620399E−10 | −3.9449301E−11 |
| 9 | −2.6859917E−08 | −8.5355490E−09 | 3.7621402E−10 | −6.6118151E−11 | −3.7319154E−12 |
| 10 | −2.5092125E−08 | 8.2799824E−10 | −7.1905854E−11 | 6.8388529E−11 | −1.6432139E−12 |
| 11 | −1.7701009E−09 | −9.2765556E−10 | −4.3637444E−11 | −2.0739930E−12 | 1.1348684E−12 |
| 14 | 6.2242325E−08 | 2.1116828E−08 | −3.0768516E−09 | 1.3664841E−10 | 5.0298887E−13 |

Example 20

FIG. 22 is a cross-sectional view illustrating the imaging lens in Example 20. Table 20 represents basic lens data, various data, and aspherical surface data regarding the imaging lens of Example 20. FIG. 48 illustrates, in order from the left of the drawing sheet, spherical aberration diagram, astigmatism diagram, distortion diagram, and lateral chromatic aberration diagram of the imaging lens in Example 20.

TABLE 20

Example 20

(A)

| Si | Ri | Di | Ndj | νdj |
|---|---|---|---|---|
| 1 | 23.0256 | 0.8999 | 1.5891 | 61.1 |
| 2 | 3.8670 | 2.8000 | | |
| 3 | −32.1780 | 3.5000 | 1.9037 | 31.3 |
| 4 | −10.9554 | 0.2497 | | |
| *5 | 17.1151 | 1.9999 | 1.5316 | 55.5 |
| *6 | −25.1569 | 0.2000 | | |
| 7(St) | ∞ | 0.7000 | | |
| *8 | −7.7971 | 0.7999 | 1.6335 | 23.6 |
| *9 | −536.5356 | 0.6000 | | |
| *10 | −106.2558 | 2.8000 | 1.5316 | 55.5 |
| *11 | −7.4427 | 0.1072 | | |
| 12 | 6.1027 | 3.7500 | 1.6180 | 63.3 |
| 13 | −8.6584 | 1.0000 | | |
| *14 | −5.2196 | 0.9001 | 1.6335 | 23.6 |
| 15 | ∞ | 0.70000 | | |
| 16 | ∞ | 0.50000 | 1.5168 | 64.2 |
| 17 | ∞ | 2.84152 | | |
| Image Surface | ∞ | | | |

(B)

| | |
|---|---|
| L(in Air) | 24.18 |
| Bf(in Air) | 3.87 |
| f | 4.84 |
| f1 | −8.03 |
| f2 | 17.05 |
| f3 | 19.48 |
| f4 | −12.50 |
| f5 | 14.91 |
| f6 | 6.41 |
| f7 | −8.24 |
| f12 | −36.50 |
| f45 | 294.94 |
| f123 | 17.39 |
| f234 | 22.39 |
| f345 | 22.75 |
| f2345 | 11.04 |
| f3456 | 5.27 |
| f12345 | 19.59 |

(C)

| Surface Numbers | K | RB3 | RB4 | RB5 | RB6 |
|---|---|---|---|---|---|
| 5 | 6.5537944E−01 | −9.4982896E−04 | 7.3370186E−06 | −4.6366274E−06 | −5.9657920E−08 |
| 6 | 2.9217835E+00 | −1.5825758E−03 | −1.3901547E−04 | 1.1037934E−06 | 4.1862361E−07 |
| 8 | 1.2382357E−01 | 3.0935388E−03 | −2.7578617E−04 | 1.0001355E−05 | 1.3417770E−06 |
| 9 | 0.0000000E+00 | 5.8519061E−03 | 1.9222635E−04 | 2.3597332E−06 | 3.0823379E−07 |
| 10 | 1.0000000E+00 | 2.5285475E−03 | 2.4278120E−04 | −1.5639100E−05 | −6.0549562E−07 |
| 11 | −1.8065972E−01 | −4.8431734E−04 | −3.6703756E−05 | −2.6861119E−06 | −6.1418574E−08 |
| 14 | −3.1659640E+00 | −5.6762667E−03 | −4.1750028E−06 | 9.4533459E−07 | −3.3335258E−07 |

(C)

| Surface Numbers | RB7 | RB8 | RB9 | RB10 | RB11 |
|---|---|---|---|---|---|
| 5 | 2.6727599E−09 | 1.4224882E−09 | 6.6830954E−10 | −4.8396211E−11 | −5.0004644E−13 |
| 6 | 8.9163299E−08 | 8.2948273E−09 | −1.6527371E−09 | −7.1114552E−11 | 9.4350576E−12 |
| 8 | 9.0285150E−08 | −2.2851833E−08 | −1.1607085E−09 | 4.7500986E−10 | −4.2941805E−11 |
| 9 | −2.5862029E−08 | −8.9584528E−09 | 1.9730039E−10 | −2.9940575E−11 | −8.2328969E−12 |
| 10 | −2.3912237E−08 | 1.0078361E−09 | −3.9629221E−11 | 7.7669354E−11 | −2.6311013E−12 |
| 11 | −2.7040367E−09 | −9.9165360E−10 | −4.5746297E−11 | −1.5231667E−12 | 1.3775269E−12 |
| 14 | 6.6636441E−08 | 2.0591925E−08 | −2.9933178E−09 | 7.3823572E−11 | 4.7819339E−12 |

Example 21

FIG. 23 is a cross-sectional view illustrating the imaging lens in Example 21. Table 21 represents basic lens data, various data, and aspherical surface data regarding the imaging lens of Example 21. FIG. 49 illustrates, in order from the left of the drawing sheet, spherical aberration diagram, astigmatism diagram, distortion diagram, and lateral chromatic aberration diagram of the imaging lens in Example 21.

TABLE 21

Example 21

(A)

| Si | Ri | Di | Ndj | ν dj |
|---|---|---|---|---|
| 1 | 23.0107 | 0.9000 | 1.5891 | 61.1 |
| 2 | 3.8920 | 2.8000 | | |
| 3 | -32.8917 | 3.4999 | 1.9037 | 31.3 |
| 4 | -11.2358 | 0.2498 | | |
| *5 | 15.2373 | 2.2290 | 1.5316 | 55.5 |
| *6 | -16.4751 | 0.2000 | | |
| 7(St) | ∞ | 0.7499 | | |
| *8 | -6.2629 | 1.0000 | 1.6335 | 23.6 |
| *9 | -431.2715 | 0.6000 | | |
| *10 | -102.6868 | 3.0000 | 1.5316 | 55.5 |
| *11 | -6.6037 | 0.1072 | | |
| 12 | 5.9824 | 4.0121 | 1.5891 | 61.1 |
| 13 | -8.4581 | 0.8800 | | |
| *14 | -5.1160 | 0.8502 | 1.6335 | 23.6 |
| 15 | ∞ | 0.70000 | | |
| 16 | ∞ | 0.50000 | 1.5168 | 64.2 |
| 17 | ∞ | 2.76234 | | |
| Image Surface | ∞ | | | |

(B)

| | |
|---|---|
| L(in Air) | 24.87 |
| Bf(in Air) | 3.79 |
| f | 4.86 |
| f1 | -8.09 |
| f2 | 17.54 |
| f3 | 15.26 |
| f4 | -10.04 |
| f5 | 13.13 |
| f6 | 6.63 |
| f7 | -8.08 |
| f12 | -34.03 |
| f45 | 661.11 |
| f123 | 12.66 |
| f234 | 22.74 |
| f345 | 19.83 |
| f2345 | 10.78 |
| f3456 | 5.35 |
| f12345 | 16.26 |

(C)

| Surface Numbers | K | RB3 | RB4 | RB5 | RB6 |
|---|---|---|---|---|---|
| 5 | 1.2672988E+00 | -6.7649820E-04 | 9.6416835E-06 | -1.5034334E-06 | -3.6148733E-08 |
| 6 | 1.2186121E+00 | -8.0092355E-04 | -5.8735782E-05 | -1.1678000E-06 | 4.4627080E-07 |
| 8 | 1.2851151E-02 | 5.5508345E-03 | -3.8122718E-04 | 7.7695744E-06 | 1.3694439E-06 |
| 9 | 0.0000000E+00 | 7.0289821E-03 | 1.5128722E-04 | 3.4177173E-06 | 3.1171762E-07 |
| 10 | 1.0000000E+00 | 1.4221628E-03 | 3.5285424E-04 | -1.6804859E-05 | -1.3972364E-07 |
| 11 | -3.4068488E-03 | -7.3940192E-04 | -3.6352714E-05 | -1.6672164E-06 | -3.9149578E-08 |
| 14 | -2.1678823E+00 | -4.4885570E-03 | 2.2217180E-05 | -9.1783710E-07 | -3.7215715E-07 |

(C)

| Surface Numbers | RB7 | RB8 | RB9 | RB10 | RB11 |
|---|---|---|---|---|---|
| 5 | 3.2472497E-09 | 1.4028342E-09 | 6.9875212E-10 | -5.1173661E-11 | -2.7739474E-13 |
| 6 | 9.5652273E-08 | 8.9804507E-09 | -1.6412884E-09 | -7.2878212E-11 | 9.8847742E-12 |
| 8 | 9.6194620E-08 | -2.2187321E-08 | -1.0497061E-09 | 4.7564489E-10 | -4.2805580E-11 |
| 9 | -2.6082829E-08 | -8.9759922E-09 | 2.1451224E-10 | -1.8478447E-11 | -8.1016139E-12 |
| 10 | -2.4849003E-08 | 9.6555535E-10 | -3.9158072E-11 | 7.7652402E-11 | -2.5034022E-12 |
| 11 | -2.5404292E-09 | -9.6970634E-10 | -4.5347606E-11 | -1.6956749E-12 | 1.3123297E-12 |
| 14 | 5.8933020E-08 | 1.9727222E-08 | -2.6977002E-09 | 5.6360004E-11 | 4.2317947E-12 |

Example 22

FIG. 24 is a cross-sectional view illustrating the imaging lens in Example 22. Table 22 represents basic lens data, various data, and aspherical surface data regarding the imaging lens of Example 22. FIG. 50 illustrates, in order from the left of the drawing sheet, spherical aberration diagram, astigmatism diagram, distortion diagram, and lateral chromatic aberration diagram of the imaging lens in Example 22.

TABLE 22

Example 22

(A)

| Si | Ri | Di | Ndj | ν dj |
|---|---|---|---|---|
| 1 | 23.0056 | 0.9000 | 1.5891 | 61.1 |
| 2 | 3.8724 | 2.8000 | | |
| 3 | -32.4747 | 3.4999 | 1.9037 | 31.3 |
| 4 | -13.0377 | 0.3000 | | |
| *5 | 15.2776 | 2.0022 | 1.5316 | 55.5 |
| *6 | -11.8624 | 0.2000 | | |
| 7(St) | ∞ | 0.7499 | | |
| *8 | -6.2056 | 1.0000 | 1.6335 | 23.6 |
| *9 | -243.0813 | 0.6000 | | |
| *10 | -89.4026 | 2.9956 | 1.5316 | 55.5 |
| *11 | -6.9442 | 0.1072 | | |
| 12 | 6.3243 | 4.1895 | 1.6180 | 63.3 |
| 13 | -8.5495 | 0.8800 | | |
| *14 | -5.1841 | 0.8502 | 1.6335 | 23.6 |
| 15 | ∞ | 0.70000 | | |
| 16 | ∞ | 0.50000 | 1.5168 | 64.2 |
| 17 | ∞ | 2.90998 | | |
| Image Surface | ∞ | | | |

(B)

| | |
|---|---|
| L(in Air) | 25.01 |
| Bf(in Air) | 3.94 |
| f | 4.85 |
| f1 | -8.04 |
| f2 | 22.21 |
| f3 | 12.89 |
| f4 | -10.07 |
| f5 | 13.99 |
| f6 | 6.59 |
| f7 | -8.18 |
| f12 | -20.65 |
| f45 | -236.76 |
| f123 | 12.19 |
| f234 | 23.95 |
| f345 | 18.05 |
| f2345 | 11.08 |
| f3456 | 5.42 |
| f12345 | 17.87 |

(C)

| Surface Numbers | K | RB3 | RB4 | RB5 | RB6 |
|---|---|---|---|---|---|
| 5 | 7.8816625E-01 | -4.8742310E-04 | 1.2069361E-05 | -3.8428797E-06 | -5.5627137E-08 |
| 6 | 6.2184588E-01 | -1.5996449E-04 | -8.6173667E-05 | -3.1984517E-06 | 3.9299487E-07 |
| 8 | -7.4919459E-03 | 5.5610017E-03 | -3.6020997E-04 | 6.5700553E-06 | 1.3203187E-06 |
| 9 | 0.0000000E+00 | 6.6659897E-03 | 1.9356970E-04 | 5.3557531E-06 | 3.2220795E-07 |
| 10 | 1.0000000E+00 | 1.4181041E-03 | 3.5673677E-04 | -1.4143995E-05 | -2.4534805E-07 |
| 11 | -1.7512133E-01 | -7.4840516E-04 | -4.4572226E-05 | -6.8050491E-07 | -6.0544058E-08 |
| 14 | -2.2419138E+00 | -4.5725144E-03 | 2.9966780E-05 | -1.9093698E-06 | -3.2685054E-07 |

(C)

| Surface Numbers | RB7 | RB8 | RB9 | RB10 | RB11 |
|---|---|---|---|---|---|
| 5 | 2.4689284E-09 | 1.4349990E-09 | 6.9510273E-10 | -5.0970771E-11 | -5.1632835E-13 |
| 6 | 8.8696870E-08 | 8.3338978E-09 | -1.6497260E-09 | -7.3667181E-11 | 9.6115209E-12 |
| 8 | 8.8854337E-08 | -2.3114873E-08 | -1.1611160E-09 | 4.7095185E-10 | -4.2274144E-11 |
| 9 | -2.5236817E-08 | -8.8925179E-09 | 1.9563284E-10 | -3.2854881E-11 | -8.2871324E-12 |
| 10 | -2.3729582E-08 | 1.0148868E-09 | -3.8662082E-11 | 7.7485228E-11 | -2.6923963E-12 |
| 11 | -2.8155309E-09 | -9.9772403E-10 | -4.5553936E-11 | -1.5100750E-12 | 1.3733586E-12 |
| 14 | 6.6575677E-08 | 2.0113809E-08 | -3.0726220E-09 | 7.6250629E-11 | 4.6548611E-12 |

Example 23

FIG. 25 is a cross-sectional view illustrating the imaging lens in Example 23. Table 23 represents basic lens data, various data, and aspherical surface data regarding the imaging lens of Example 23. FIG. 51 illustrates, in order from the left of the drawing sheet, spherical aberration diagram, astigmatism diagram, distortion diagram, and lateral chromatic aberration diagram of the imaging lens in Example 23.

TABLE 23

Example 23

(A)

| Si | Ri | Di | Ndj | ν dj |
|---|---|---|---|---|
| 1 | 23.9741 | 0.9000 | 1.7725 | 49.6 |
| 2 | 4.5328 | 2.2000 | | |
| 3 | 68.7766 | 2.8999 | 1.9037 | 31.3 |
| 4 | −14.8812 | 0.2497 | | |
| *5 | 22.8806 | 2.0000 | 1.5316 | 55.5 |
| *6 | −9.6486 | 0.2000 | | |
| 7(St) | ∞ | 0.7498 | | |
| *8 | −7.1168 | 1.0001 | 1.6335 | 23.6 |
| *9 | 16.1226 | 0.6000 | | |
| *10 | 80.6488 | 3.0000 | 1.5316 | 55.5 |
| *11 | −5.8923 | 0.1072 | | |
| 12 | 5.8806 | 3.7500 | 1.6180 | 63.3 |
| 13 | −8.8513 | 0.9025 | | |
| *14 | −4.9121 | 0.8502 | 1.6335 | 23.6 |
| 15 | ∞ | 0.70000 | | |
| 16 | ∞ | 0.50000 | 1.5168 | 64.2 |
| 17 | ∞ | 2.34990 | | |
| Image Surface | ∞ | | | |

(B)

| | |
|---|---|
| L(in Air) | 22.79 |
| Bf(in Air) | 3.38 |
| f | 4.87 |
| f1 | −7.38 |
| f2 | 13.76 |
| f3 | 13.05 |
| f4 | −7.67 |
| f5 | 10.46 |
| f6 | 6.33 |
| f7 | −7.75 |
| f12 | −33.57 |
| f45 | 1059.55 |
| f123 | 11.76 |
| f234 | 18.96 |
| f345 | 17.71 |
| f2345 | 9.70 |
| f3456 | 4.95 |
| f12345 | 15.87 |

(C)

| Surface Numbers | K | RB3 | RB4 | RB5 | RB6 |
|---|---|---|---|---|---|
| 5 | 1.0000000E+00 | 1.3421626E−04 | −8.0860083E−04 | 1.3499613E−03 | −2.7415173E−04 |
| 6 | 1.0000000E+00 | 3.3134245E−03 | 4.6827087E−03 | 6.5996414E−04 | −2.7402194E−04 |
| 8 | 1.0000000E+00 | 1.0800831E−02 | 1.0393327E−02 | −2.6599076E−03 | 1.2000222E−04 |
| 9 | 1.0000000E+00 | 2.0123379E−02 | −5.1529673E−03 | 3.4352523E−03 | −4.2668625E−04 |
| 10 | 1.0000000E+00 | 5.1623525E−03 | 1.6503112E−03 | −4.0778610E−03 | 1.4843180E−03 |
| 11 | 1.0000000E+00 | −5.1947139E−03 | 4.2061642E−03 | −2.0339947E−03 | 6.7475444E−04 |
| 14 | −2.1798927E+00 | −2.2058279E−03 | −2.6804717E−03 | −1.3195433E−03 | 3.5054433E−04 |

(C)

| Surface Numbers | RB7 | RB8 | RB9 | RB10 | RB11 |
|---|---|---|---|---|---|
| 5 | 1.2332607E−06 | 7.3377169E−06 | 0.0000000E+00 | 0.0000000E+00 | 0.0000000E+00 |
| 6 | 5.7525391E−05 | −2.1410289E−05 | 0.0000000E+00 | 0.0000000E+00 | 0.0000000E+00 |
| 8 | −8.9992234E−05 | −1.5226181E−05 | 1.9045593E−06 | 0.0000000E+00 | 0.0000000E+00 |
| 9 | −2.4318213E−05 | −1.0019977E−05 | 0.0000000E+00 | 0.0000000E+00 | 0.0000000E+00 |
| 10 | 1.0208083E−03 | −4.5662131E−04 | −7.6888809E−05 | 6.3289655E−05 | −8.4938625E−06 |
| 11 | −4.6555276E−04 | 1.4330343E−04 | 4.7558816E−05 | −3.4332260E−05 | 4.9954130E−06 |
| 14 | 0.0000000E+00 | 0.0000000E+00 | 0.0000000E+00 | 0.0000000E+00 | 0.0000000E+00 |

Example 24

FIG. 26 is a cross-sectional view illustrating the imaging lens in Example 24. Table 24 represents basic lens data, various data, and aspherical surface data regarding the imaging lens of Example 24. FIG. 52 illustrates, in order from the left of the drawing sheet, spherical aberration diagram, astigmatism diagram, distortion diagram, and lateral chromatic aberration diagram of the imaging lens in Example 24.

TABLE 24

Example 24

(A)

| Si | Ri | Di | Ndj | ν dj |
|---|---|---|---|---|
| 1 | 23.1852 | 0.9000 | 1.7725 | 49.6 |
| 2 | 5.2118 | 2.2000 | | |
| 3 | 181.7894 | 3.3001 | 1.9037 | 31.3 |
| 4 | −13.3226 | 0.2497 | | |
| *5 | 19.1714 | 3.5893 | 1.5316 | 55.5 |
| *6 | −28.7537 | 0.2000 | | |
| 7(St) | ∞ | 0.6999 | | |
| *8 | −7.2635 | 0.8000 | 1.6335 | 23.6 |
| *9 | 17.2580 | 0.6000 | | |
| *10 | 272.1485 | 2.8007 | 1.5316 | 55.5 |
| *11 | −4.7814 | 0.1072 | | |
| 12 | 5.9164 | 3.7500 | 1.6180 | 63.3 |
| 13 | −9.0440 | 0.8800 | | |
| *14 | −4.8863 | 0.8502 | 1.6335 | 23.6 |
| 15 | ∞ | 0.70000 | | |
| 16 | ∞ | 0.50000 | 1.5168 | 64.2 |
| 17 | ∞ | 2.12778 | | |
| Image Surface | ∞ | | | |

(B)

| | |
|---|---|
| L(in Air) | 24.08 |
| Bf(in Air) | 3.16 |
| f | 4.82 |
| f1 | −8.90 |
| f2 | 13.85 |
| f3 | 22.22 |
| f4 | −7.97 |
| f5 | 8.87 |
| f6 | 6.40 |
| f7 | −7.71 |
| f12 | −96.82 |
| f45 | 38.38 |
| f123 | 18.55 |
| f234 | 28.81 |
| f345 | 18.44 |
| f2345 | 10.61 |
| f3456 | 4.72 |
| f12345 | 14.10 |

(C)

| Surface Numbers | K | RB3 | RB4 | RB5 | RB6 |
|---|---|---|---|---|---|
| 5 | 1.0000000E+00 | 2.0231930E−03 | −2.1532615E−03 | 1.3362853E−03 | −2.3983309E−04 |
| 6 | 1.0000000E+00 | 9.0151806E−04 | 2.2648824E−03 | −6.2436147E−04 | −1.5955139E−04 |
| 8 | 1.0000000E+00 | −2.2816842E−03 | 1.5196477E−03 | −1.4255095E−03 | −4.7290709E−04 |
| 9 | 1.0000000E+00 | 3.4645355E−03 | −5.6610633E−03 | 2.2130224E−03 | −9.4394187E−05 |
| 10 | 1.0000000E+00 | 8.2963625E−05 | 3.5717666E−03 | −3.3650791E−03 | 9.2529210E−04 |
| 11 | 1.0000000E+00 | −4.2897828E−04 | −1.9406923E−03 | 2.2374942E−03 | −1.5260704E−04 |
| 14 | −3.7420961E+00 | −3.1161439E−03 | −2.9637540E−03 | −8.9822457E−04 | 2.5896394E−04 |

(C)

| Surface Numbers | RB7 | RB8 | RB9 | RB10 | RB11 |
|---|---|---|---|---|---|
| 5 | −1.2269021E−05 | 7.9043439E−06 | 0.0000000E+00 | 0.0000000E+00 | 0.0000000E+00 |
| 6 | 1.6731799E−04 | −6.7753242E−05 | 0.0000000E+00 | 0.0000000E+00 | 0.0000000E+00 |
| 8 | −2.5383382E−04 | 2.5844351E−04 | −6.7334214E−05 | 0.0000000E+00 | 0.0000000E+00 |
| 9 | 2.9922472E−05 | −2.1118330E−05 | 0.0000000E+00 | 0.0000000E+00 | 0.0000000E+00 |
| 10 | 9.5691356E−04 | −3.7697523E−04 | −5.9241320E−05 | 4.1942641E−05 | −4.7624463E−06 |
| 11 | −6.0961067E−04 | 1.8824154E−04 | 5.9566907E−05 | −3.5757891E−05 | 4.6000623E−06 |
| 14 | 0.0000000E+00 | 0.0000000E+00 | 0.0000000E+00 | 0.0000000E+00 | 0.0000000E+00 |

Example 25

FIG. 27 is a cross-sectional view illustrating the imaging lens in Example 25. Table 25 represents basic lens data, various data, and aspherical surface data regarding the imaging lens of Example 25. FIG. 53 illustrates, in order from the left of the drawing sheet, spherical aberration diagram, astigmatism diagram, distortion diagram, and lateral chromatic aberration diagram of the imaging lens in Example 25.

TABLE 25

Example 25

(A)

| Si | Ri | Di | Ndj | ν dj |
|---|---|---|---|---|
| 1 | 23.8595 | 0.9000 | 1.7725 | 49.6 |
| 2 | 4.5611 | 2.2000 | | |
| 3 | −543.6043 | 3.3000 | 1.9037 | 31.3 |
| 4 | −11.0351 | 0.3000 | | |
| *5 | 23.3135 | 3.4500 | 1.5316 | 55.5 |
| *6 | −11.0641 | 0.2000 | | |
| 7(St) | ∞ | 0.7498 | | |
| *8 | −8.2607 | 0.8000 | 1.6335 | 23.6 |
| *9 | 13.9037 | 0.6000 | | |
| *10 | 201.4070 | 3.0000 | 1.5316 | 55.5 |
| *11 | −5.7446 | 0.1072 | | |
| 12 | 5.8682 | 3.5000 | 1.6180 | 63.3 |
| 13 | −13.9555 | 1.1892 | | |
| *14 | −5.6218 | 0.8502 | 1.6335 | 23.6 |
| 15 | ∞ | 0.70000 | | |
| 16 | ∞ | 0.50000 | 1.5168 | 64.2 |
| 17 | ∞ | 1.93081 | | |
| Image Surface | ∞ | | | |

(B)

| | |
|---|---|
| L(in Air) | 24.11 |
| Bf(in Air) | 2.96 |
| f | 4.89 |
| f1 | −7.45 |
| f2 | 12.43 |
| f3 | 14.62 |
| f4 | −8.07 |
| f5 | 10.56 |
| f6 | 7.17 |
| f7 | −8.87 |
| f12 | −81.59 |
| f45 | 263.00 |
| f123 | 10.76 |
| f234 | 15.27 |
| f345 | 18.71 |
| f2345 | 9.62 |
| f3456 | 5.43 |
| f12345 | 13.64 |

(C)

| Surface Numbers | K | RB3 | RB4 | RB5 | RB6 |
|---|---|---|---|---|---|
| 5 | 1.0000000E+00 | −2.7516011E−04 | −7.5689107E−04 | 7.3787891E−05 | −1.6934826E−05 |
| 6 | 1.0000000E+00 | −9.5424232E−04 | 7.8559480E−04 | −4.0253783E−04 | −6.8603869E−05 |
| 8 | 1.0000000E+00 | −5.7534493E−05 | 3.6061283E−04 | −8.4561334E−04 | −4.1124628E−05 |
| 9 | 1.0000000E+00 | 5.1068479E−04 | 7.8521547E−05 | 7.2023583E−04 | 1.2133876E−05 |
| 10 | 1.0000000E+00 | 2.0387372E−03 | −4.9927201E−03 | 2.4212999E−03 | −9.4764774E−04 |
| 11 | 1.0000000E+00 | 4.5682005E−03 | −8.6473971E−03 | 5.6616035E−03 | −9.1251068E−04 |
| 14 | −1.3117516E+00 | −3.4185577E−04 | −2.0424027E−03 | −5.7604622E−04 | 1.7293141E−04 |

(C)

| Surface Numbers | RB7 | RB8 | RB9 | RB10 | RB11 |
|---|---|---|---|---|---|
| 5 | −7.3632864E−06 | 2.4171049E−06 | 0.0000000E+00 | 0.0000000E+00 | 0.0000000E+00 |
| 6 | −1.7203147E−05 | 8.0424156E−06 | 0.0000000E+00 | 0.0000000E+00 | 0.0000000E+00 |
| 8 | −4.5785791E−05 | −2.7378302E−05 | 8.2777428E−06 | 0.0000000E+00 | 0.0000000E+00 |
| 9 | 4.0251759E−05 | −5.2569674E−06 | 0.0000000E+00 | 0.0000000E+00 | 0.0000000E+00 |
| 10 | 5.9440378E−04 | −1.3772400E−04 | 1.4818485E−05 | −1.0312603E−06 | −7.6678314E−09 |
| 11 | −6.9092561E−04 | 2.3036896E−04 | 6.4552659E−05 | −3.8686524E−05 | 4.7752614E−06 |
| 14 | 0.0000000E+00 | 0.0000000E+00 | 0.0000000E+00 | 0.0000000E+00 | 0.0000000E+00 |

Example 26

FIG. 28 is a cross-sectional view illustrating the imaging lens in Example 26. Table 26 represents basic lens data, various data, and aspherical surface data regarding the imaging lens of Example 26. FIG. 54 illustrates, in order from the left of the drawing sheet, spherical aberration diagram, astigmatism diagram, distortion diagram, and lateral chromatic aberration diagram of the imaging lens in Example 26.

TABLE 26

Example 26

(A)

| Si | Ri | Di | Ndj | ν dj |
|---|---|---|---|---|
| 1 | 22.2011 | 0.8999 | 1.7725 | 49.6 |
| 2 | 3.7614 | 2.2000 | | |
| 3 | 76.6236 | 2.6999 | 1.6335 | 23.6 |
| 4 | −11.0731 | 0.2496 | | |
| *5 | 93.3697 | 3.4500 | 1.6180 | 63.3 |
| *6 | −6.3190 | 0.2000 | | |
| 7(St) | ∞ | 0.6999 | | |
| *8 | −10.1124 | 0.7999 | 1.6335 | 23.6 |
| *9 | 12.9038 | 0.6000 | | |
| *10 | 418.1059 | 2.8000 | 1.5316 | 55.5 |
| *11 | −7.2393 | 0.1072 | | |
| 12 | 8.6938 | 3.5000 | 1.6180 | 63.3 |
| 13 | −7.8671 | 1.6257 | | |
| *14 | −5.9408 | 0.9000 | 1.6335 | 23.6 |
| 15 | ∞ | 0.70000 | | |
| 16 | ∞ | 0.50000 | 1.5168 | 64.2 |
| 17 | ∞ | 2.59435 | | |
| Image Surface | ∞ | | | |

(B)

| | |
|---|---|
| L(in Air) | 24.36 |
| Bf(in Air) | 3.62 |
| f | 4.82 |
| f1 | −5.99 |
| f2 | 15.46 |
| f3 | 9.71 |
| f4 | −8.83 |
| f5 | 13.42 |
| f6 | 7.27 |
| f7 | −9.38 |
| f12 | −15.66 |
| f45 | −61.87 |
| f123 | 8.57 |
| f234 | 12.90 |
| f345 | 14.61 |
| f2345 | 9.05 |
| f3456 | 5.76 |
| f12345 | 14.82 |

(C)

| Surface Numbers | K | RB3 | RB4 | RB5 | RB6 |
|---|---|---|---|---|---|
| 3 | 1.0000000E+00 | 1.7240670E−03 | −1.8333422E−03 | 1.0168832E−03 | −5.8714861E−04 |
| 4 | 1.0000000E+00 | 0.0000000E+00 | 0.0000000E+00 | 0.0000000E+00 | 1.1062816E−05 |
| 8 | 1.0000000E+00 | −3.9861040E−04 | −2.9364141E−04 | 1.4851086E−05 | −1.3068575E−06 |
| 9 | 1.0000000E+00 | −3.2147003E−04 | 2.1726126E−03 | 1.0991659E−04 | 2.2344260E−06 |
| 10 | 1.0000000E+00 | 5.9810268E−04 | 1.9865816E−03 | 1.2175450E−04 | −6.9877934E−04 |
| 11 | 1.0000000E+00 | 5.6394544E−03 | −9.5555378E−03 | 6.7039925E−03 | −1.1855985E−03 |
| 14 | 1.8982456E+00 | −8.0448334E−04 | −2.7316577E−04 | −3.7884339E−05 | −8.6555359E−06 |

(C)

| Surface Numbers | RB7 | RB8 | RB9 | RB10 | RB11 |
|---|---|---|---|---|---|
| 3 | 9.3368600E−05 | 9.6871018E−05 | −4.7771197E−05 | 6.3117231E−06 | 0.0000000E+00 |
| 4 | 0.0000000E+00 | 0.0000000E+00 | 0.0000000E+00 | 0.0000000E+00 | 4.0317170E−10 |
| 8 | −3.0195902E−07 | −3.5528608E−08 | −7.5508159E−09 | 0.0000000E+00 | 0.0000000E+00 |
| 9 | −2.0558805E−08 | −6.1528960E−09 | 0.0000000E+00 | 0.0000000E+00 | 0.0000000E+00 |
| 10 | 5.8428774E−04 | −1.9254765E−04 | 1.1038882E−05 | 4.3923983E−06 | −4.9879320E−07 |
| 11 | −7.3320646E−04 | 2.4418315E−04 | 6.7295012E−05 | −3.8740563E−05 | 4.5572923E−06 |
| 14 | 0.0000000E+00 | 0.0000000E+00 | 0.0000000E+00 | 0.0000000E+00 | 0.0000000E+00 |

Regarding the imaging lenses of Examples 1 through 12 among the Examples 1 through 26 above, the materials for all of the lenses are glass. In Examples 13 through 25, a first lens L1, a second lens L2, and a sixth lens L6 are glass, and a third lens L3, a fourth lens L4, a fifth lens L5, and a seventh lens L7 are plastic. In Example 26, a first lens L1, a third lens L3, and a sixth lens L6 are glass, and a second lens L2, a fourth lens L4, a fifth lens L5, and a seventh lens L7 are plastic.

Tables 27 and 28 represent the values corresponding to conditional formulae (1) through (23) of the imaging lenses, which are summarized for each of the Examples 1 through 26. The values represented in Tables 27 and 28 are with respect to the d line.

by seven lenses and can be produced in a small size. The respective imaging lenses further have small F numbers from 1.5 to 1.6 and correct the respective aberration favor-

TABLE 27

Conditional Formulae

| Examples | (1) f12/f | (2) vd7 | (3) vd3 | (4) D4/f | (5) (R3 + R4)/ (R3 − R4) | (6) f345/f | (7) f1/f2 | (8) (R14 + R15)/ (R14 − R15) | (9) (R5 + R6)/ (R5 − R6) | (10) f5/f | (11) (R10 + R11)/ (R10 − R11) | (12) (R12 + R13)/ (R12 − R13) |
|---|---|---|---|---|---|---|---|---|---|---|---|---|
| 1 | −7.08 | 30.13 | 63.33 | 0.05 | 0.99 | 3.08 | −0.52 | −1.00 | 0.69 | 1.91 | 1.10 | 0.05 |
| 2 | −8.67 | 26.3 | 63.3 | 0.05 | 0.96 | 3.95 | −0.53 | −1.69 | 0.64 | 2.09 | 1.16 | 0.02 |
| 3 | −6.43 | 26.3 | 63.3 | 0.06 | 0.68 | 2.56 | −0.51 | −0.56 | 0.67 | 1.80 | 1.03 | −0.03 |
| 4 | −9.90 | 38.03 | 63.33 | 0.05 | 1.35 | 3.50 | −0.55 | −1.00 | 0.63 | 1.90 | 1.19 | 0.00 |
| 5 | −9.21 | 34.54 | 63.33 | 0.05 | 1.16 | 3.21 | −0.56 | −1.00 | 0.66 | 1.82 | 1.11 | 0.00 |
| 6 | −3.88 | 32.10 | 63.33 | 0.05 | 1.09 | 2.75 | −0.45 | −1.00 | 0.31 | 2.38 | 2.12 | 0.03 |
| 7 | −3.85 | 26.29 | 63.33 | 0.06 | 0.62 | 2.68 | −0.45 | −1.00 | 0.66 | 1.76 | 0.94 | −0.05 |
| 8 | −3.33 | 41.41 | 63.33 | 0.06 | 0.49 | 2.19 | −0.44 | −1.00 | 0.43 | 2.12 | 0.84 | −0.56 |
| 9 | −8.87 | 26.29 | 63.33 | 0.05 | 0.19 | 2.82 | −0.63 | −1.00 | −0.25 | 1.61 | 1.25 | −0.19 |
| 10 | −3.89 | 26.29 | 63.33 | 0.05 | 0.66 | 2.20 | −0.48 | −1.00 | −0.41 | 1.31 | 1.00 | −0.53 |
| 11 | −3.30 | 17.47 | 63.33 | 0.05 | −0.44 | 2.19 | −0.49 | −1.00 | −0.60 | 1.64 | 1.15 | −0.32 |
| 12 | −5.48 | 17.47 | 63.33 | 0.06 | −0.87 | 2.00 | −0.64 | −0.72 | 0.19 | 1.38 | 1.00 | −0.56 |
| 13 | −25.61 | 23.62 | 55.48 | 0.06 | 3.30 | 5.49 | −0.55 | −1.00 | −0.37 | 2.02 | 0.30 | −0.26 |
| 14 | −21.56 | 23.62 | 55.48 | 0.06 | 3.57 | 5.01 | −0.53 | −1.00 | −0.27 | 2.10 | 0.24 | −0.25 |
| 15 | −21.76 | 23.62 | 55.48 | 0.06 | 3.13 | 6.40 | −0.54 | −1.00 | 0.14 | 2.50 | 0.42 | −0.20 |
| 16 | 13.07 | 23.62 | 55.48 | 0.06 | 3.49 | 4.68 | −0.66 | −1.00 | 0.24 | 1.77 | 0.07 | −0.13 |
| 17 | −7.28 | 23.62 | 55.48 | 0.06 | 3.79 | 3.88 | −0.44 | −1.00 | 0.19 | 3.30 | 1.06 | −0.10 |
| 18 | −5.41 | 23.62 | 55.48 | 0.06 | 2.16 | 3.81 | −0.42 | −1.00 | −0.18 | 2.87 | 1.17 | −0.19 |
| 19 | −4.76 | 23.62 | 55.48 | 0.06 | 2.29 | 4.55 | −0.39 | −1.00 | −0.30 | 3.30 | 1.21 | −0.21 |
| 20 | −7.54 | 23.62 | 55.48 | 0.05 | 2.03 | 4.70 | −0.47 | −1.00 | −0.19 | 3.08 | 1.15 | −0.17 |
| 21 | −7.01 | 23.62 | 55.48 | 0.05 | 2.04 | 4.08 | −0.46 | −1.00 | −0.04 | 2.70 | 1.14 | −0.17 |
| 22 | −4.26 | 23.62 | 55.48 | 0.06 | 2.34 | 3.72 | −0.36 | −1.00 | 0.13 | 2.89 | 1.17 | −0.15 |
| 23 | −6.89 | 23.62 | 55.48 | 0.05 | 0.64 | 3.64 | −0.54 | −1.00 | 0.41 | 2.15 | 0.86 | −0.20 |
| 24 | −20.10 | 23.62 | 55.48 | 0.05 | 0.86 | 3.83 | −0.64 | −1.00 | −0.20 | 1.84 | 0.97 | −0.21 |
| 25 | −16.69 | 23.62 | 55.48 | 0.06 | 1.04 | 3.83 | −0.60 | −1.00 | 0.36 | 2.16 | 0.94 | −0.41 |
| 26 | −3.25 | 23.62 | 63.33 | 0.05 | 0.75 | 3.03 | −0.39 | −1.00 | 0.87 | 2.78 | 0.97 | 0.05 |

TABLE 28

Conditional Formulae

| Examples | (13) vd5 | (14) f3/f | (15) f2/f | (16) f1/f | (17) f123/f | (18) f234/f | (19) f12345/f | (20) f2345/f | (21) f3456/f | (22) (R8 + R9)/ (R8 − R9) | (23) f/f45 |
|---|---|---|---|---|---|---|---|---|---|---|---|
| 1 | 53.2 | 1.89 | 2.55 | −1.32 | 1.38 | 2.82 | 2.34 | 1.81 | 1.06 | −0.26 | −0.06 |
| 2 | 53.2 | 1.83 | 2.14 | −1.13 | 1.24 | 2.24 | 2.98 | 1.73 | 1.11 | −0.04 | −0.18 |
| 3 | 53.2 | 2.08 | 2.82 | −1.44 | 1.63 | 2.93 | 1.92 | 1.80 | 1.00 | −0.13 | 0.07 |
| 4 | 40.9 | 1.97 | 2.44 | −1.36 | 1.41 | 2.92 | 2.63 | 1.82 | 1.08 | −0.01 | −0.10 |
| 5 | 40.9 | 1.94 | 2.41 | −1.34 | 1.42 | 2.83 | 2.42 | 1.79 | 1.07 | −0.18 | −0.06 |
| 6 | 40.9 | 1.48 | 2.56 | −1.16 | 1.16 | 1.65 | 2.54 | 1.61 | 1.15 | 0.35 | −0.18 |
| 7 | 53.2 | 1.75 | 3.14 | −1.41 | 1.59 | 3.39 | 2.54 | 1.86 | 1.01 | −0.40 | −0.04 |
| 8 | 40.9 | 1.33 | 2.46 | −1.09 | 1.07 | 1.52 | 2.05 | 1.37 | 1.21 | 0.68 | −0.20 |
| 9 | 31.3 | 1.86 | 1.92 | −1.21 | 1.55 | 1.74 | 2.43 | 1.41 | 1.02 | 0.14 | −0.06 |
| 10 | 31.3 | 1.30 | 2.82 | −1.34 | 1.20 | 2.25 | 2.17 | 1.46 | 1.15 | −0.14 | −0.10 |
| 11 | 31.3 | 2.28 | 2.54 | −1.24 | 3.39 | 2.09 | 2.39 | 1.48 | 0.99 | 0.81 | 0.16 |
| 12 | 29.8 | 1.57 | 1.96 | −1.26 | 1.58 | 2.04 | 1.93 | 1.37 | 0.95 | 0.01 | 0.07 |
| 13 | 55.5 | 2.45 | 3.16 | −1.74 | 1.54 | 7.13 | 3.66 | 2.16 | 1.31 | −0.31 | −0.17 |
| 14 | 55.5 | 2.37 | 3.17 | −1.68 | 1.47 | 5.71 | 3.28 | 2.05 | 1.35 | −0.15 | −0.17 |
| 15 | 55.5 | 2.29 | 2.96 | −1.59 | 1.41 | 4.32 | 4.38 | 2.16 | 1.41 | −0.10 | −0.24 |
| 16 | 55.5 | 2.58 | 2.55 | −1.69 | 1.35 | 6.30 | 2.33 | 1.86 | 1.38 | −0.21 | −0.10 |
| 17 | 55.5 | 2.88 | 3.86 | −1.71 | 2.19 | 3.67 | 3.00 | 2.13 | 1.17 | −1.85 | −0.01 |
| 18 | 55.5 | 3.15 | 3.99 | −1.66 | 2.92 | 4.38 | 3.40 | 2.19 | 1.09 | −0.98 | 0.02 |
| 19 | 55.5 | 3.72 | 4.21 | −1.64 | 4.16 | 4.89 | 4.95 | 2.43 | 1.13 | −1.07 | 0.01 |
| 20 | 55.5 | 4.02 | 3.52 | −1.66 | 3.59 | 4.62 | 4.05 | 2.28 | 1.09 | −1.03 | 0.02 |
| 21 | 55.5 | 3.14 | 3.61 | −1.67 | 2.61 | 4.68 | 3.35 | 2.22 | 1.10 | −1.03 | 0.01 |
| 22 | 55.5 | 2.66 | 4.58 | −1.66 | 2.52 | 4.94 | 3.69 | 2.29 | 1.12 | −1.05 | −0.02 |
| 23 | 55.5 | 2.68 | 2.83 | −1.52 | 2.42 | 3.89 | 3.26 | 1.99 | 1.02 | −0.39 | 0.00 |
| 24 | 55.5 | 4.61 | 2.88 | −1.85 | 3.85 | 5.98 | 2.93 | 2.20 | 0.98 | −0.41 | 0.13 |
| 25 | 55.5 | 2.99 | 2.54 | −1.52 | 2.20 | 3.12 | 2.79 | 1.97 | 1.11 | −0.25 | 0.02 |
| 26 | 55.5 | 2.01 | 3.21 | −1.24 | 1.78 | 2.68 | 3.07 | 1.88 | 1.19 | −0.12 | −0.08 |

As can be found from the data described above, each of the imaging lenses of Examples 1 through 26 is constituted ably, having high optical performance. These imaging lenses can be suitably used for surveillance cameras, vehicle mounted cameras for photographing images in the front, side, and back of an automobile, and the like.

[Embodiment of the Imaging Apparatus]

FIG. 55 shows the aspect of an automobile 100 on which the imaging apparatus provided with the imaging lens of the present embodiment is mounted, as a usage example. In FIG. 55, the automobile 100 is provided with an outside-vehicle camera 101 for photographing a blind angle range on the side surface of the passenger's side thereof, an outside-vehicle camera 102 for photographing a blind angle range behind the automobile 100, and an in-vehicle camera 103, which is provided on the back of a room mirror, for photographing the same visual field range as the driver's. The outside-vehicle cameras 101, 102, and the in-vehicle camera 103 correspond to the imaging apparatus according to the embodiment of the present disclosure, and are provided with the imaging lens according to the present embodiment of the present disclosure and an imaging element which converts an optical image formed by the imaging lens into an electric signal.

All the imaging lenses according to the Examples of the present disclosure have the advantageous points described above. Accordingly, the outside-vehicle cameras 101, 102, and the in-vehicle camera 103 can also be configured in a small size and at low costs, have wider angles of view, and enables fine images to be obtained even in the peripheral portions of the imaging area.

The present disclosure has been described with reference to the Embodiments and Examples. The present disclosure is not limited to the embodiments and the examples described above, and various modifications are possible. For example, values, such as the radius of curvature, the distances between surfaces, the refractive indices, the Abbe numbers of each lens element, and the like are not limited to the values in the numerical examples shown in the Tables, but may be other values.

Note that all of the lenses of the Examples above are constituted by homogeneous materials. However, gradient index lenses may be used as the lenses. Further, in some of the Examples above, the second lens L2 through the seventh lens L7 are constituted by diffractive lenses in which surfaces are made aspherical. A diffractive optical element may be formed in one surface or a plurality of surfaces.

The embodiment of the imaging apparatus was described with reference to the Figure of an example, in which the present disclosure is applied to a vehicle mounted camera. The present disclosure is not limited to this application and can be applied to portable terminal cameras, surveillance cameras, and the like, for example.

What is claimed is:

1. An imaging lens consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein the following conditional formulae are satisfied:

$$f12/f<-3.2 \quad (1)$$

$$vd7<55 \quad (2)$$

$$40<vd3 \quad (3)$$

where,
f12 is the combined focal length of the first lens and the second lens,
f is the focal length of the entire system,
vd7 is the Abbe's number of the material for the seventh lens with respect to the d line, and
vd3 is the Abbe's number of the material for the third lens with respect to the d line.

2. An imaging lens consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein the following conditional formulae are satisfied:

$$f12/f<-3.2 \quad (1)$$

$$D4/f<0.39 \quad (4)$$

where,
f12 is the combined focal length of the first lens and the second lens,
f is the focal length of the entire system, and
D4 is the air space between the second lens and the third lens.

3. An imaging lens consisting of, in order from the object side, a first lens having a negative power, a second lens having a positive power, a third lens having a positive power, a fourth lens having a negative power, a fifth lens having a positive power, a sixth lens having a positive power, and a seventh lens having a negative power, wherein the following conditional formulae are satisfied:

$$vd7<55 \quad (2)$$

$$-0.93<(R3+R4)/(R3-R4) \quad (5)$$

where,
vd7 is the Abbe's number of the material for the seventh lens with respect to the d line,
R3 is the radius of curvature of the object-side surface of the second lens, and
R4 is the radius of curvature of the image-side surface of the second lens.

4. The imaging lens as defined in claim 2, wherein the following conditional formula is further satisfied:

$$40<vd3 \quad (3)$$

where,
vd3 is the Abbe's number of the material for the third lens with respect to the d line.

5. The imaging lens as defined in claim 1, wherein the following conditional formula is further satisfied:

$$25<vd5 \quad (13)$$

where,
vd5 is the Abbe's number of the material for the fifth lens with respect to the d line.

6. The imaging lens as defined in claim 1, wherein the following conditional formula is further satisfied:

$$0.5<f3/f<10 \quad (14)$$

where,
f3 is the focal length of the third lens, and
f is the focal length of the entire system.

7. The imaging lens as defined in claim 1, wherein the following conditional formula is further satisfied:

$$0.5<f2/f<7 \quad (15)$$

where,
f2 is the focal length of the second lens, and
f is the focal length of the entire system.

8. The imaging lens as defined in claim 1, wherein the following conditional formula is satisfied:

$$f1/f < -0.25 \quad (16)$$

where,
f1 is the focal length of the first lens, and
f is the focal length of the entire system.

9. The imaging lens as defined in claim 1, wherein the following conditional formula is satisfied:

$$0.3 < f123/f < 15 \quad (17)$$

where,
f123 is the combined focal length of the first lens, the second lens, and the third lens, and
f is the focal length of the entire system.

10. The imaging lens as defined in claim 1, wherein the following conditional formula is further satisfied:

$$0.5 < f234/f < 18 \quad (18)$$

where,
f234 is the combined focal length of the second lens, the third lens, and the fourth lens, and
f is the focal length of the entire system.

11. The imaging lens as defined in claim 1, wherein the following conditional formula is further satisfied:

$$0.5 < f12345/f < 10 \quad (19)$$

where,
f12345 is the combined focal length of the first lens, the second lens, the third lens, the fourth lens, and the fifth lens, and
f is the focal length of the entire system.

12. The imaging lens as defined in claim 1, wherein the following conditional formula is further satisfied:

$$-5.0 < (R14+R15)/(R14-R15) < -0.01 \quad (8)$$

where,
R14 is the radius of curvature of the object-side surface of the seventh lens, and
R15 is the radius of curvature of the image-side surface of the seventh lens.

13. The imaging lens as defined in claim 1, wherein the following conditional formula is further satisfied:

$$0.4 < f2345/f < 10 \quad (20)$$

where,
f2345 is the combined focal length of the second lens, the third lens, the fourth lens, and the fifth lens, and
f is the focal length of the entire system.

14. The imaging lens as defined in claim 1, wherein the following conditional formula is further satisfied:

$$0.1 < f3456/f < 5.0 \quad (21)$$

where,
f3456 is the combined focal length of the third lens, the fourth lens, the fifth lens, and the sixth lens, and
f is the focal length of the entire system.

15. The imaging lens as defined in claim 1, wherein the following conditional formula is further satisfied:

$$-4.0 < (R8+R9)/(R8-R9) < 4.0 \quad (22)$$

where,
R8 is the radius of curvature of the object-side surface of the fourth lens, and
R9 is the radius of curvature of the image-side surface of the fourth lens.

16. The imaging lens as defined in claim 1, wherein the following conditional formula is further satisfied:

$$-3 < f/f45 < 3 \quad (23)$$

where,
f45 is the combined focal length of the fourth lens and the fifth lens, and
f is the focal length of the entire system.

17. An imaging apparatus equipped with the imaging lens as defined in claim 1.

18. An imaging apparatus equipped with the imaging lens as defined in claim 2.

19. An imaging apparatus equipped with the imaging lens as defined in claim 3.

* * * * *